United States Patent [19]

New, III

[11] Patent Number: 6,155,834

[45] Date of Patent: Dec. 5, 2000

[54] DATA DRIVEN INTERACTIVE TESTING METHOD, APPARATUS AND ARTICLE OF MANUFACTURE FOR TEACHING A STUDENT TO READ

[76] Inventor: Cecil A. New, III, 3228 Ramsgate Rd., Augusta, Ga. 30909-3246

[21] Appl. No.: 08/884,640

[22] Filed: Jun. 27, 1997

[51] Int. Cl.[7] .................................................. G09B 19/00
[52] U.S. Cl. ........................... 434/118; 434/150; 434/322
[58] Field of Search .................................. 434/118, 167, 434/169, 350, 322, 323, 351, 178, 332, 159, 150

[56] References Cited

U.S. PATENT DOCUMENTS

| | | |
|---|---|---|
| 2,867,917 | 1/1959 | Carlton . |
| 3,170,247 | 2/1965 | Kovacevich . |
| 3,279,098 | 10/1966 | Taylor . |
| 4,151,659 | 5/1979 | Lien et al. .............................. 434/178 |
| 4,245,405 | 1/1981 | Lien et al. . |
| 4,636,173 | 1/1987 | Mossman . |
| 4,749,353 | 6/1988 | Breedlove .............................. 434/169 |
| 5,002,491 | 3/1991 | Abrahamson et al. ................. 434/322 |
| 5,035,625 | 7/1991 | Munson et al. ......................... 434/332 |
| 5,147,205 | 9/1992 | Gross et al. . |
| 5,206,671 | 4/1993 | Eydelman et al. ..................... 434/351 |
| 5,256,067 | 10/1993 | Gildea et al. . |
| 5,797,754 | 8/1998 | Griswold et al. ....................... 434/322 |
| 5,823,788 | 10/1998 | Lenelson et al. ....................... 434/362 |

OTHER PUBLICATIONS

Packaging Information Describing Davidson & Associates, Inc., "Reading Blaster" computer program.

Packaging Information Describing Computer Easy, "Read Easy" computer program.

Primary Examiner—Valencia Martin-Wallace
Assistant Examiner—Sheila Clayton

[57] ABSTRACT

The invention includes a system to teach a student to sight read using a computer. The term "Sight read" means to instantly recognize words without having to sound them out or go through other processes such as explaining the definition of the word. The invention utilizes a computer to systematically and continuously adjust the requirements for word perception and recognition based on characteristics and ongoing responses of the individual student in a way that increases the speed and accuracy of word recognition. The inventive method utilizes three main types of interactive process types including (1) Choose from list, (2) Fill in letter blank, and (3) Determine Sequence. Each interactive process type includes three interactive processes in which a target word is communicated by showing only, saying only, and/or showing and saying the target word.

73 Claims, 57 Drawing Sheets

FIG. 2(b)

New Student Sign On Screen

New Student

Please enter your first name. Press [Tab].
Enter you last name. Press [Tab]
Enter the date you were born. Press [Tab]

| | |
|---|---|
| First Name | Ted |
| Last Name | New |
| Date of Birth | 3/29/45    Age: 51 |
| | Example 6/25/1989 |
| Password | |
| Re-enter Password | |

[ OK ]    [ Cancel ]

FIG. 2(c)

Student Sign On Screen-1

Sight Reader Sign On

Click button with your name

| Mary Winn New |
|---|
| Ted New |
| Sally Smith |
| |
| |
| |
| |
| |
| |
| |

[ OK ]
[ Cancel ]
[ New Student ]
[ Teacher ]

FIG. 2(d)

Student Sign On Screen- 2

Sight Reader Sign On

Ted New

Enter your password

[          ]

[ OK ]
[ Cancel ]
[ New Student ]
[ Teacher ]

FIG. 2(e)

Student Sign On Screen- 3

Sight Reader Sign On

Ted New

Click the OK Button

[ OK ]
[ Cancel ]
[ New Student ]
[ Teacher ]

CHOOSE FROM LIST SAMPLE SCREEN 1 (SHOW LIST OF WORDS)

CHOOSE FROM LIST SAMPLE SCREEN 2 (DISPLAY TARGET WORD)

CHOOSE FROM LIST SAMPLE SCREEN 3
(ERASE TARGET WORD AFTER THE SHOW INTERVAL EXPIRED)

CHOOSE FROM LIST SAMPLE SCREEN 4
(STUDENT CHOOSES CORRECT RESPONSE FROM DISPLAYED LIST)

CHOOSE FROM LIST SAMPLE SCREEN 5
(DISPLAY LIST OF WORDS)

CHOOSE FROM LIST SAMPLE SCREEN 6
(SHOW NEW TARGET WORD)

CHOOSE FROM LIST SAMPLE SCREEN 7
(ERASE TARGET WORD AFTER SHOW INTERVAL HAS EXPIRED)

CHOOSE FROM LIST SAMPLE SCREEN 8
(STUDENT CHOOSES INCORRECT RESPONSE
FROM DISPLAYED LIST AND CORRECT IS DISPLAYED)

CHOOSE FROM LIST SAMPLE SCREEN 9
(STUDENT'S SECOND RESPONSE - A CORRECT RESPONSE)

FILL IN LETTER BLANKS SAMPLE SCREEN 1
(DISPLAY TARGET WORD)

FILL IN LETTER BLANKS SAMPLE SCREEN 2
(DISPLAY TARGET WORD WITH BLANKS)

FILL IN LETTER BLANKS SAMPLE SCREEN 3
(STUDENT FILLS IN LEFT MOST BLANK CORRECTLY)

FILL IN LETTER BLANKS SAMPLE SCREEN 4
(STUDENT INCORRECTLY ENTERS NEXT LETTER
- * SUBSTITUTED FOR INCORRECT ENTRY)

FILL IN LETTER BLANKS SAMPLE SCREENS 5
(DISPLAY TARGET WORD AFTER INCORRECT ENTRY)

DETERMINE SEQUENCE SAMPLE SCREEN 1
(DISPLAY FIRST WORD FROM FIRST SEQUENCE)

DETERMINE SEQUENCE SAMPLE SCREEN 2
(DISPLAY SECOND WORD IN FIRST SEQUENCE)

DETERMINE SEQUENCE SAMPLE SCREEN 3
(DISPLAY THIRD WORD FROM FIRST SEQUENCE)

DETERMINE SEQUENCE SAMPLE SCREEN 4
(PRESENT LIST OF WORDS IN SECOND SEQUENCE)

DETERMINE SEQUENCE SAMPLE SCREEN 5
(STUDENT CHOOSES FIRST WORD)

DETERMINE SEQUENCE SAMPLE SCREENS 6
(STUDENT CHOOSES SECOND WORD)

DETERMINE SEQUENCE SAMPLE SCREEN 7
(STUDENT CHOOSES THIRD WORD)

*Adjust Words in Set (WIS) Procedure 170*

Number of Words 220

DATA DRIVEN INTERACTIVE TESTING METHOD, APPARATUS AND ARTICLE OF MANUFACTURE FOR TEACHING A STUDENT TO READ

BACKGROUND OF THE INVENTION

1. Technical Field of the Invention

The field of this invention is computer implemented, data driven testing methods, apparatus and articles of manufacture, particularly as they apply to teaching a student to read.

2. Description of Related Art

There are several conventional methods to teach a student to read which are reviewed below.

The Gross et al. patent (U.S. Pat. No. 5,147,205) discloses a computer-based apparatus and method which "tachistoscopically" or momentarily displays a series of related words to the student to teach reading skills, including comprehension of word groups, spelling and vocabulary.

In the exercises provided by Gross et al., a sentence if broken up into words or word groups each of which are then displayed for finite, brief periods of time on a computer display. The rate of presentation of the words and display latency time are adjustable to accommodate and encourage the student's reading skills. After tachistoscopic display, a reading comprehension test is then administered to test the student.

Gross et al. also teaches spelling to a student by tachistoscopically displaying a word, erasing the word, and then prompting the student to spell the previously displayed word. The student's responses are entered through a keyboard, and the correctness of the responses is indicated on the computer display. In the spelling exercise, a word is displayed briefly, and the student is then prompted to recreate the entire word on the display by entering letters through the keyboard. If the student spells the word correctly, he is rewarded with the definition.

The Lien et al. patent (U.S. Pat. No. 4,245,405) discloses a computer-based interactive apparatus for teaching reading skills. In one exercise, words are displayed tachistoscopically, one at a time, and the student is prompted to say each word after it is displayed. In another exercise, the student is prompted to fill in letters missing from a displayed word.

The background of Lien et al. describes a process which reproduces a word aurally and visually and then prompts the student to pronounce the word and compare his pronunciation with the sample pronunciation.

The Taylor patent (U.S. Pat. No. 3,279,093) discloses a method employing audio-visual aids for teaching reading skills. In one phase (V) of Taylor's method, words are projected onto a screen while being played over loudspeakers. In other phases (VII and VIII), words are projected briefly onto the screen. None of Taylor's techniques tests the student or requires responses by the student.

The Gildea et al. patent (U.S. Pat. No. 5,256,067) discloses a computer-based interactive apparatus and method for promoting vocabulary development. The student marks unfamiliar words or phrases in text displayed on a computer screen. The computer then displays, for finite periods, illustrative text using the same words or phrases to teach the unknown word to the student.

By using context sensitive illustrative sentences to teach unknown words, Gildea et al. avoids the often-confusing dictionary definition. Then, verification text using alternative words or phrases having similar meaning to the original word is displayed to confirm the student's understanding.

The Mossman patent (U.S. Pat. No. 4,636,173) discloses an audio visual aid that teaches reading skills in which individual words in a display are highlighted and simultaneously pronounced by a recorded voice.

The Carlton and Kovacevich patents (U.S. Pat. Nos. 2,867,917 and 3,170,247, respectively) disclose devices which facilitate the teaching of reading skills using flash card techniques.

The commercially available Read Easy computer program briefly displays a sentence and then presents a list of sentences that includes the previously displayed sentence to test the student's sentence recognition.

The commercially available Reading Blaster program is more of a game than a serious teaching program. The Reading Blaster program includes a "Word Zapper" spelling subprogram that displays a word with missing letter(s). The Word Zapper suggests letters and letter combinations which may be selected by the student to complete the word.

The conventional methods of teaching a student to read have several disadvantages. First of all, the testing methods are rather primitive, fixed tests which do not adapt or otherwise adjust their parameters depending upon student performance.

Furthermore, none of the conventional methods measure the response time of the student to a given test to more accurately gauge student performance. Also, the student is not permitted to interact with the conventional teaching methods to request a repetition or expansion of the test and the conventional methods don't adapt to the degree of interaction and/or help requested by the student.

Still further, none of the conventional art discloses interactive, data driven exercises to teach a student to read. Furthermore, none of the conventional art combines tachistoscopic display with a data driven testing method to teach reading.

OBJECTS AND SUMMARY OF THE INVENTION

An object of the invention is to solve the above-mentioned disadvantages in the conventional methods.

Another object of the invention is to provide an advanced testing methodology in which the type and degree of difficulty adapts or adjusts according to student performance.

Another object of the invention is to permit the student to interact with the teaching method to request a repetition or expansion of the test and to adapt the test to the degree of interaction and/or help requested by the student.

Yet another object of the invention is to provide interactive, data driven exercises to teach a student to read.

Still yet another object of the invention is to combine tachistoscopic display with a data driven testing method to teach reading.

Still another object of the invention is to measure the response time of the student to a given test to more accurately gauge student performance.

Yet another object of the invention is to change the type and degree of difficulty of a reading test according to the response time of the student.

To achieve the objects of the invention, the invention teaches a student to sight read using a computer. The term "sight read" means to recognize words without having to sound them out or necessarily understand the meaning or definition of the word. New words to the student, as well as words in his/her speaking vocabulary, are presented without explanation throughout the inventive processes.

To further achieve the objects of the invention, the invention measures the response time of student to a sight reading development test for testing the student's ability to sight read a previously communicated target word.

To achieve some of the interactive aspects of the invention, the invention provides the student with a show button, wherein activating the show button causes the computer to display a target word on the display for a show interval; a say button, wherein activating the say button causes the computer to announce the target word via a speaker.

To achieve some of the data driven testing aspects of the invention, the invention determines that an incorrect response was entered by the student when the interactive process shows the target word and the student activates the say button.

To further achieve some of the data driven testing aspects of the invention, the invention determines that an incorrect response was entered by the student when the interactive process says the target word and the student activates the show button.

To still further achieve some of the data driven testing aspects of the invention, the invention adjusts the show interval according to student performance and/or age.

To still further achieve the objects of the invention, the invention teaches a student to read using three interactive process types including choosing a target word from a list of displayed words; filling in letter blanks of a displayed target word; and determining a correct sequence of words by individually displaying a plurality of words including the target word in a first sequence one word at a time, then simultaneously displaying the plurality of words including the target word in a second sequence, and asking the student to select the displayed plurality of words in the first sequence.

Further achieving the objects of the invention is the disclosed method which tests the student with nine interactive processes wherein each interactive process type includes three interactive processes, the three interactive processes including:

a show only process which displays the target word on the display for a show interval and accepts a response from the student, a say only process which announces the target word via a speaker and accepts a response from the student, and a show and say process that displays the target word on the display for a show interval, announces a target word via a speaker, and accepts a response from the student.

Furthermore, the invention selects interactive processes based on the calculated average percent correct for that student and response time.

The invention also adjusts the testing methodology including the words presented and degree of difficulty according to the age, chronological or equivalent reading level, of the student.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(b)–(f) are examples of screen displays that may be generated by the sign on procedure of FIG. 2(a);

DETAILED DESCRIPTION OF PREFERRED EMBODIMENT

Computer for Implementing Inventive Methods

Figure 18:
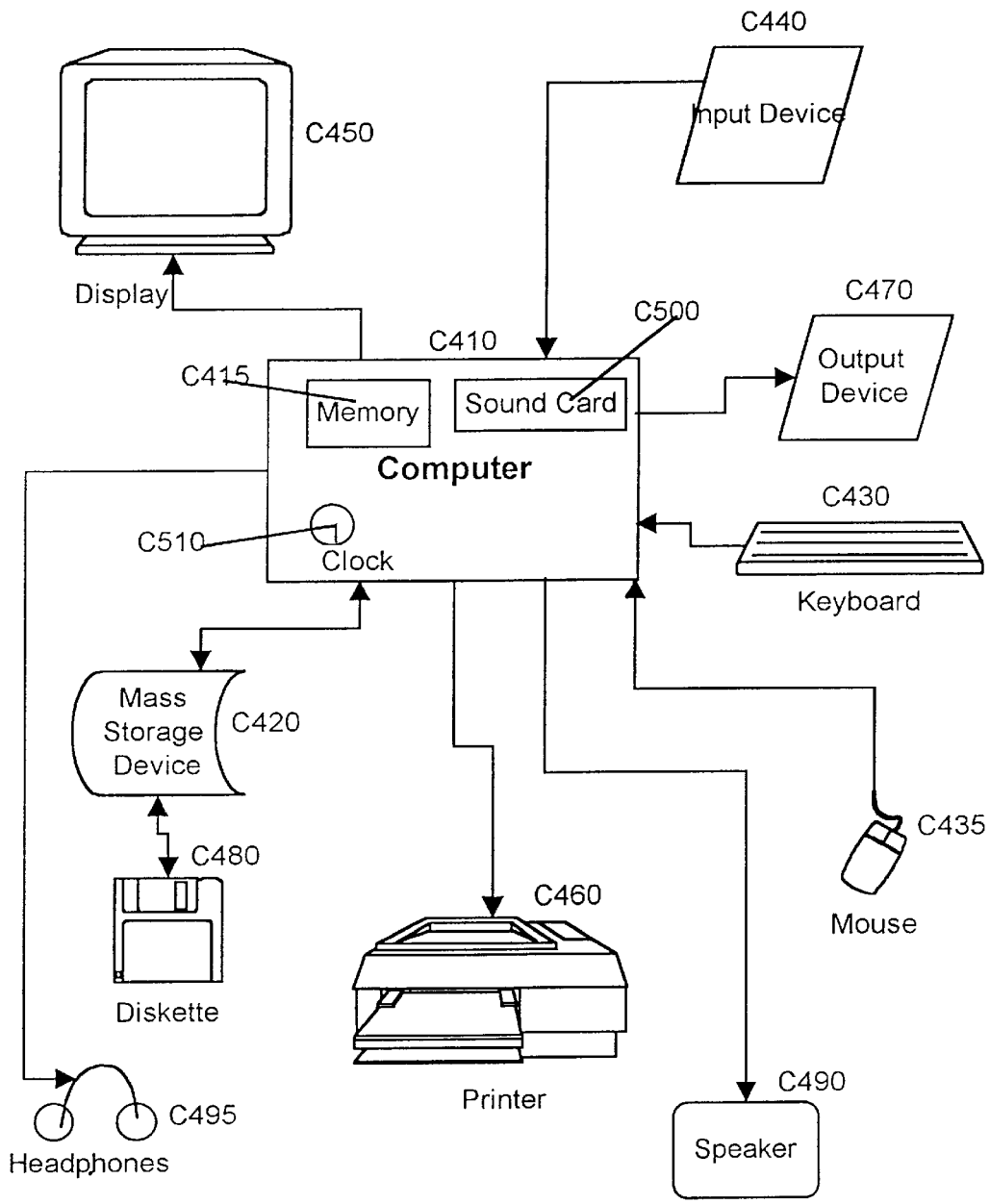
FIG. 18 is a high-level block diagram of a computer system which may be programmed with the inventive methods with the result being a special purpose computer.

A computer suitable for programming with the inventive method is diagrammatically shown in the block diagram of FIG. 18. The computer C410 is preferably part of a computer system C400. To allow human interaction with the computer C410, the computer system includes a keyboard C430 and a mouse C435.

To further enable interaction with the student, the computer system C400 also includes a display C450 such as a cathode ray tube or flat panel display, printer C460, a speaker C490, a headphone C495, a sound card C500, an output device C470, and a clock C510.

Furthermore, the computer system C400 also includes a mass storage device C420. The mass storage device C420 may be a hard disk, floppy disc, optical disc, etc. The mass storage device C420 may be used to store a computer program which performs the invention when loaded into the computer C410 and to store data generated by the invention such as student performance data. As an alternative, the input device C440 may be a network connection or off-line storage which supplies the computer program to the computer C410.

More particularly, the computer program embodiment of the invention may be loaded from the mass storage device C420 into the internal memory C415 of the computer C410. The result is that the general purpose computer C410 is transformed into a special purpose machine that implements the invention.

Even more particularly, each step of inventive method will transform at least a portion of the general purpose computer C410 into a special purpose computer module implementing that step. For example, when the record results step 810 is implemented on the computer C410, the result is a computer implemented apparatus (a recorder that records student performance data) that performs the recording functions of the record results step 810.

Other embodiments of the invention include firmware embodiments and hardware embodiments wherein the inventive method is programmed into firmware (such as an EPROM, PROM or PLA) or wholly constructed with hardware components. Constructing such firmware and hardware embodiments of the invention is a routine matter to one of ordinary skill using known techniques.

Although the working embodiment of the invention utilizes conventional wave files to construct a speech database that is stored in memory C415 or mass storage device C420, it is to be understood that any suitable method of encoding a sound file may be used with the invention to aurally reproduce words.

General Description of Inventive Method

The computer C410 implemented invention utilizes three interactive process types (IPT's) including: (1) Choose from List, (2) Fill in Letter Blanks, and (3) Determine Sequence.

Within each IPT there are three interactive processes (IP's) that communicate a target word to the student in a different way including whether the target word is (a) said and shown, (b) said only, or (c) shown only. Thus, there are a total of nine interactive processes (noted with numbers 1–9 in the specification and drawings) that are utilized by the invention to teach a student to sight read.

Because the IPT's are intended to develop a student's sight reading ability, they may also be referred to as sight reading development tests for testing the student's ability to sight read the communicated target word(s).

Each interactive process includes corresponding screen display(s) that display information on display C450 relating to that IP and which permit the student to view the information and interact with the computer C410 via a user interface such as a keyboard C430 or mouse C435.

In general, the target word is used in one interactive process at a time within an IPT for a given student. The target word can be also be utilized in more than one IPT because the words are taken from a main word list.

Within an IPT, a target word is moved sequentially from one IP to the next IP after the student has responded correctly the required number of times, based on overall average percentage, response time, and age of the student. Low overall percentages, incorrect responses to the target word, slow overall response times, and/or young ages increase the required number of correct responses before a word is moved from one IP to the next within an IPT.

Older children and adults start with an IP from each IPT and additional IP's within each IPT are added within a fairly short number of trials.

Younger children start with only one IP from one IPT (preferably the Choose From List IPT); additional IP's and additional IPT's are added more slowly than for older children, given the same level of performance.

All data below is stored in memory C415 and/or mass storage device C420 for each student.

Overview of Preferred Implementation

Figure 1:
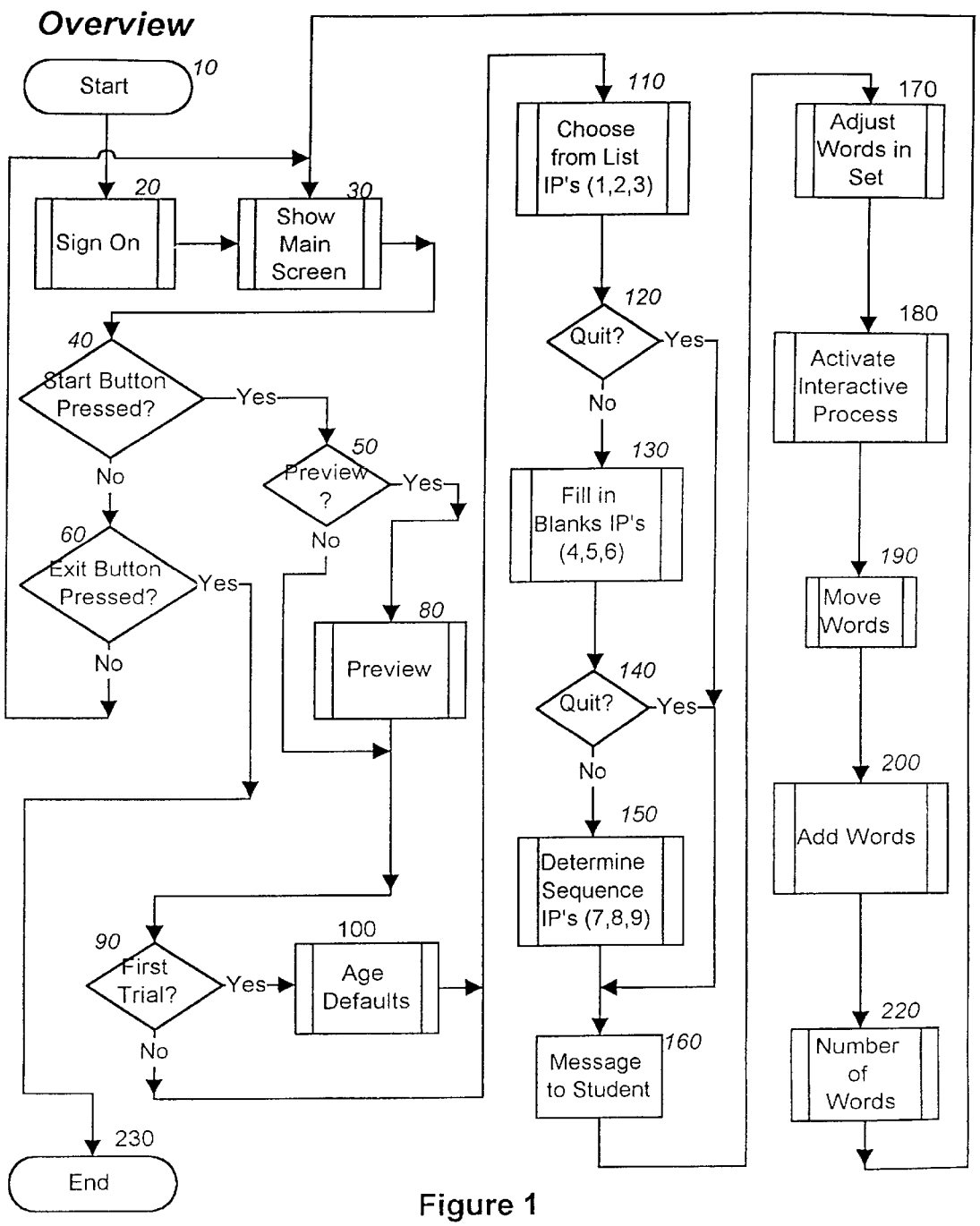
FIG. 1 is the highest-level overview flow chart illustrating the main inventive aspects of the invention that may be implemented by the computer system shown in FIG. 18.
Figure 2A:
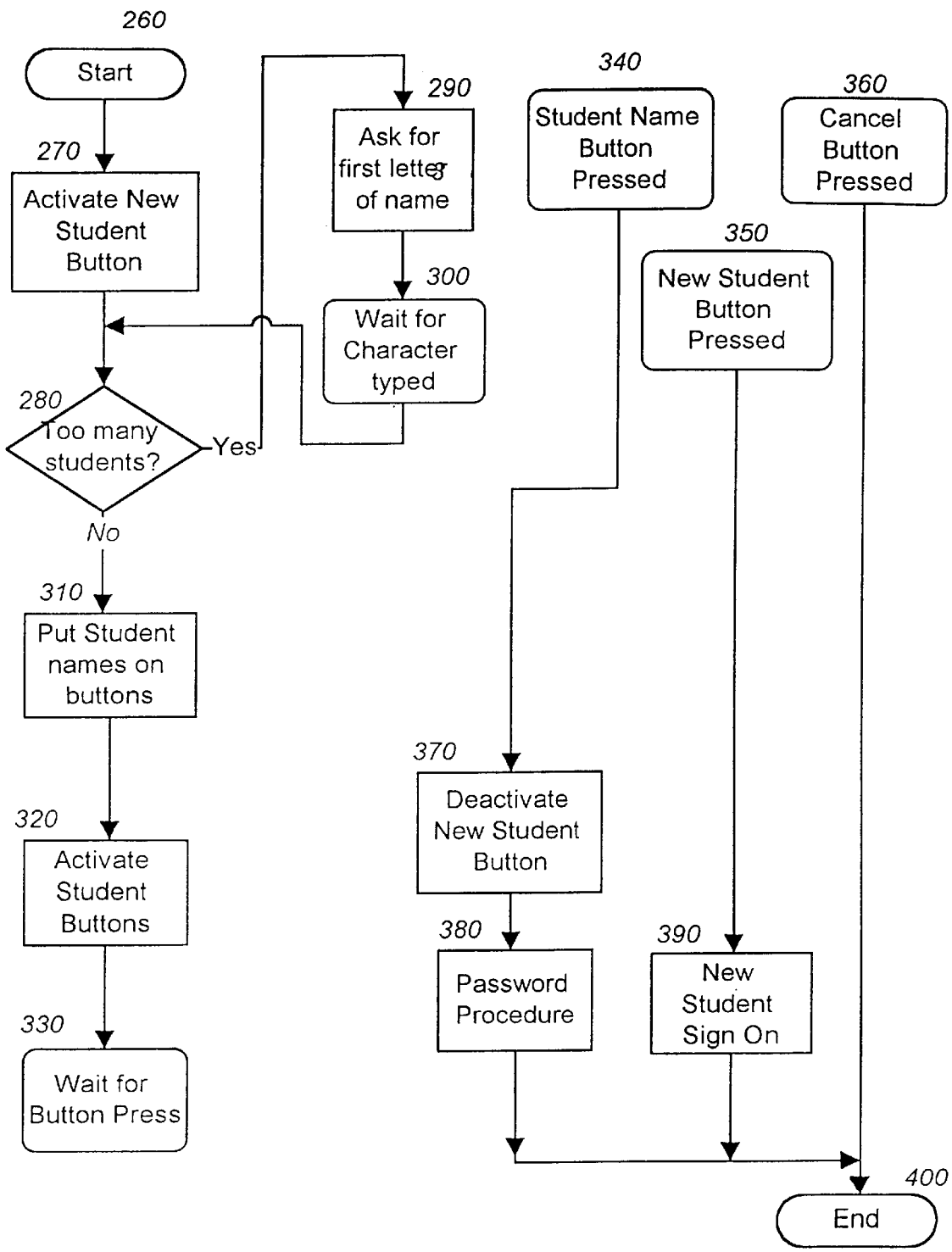
FIG. 2(a) is a high-level flow chart illustrating the sign on procedure according to the invention that may be implemented by the computer system shown in FIG. 18.
Figure 2F:
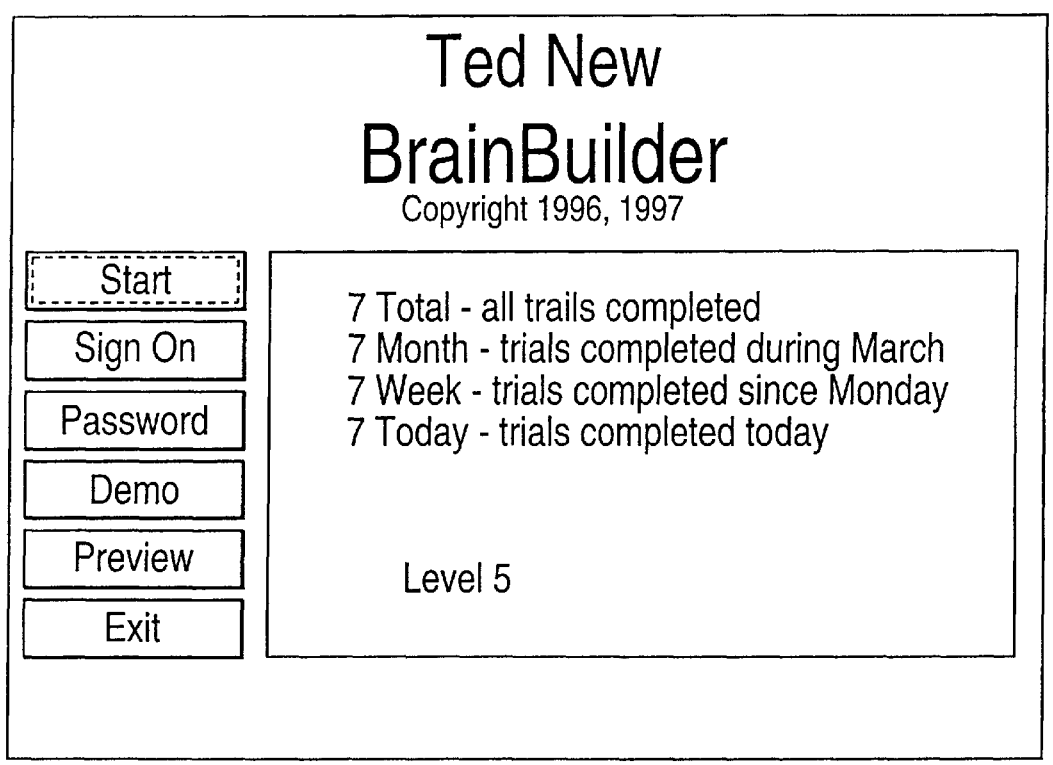

FIG. 1 is an overview of the inventive process in a preferred implementation.

The three types of interactive processes (IPT's) disclosed by the invention are (1) choose from list, (2) fill in letter blank, and (3) determine sequence.

In general, the three IPT's may be viewed as examples of a whole word recognition test, a partial word recognition test, and a word sequence recognition test, respectively wherein each test is systematically and continuously adjusted using a data driven methodology.

The process summarized by FIG. 1 uses a computer C410 to systematically and continuously adjust the requirements for word perception and recognition by selecting one or more IPTs based on characteristics and ongoing responses of the individual student in a way that increases the speed and accuracy of word recognition.

The summarized or overview process, as shown in FIG. 1, begins with "Start" step 10 and then proceeds to step 20, "Sign On", which is the process by which the student signs on (see FIGS. 2(a)–(f)) by selecting his/her name and entering a password. The process continues with step 30.

Figure 3:
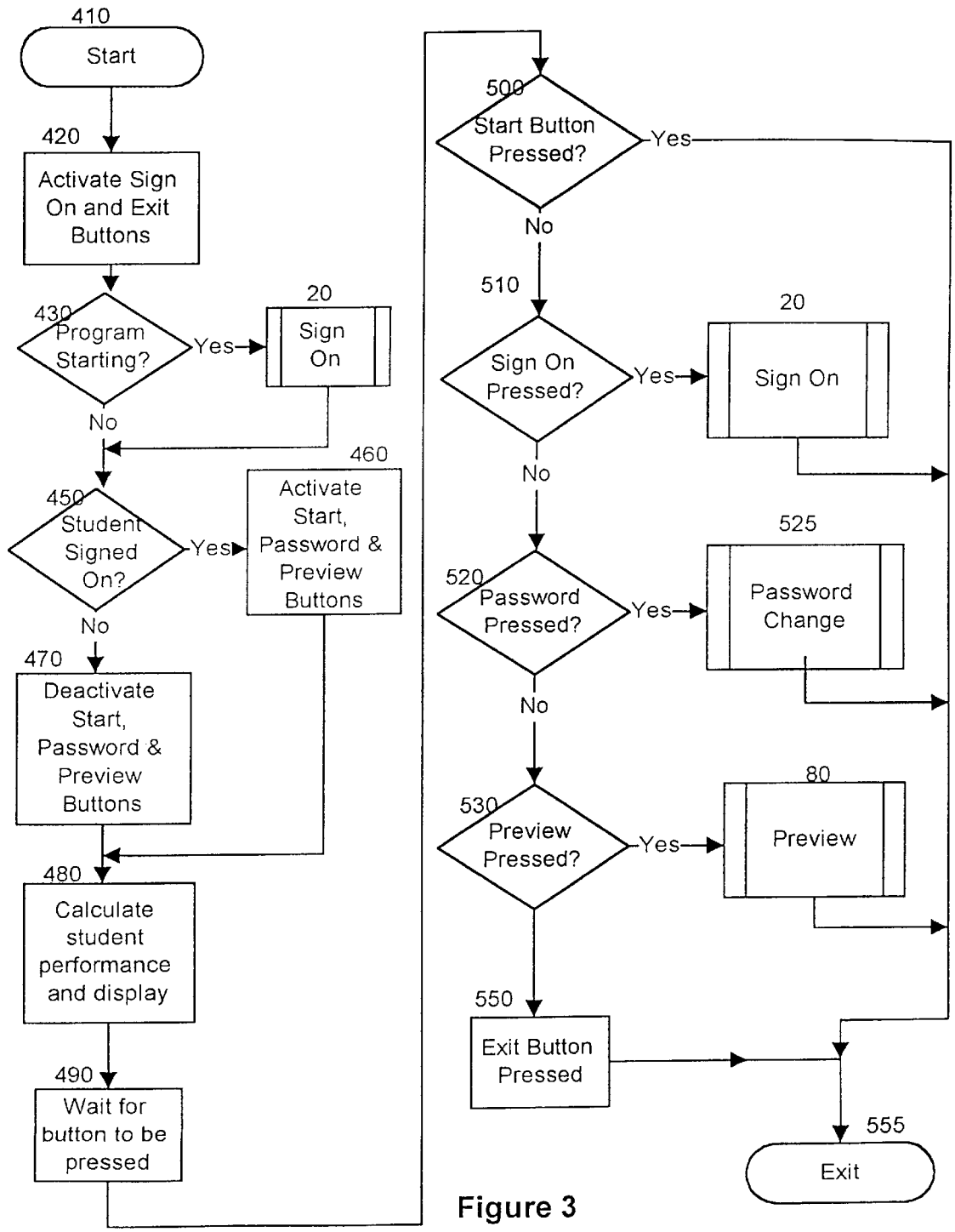
FIG. 3 is a high-level flow chart illustrating a main menu labelled show main screen according to the invention that may be implemented by the computer system shown in FIG. 18.

Step 30, "Show Main Screen", follows step 20 and is more particularly described in relation to FIG. 3 which presents the main screen to the student. The process continues with step 40.

Step 40, "Start Button Pressed" follows step 30 and is a decision point which presents the question: "Did the Student press the Start button during step 30?" If yes, the process continues with step 50. If no, go to step 60.

Step 50, "Preview", follows a yes in step 40 and is a decision point which presents the question: "Does the student receive a preview of eight words before regular interactive processes begin?" Young children, eg. under age eight, and children who do not have especially high average percentages start with a preview procedure which is described in relation to FIG. 4 below. If the answer to step 50 is yes, the process conducts the Preview Procedure 80. If no, the preview procedure 80 is skipped and the process moves to step 90.

Step 60, "Exit Button Pressed" follows a no in step 40 and is another decision point which essentially asks the question: "Was the Exit Button pressed in step 30 (Show Main Menu)?" If yes, the process ends with step 230. If no, the process returns to step 30.

Step 80, "Preview" procedure follows a yes in step 50. As will be described in more detail below in relation to FIG. 4, the Preview Procedure says and shows eight words to the student without requiring any student response. The process continues with step 90.

Step 90, "First Trial", follows step 80 and is a decision point which presents the question: "Is this the very first trial for this student?" If yes, go to step 100 to use age defaults to determine process behaviors. If no go to step 110.

Step 100, "Age Defaults", follows a yes in step 90. The starting point for process behaviors, absent previously recorded student performance data, depends upon the age of the student. The process continues with step 110.

Step 110, "Choose from List IP's (1,2,3)", diagrammatically shows the first IPT including each IP (1,2,3) therein and follows steps 90, 100. This IPT is more particularly described in relation to FIG. 5 below. The process continues with step 120.

Step 120, "Quit", follows step 110 and is a decision point which essentially presents the question: "Did the student do any one of the following during step 110: (1) press the quit button 9, (2) fail to respond on time, or (3) make sufficient errors so that the Choose from List Process should be terminated?" If yes, all remaining Interactive Processes are cancelled, and the process represented by FIG. 1 moves to step 160. If no, the process continues with step 130.

Step 130, "Fill in Blanks IP's (4,5,6)", diagrammatically shows the second IPT including each IP (4,5,6) therein and follows step 120. This IPT is more particularly described in relation to FIG. 6(a) below. The process continues with step 140.

Step 140, "Quit", follows step 110 and is a decision point which essentially presents the question: "Did the student do any one of the following during step 130: (1) press the quit button 9, (2) fail to respond on time, or (3) make sufficient errors so that the Fill in Letter Blanks Process should be terminated?" If yes, all remaining Interactive Processes are cancelled, and the process represented by FIG. 1 moves to step 160. If no, the process continues with step 150.

Figure 7A:
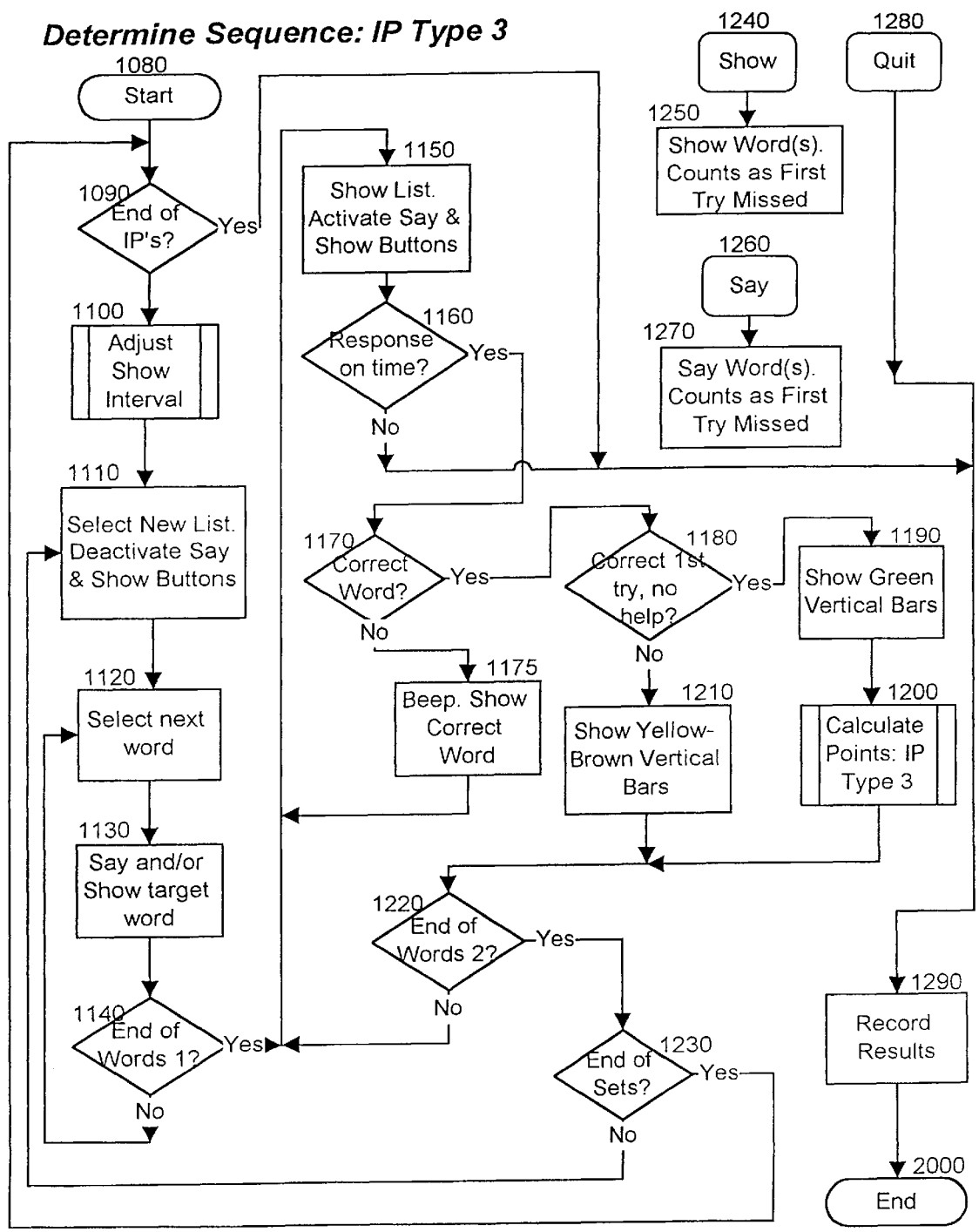
FIG. 7(a) is a high-level flow chart illustrating the Determine Sequence interactive process according to the invention that may be implemented by the computer system shown in FIG. 18.
Figure 7B:
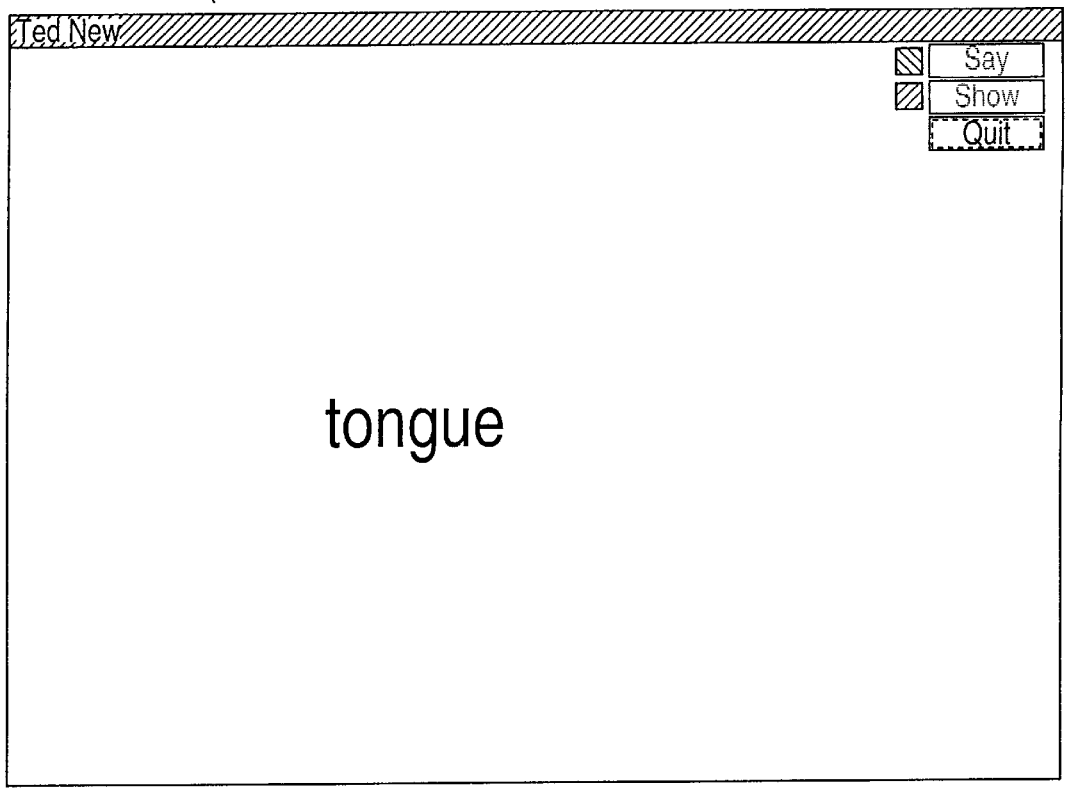
FIGS. 7(b)–(h) are examples of screen displays that may be generated by the Determine Sequence interactive process of FIG. 7(a)
Figure 7C:
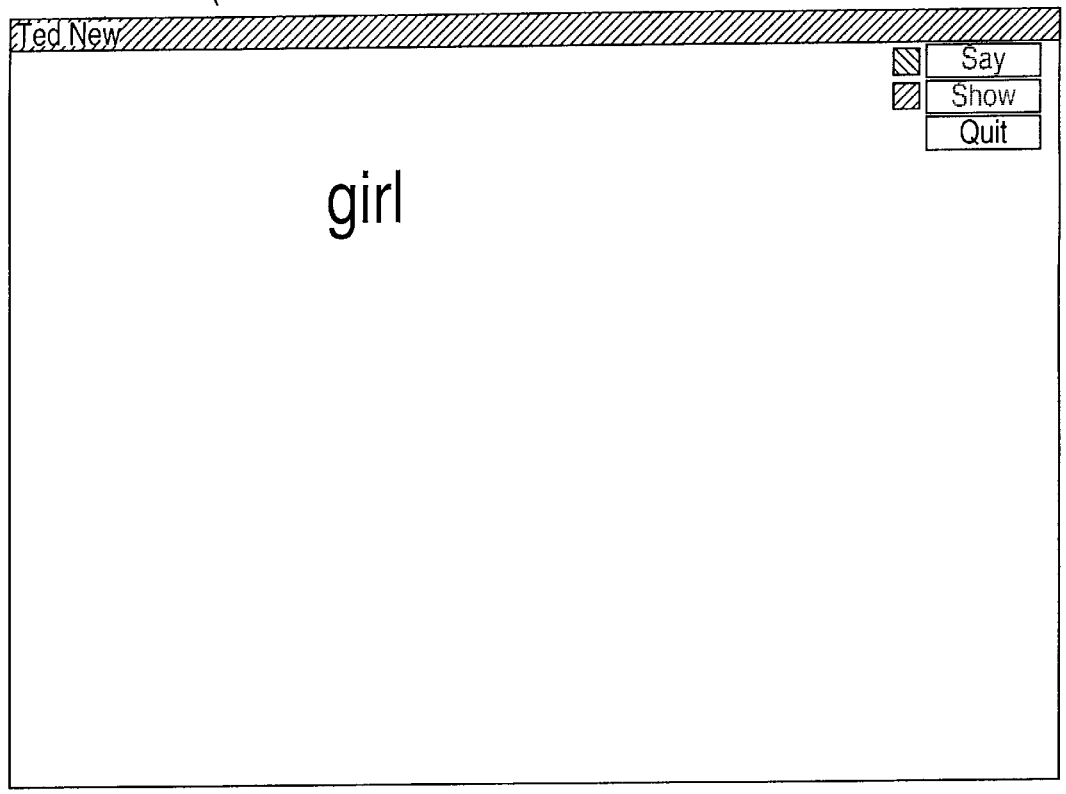
Figure 7D:
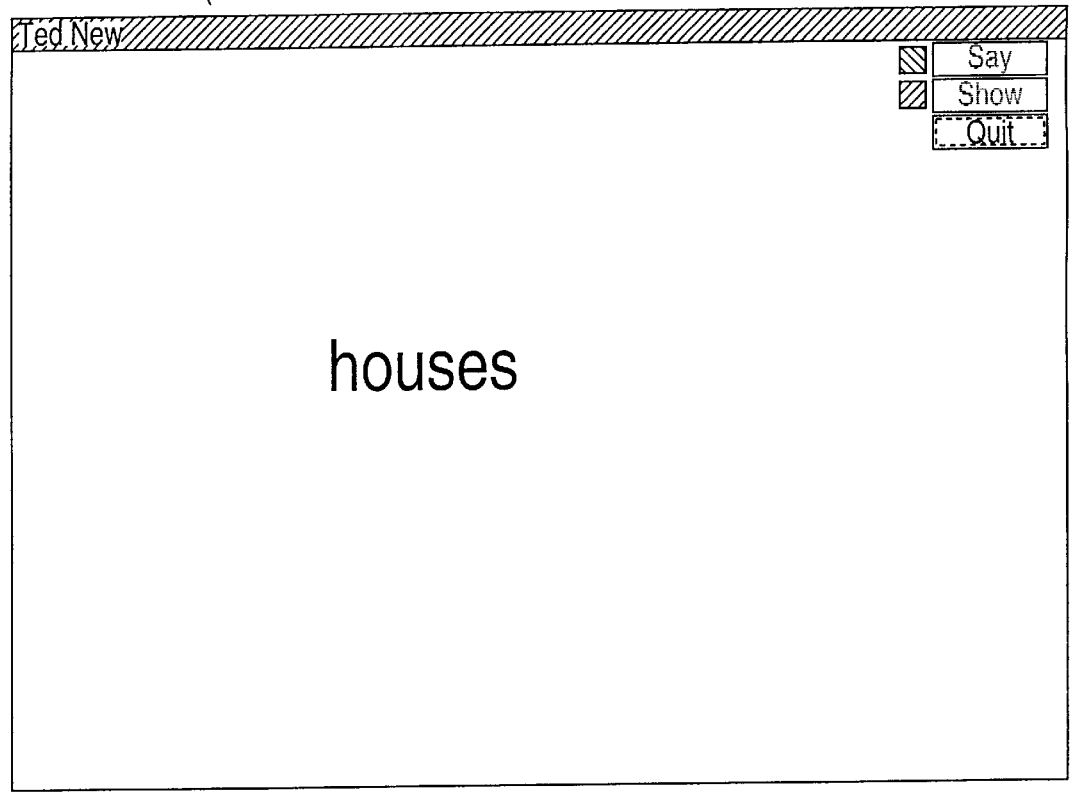
Figure 7E:
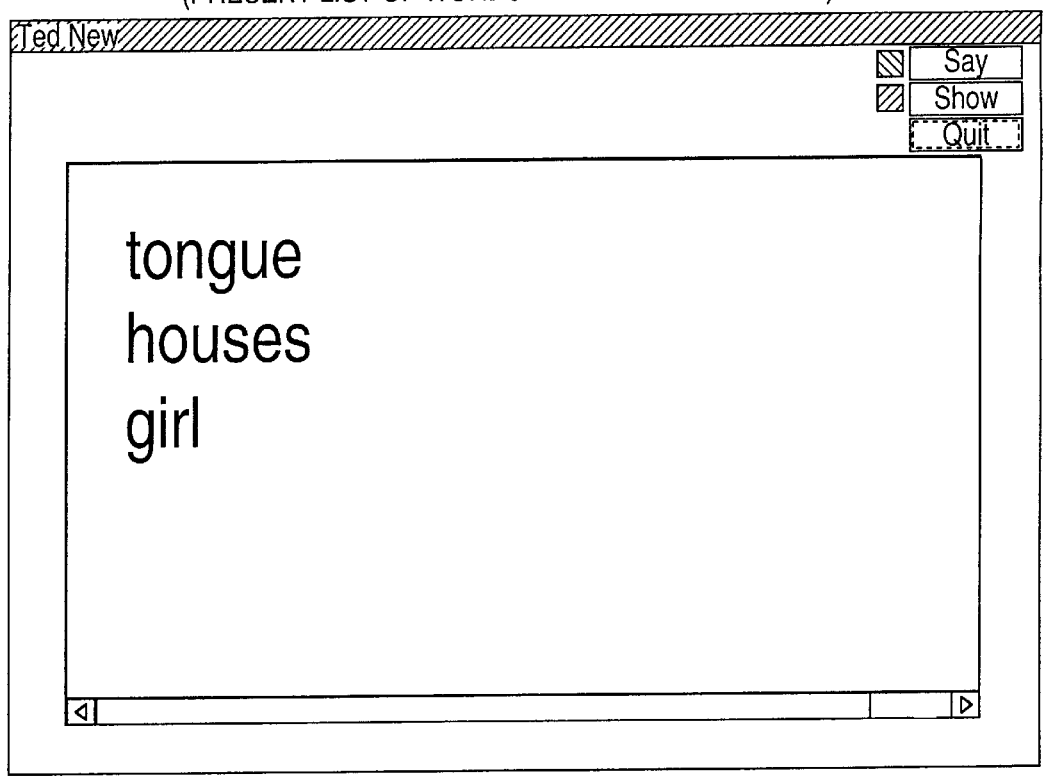
Figure 7F:
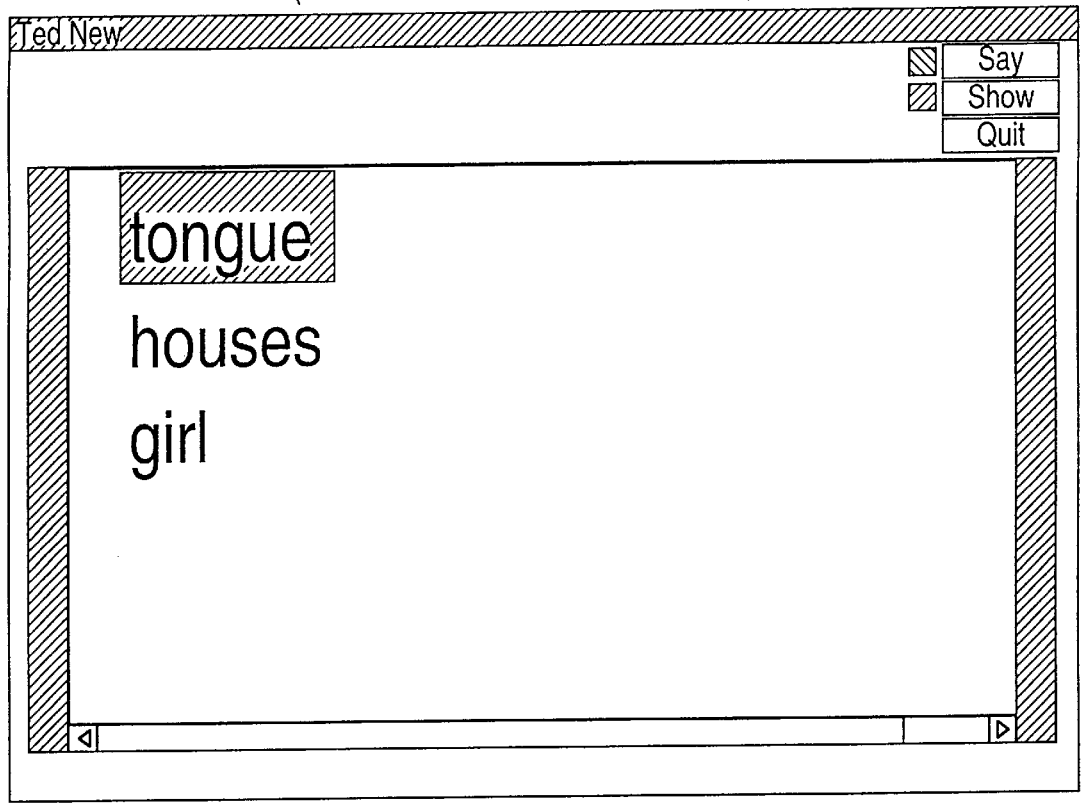
Figure 7G:
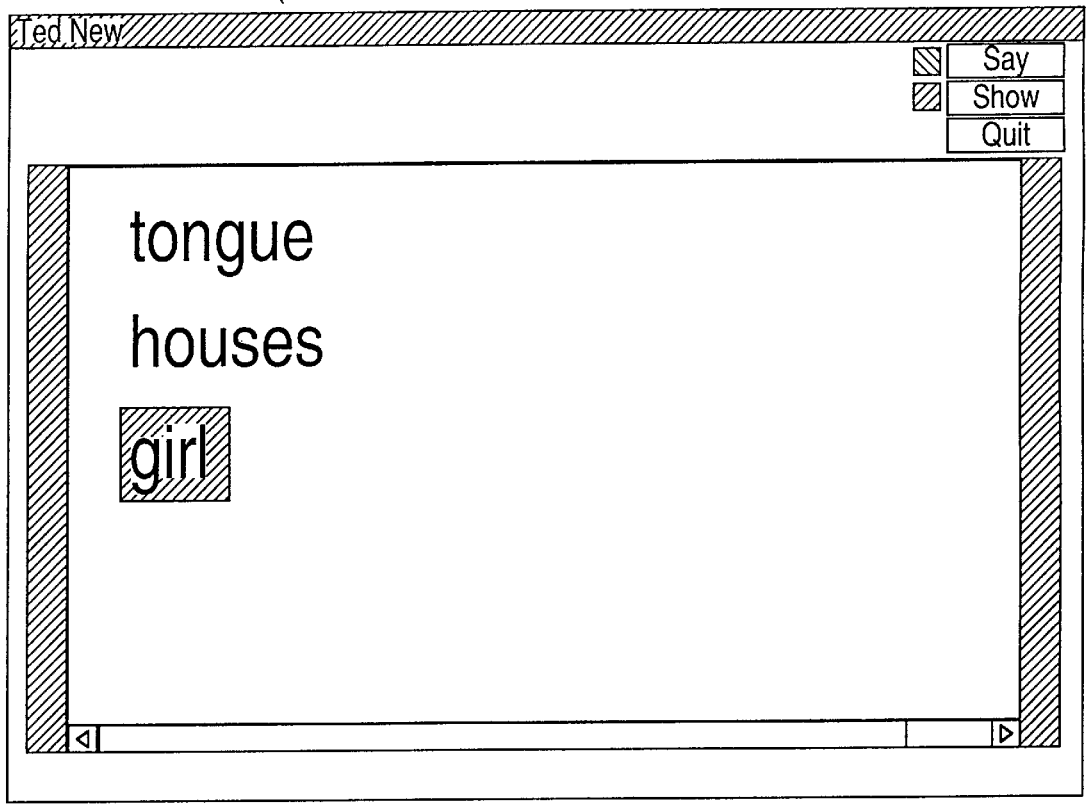
Figure 7H:
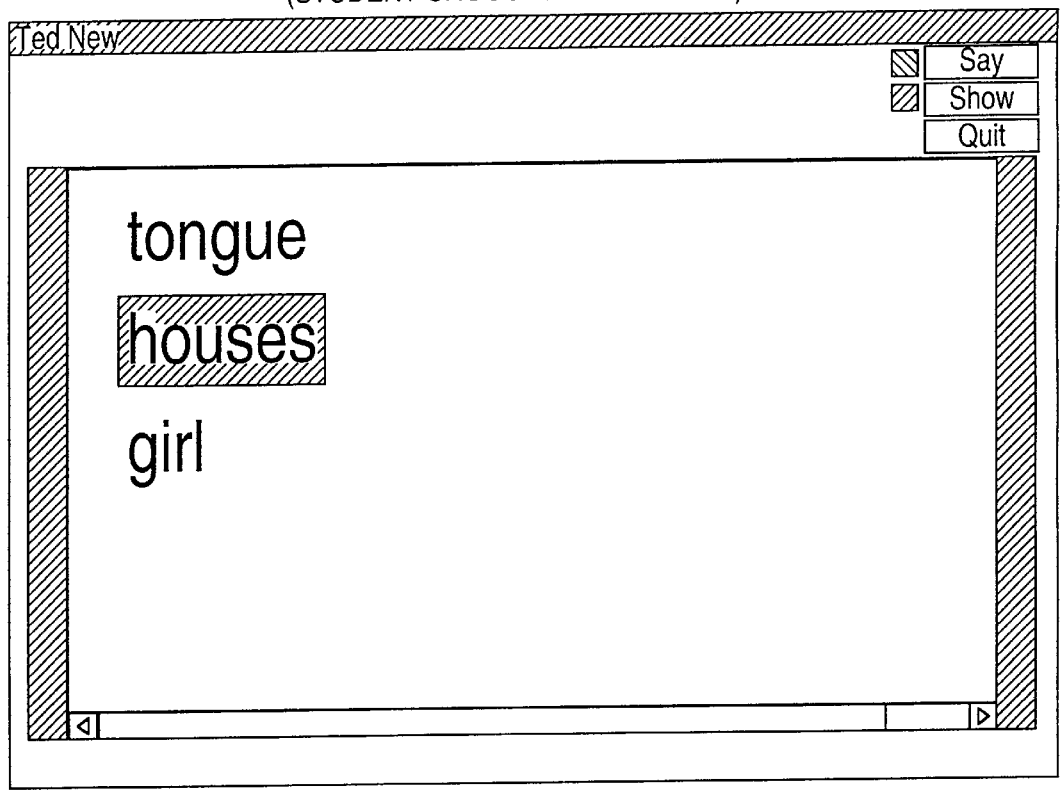

Step 150, "Determine Sequence IP's (7,8,9)" follows Step 140. This is one of three Interactive Process Types. See FIG. 7(a). The process continues with step 160.

Step 150, "Determine Sequence IP's (7,8,9)" diagrammatically shows the third IPT including each IP (7,8,9). This IPT is more particularly described in relation to FIG. 7(a) below. The process continues with step 160.

Step 160, "Message to Student", follows a yes in step 120, a yes in step 140, and follows step 150 and displays a message to the student on the display C450 for a few seconds, either "Good Job" if the trial was completed or "Quit" if the trial was not completed. The process continues with step 170.

Figure 8A:
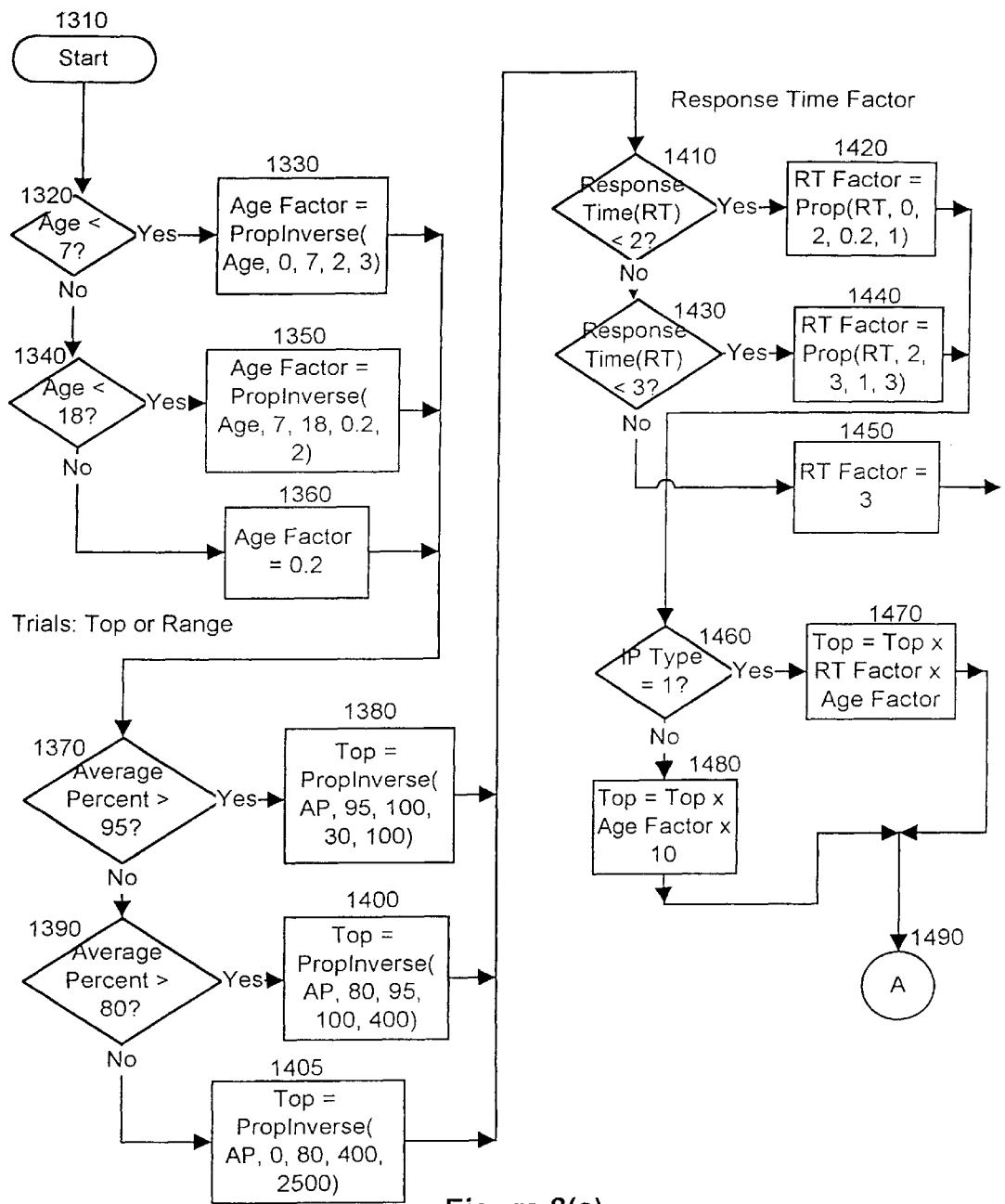
FIGS. 8(a)–(b) are high-level flow charts illustrating the adjust words in set process according to the invention that may be implemented by the computer system shown in FIG. 18.
Figure 8B:
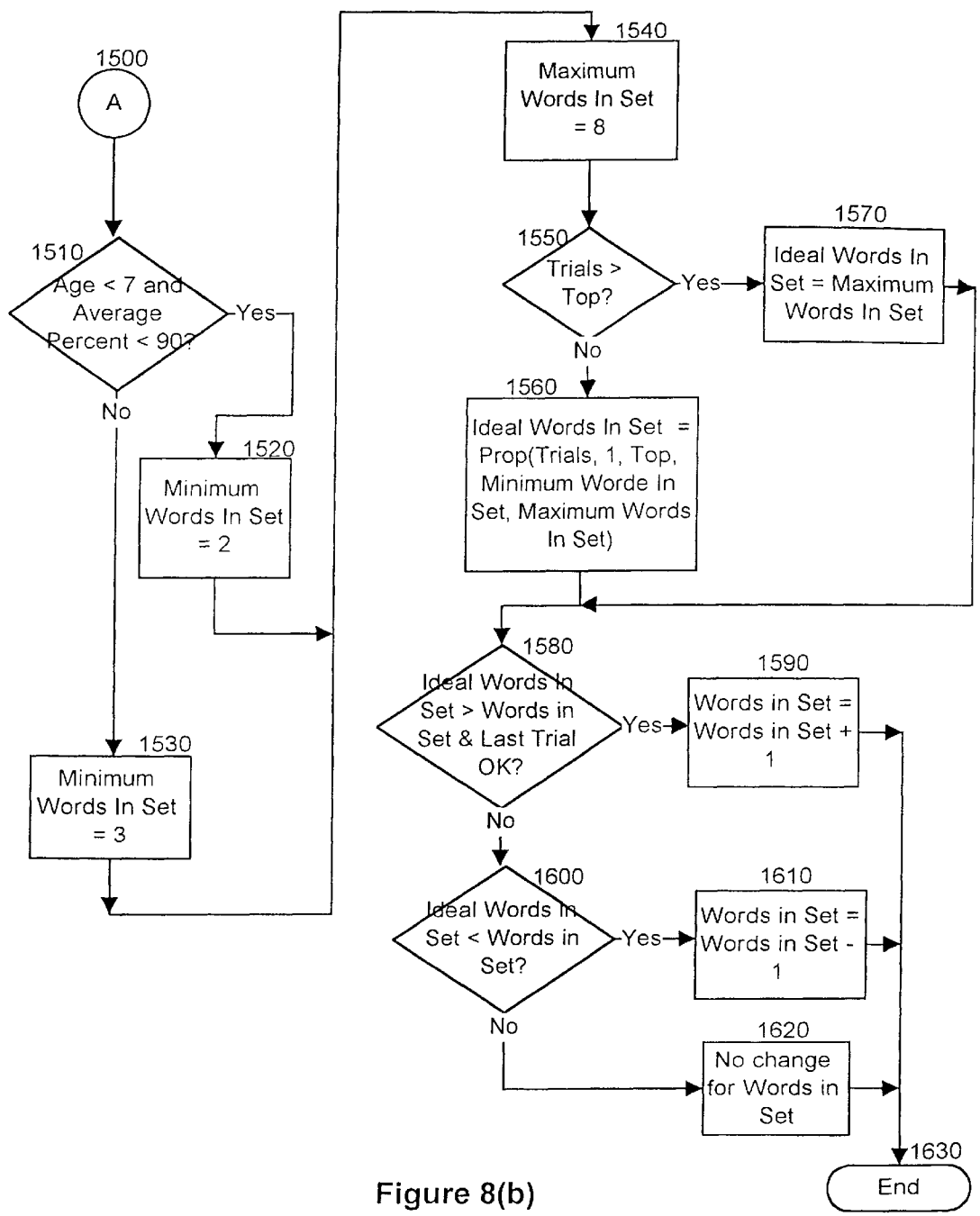
Figure 9:
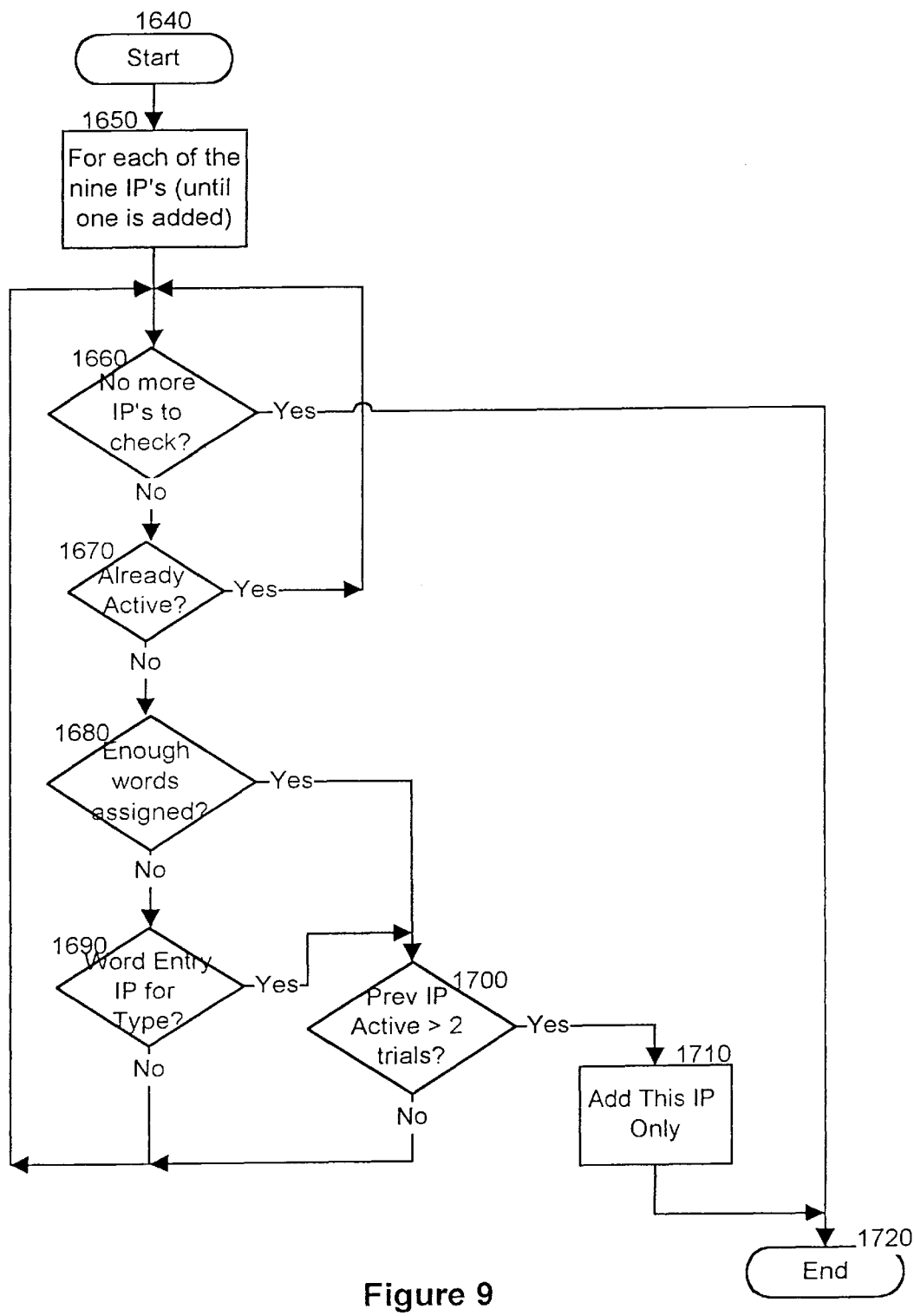
FIG. 9 is a high-level flow chart illustrating a process that activates the inventive interactive processes according to the invention that may be implemented by the computer system shown in FIG. 18.

Step 170, "Adjust Words in Set" refers to the process shown in FIGS. 8 and 9 which adjusts the words in the set of words used in the IP's according to various criteria. The process continues with step 180.

Figure 10:
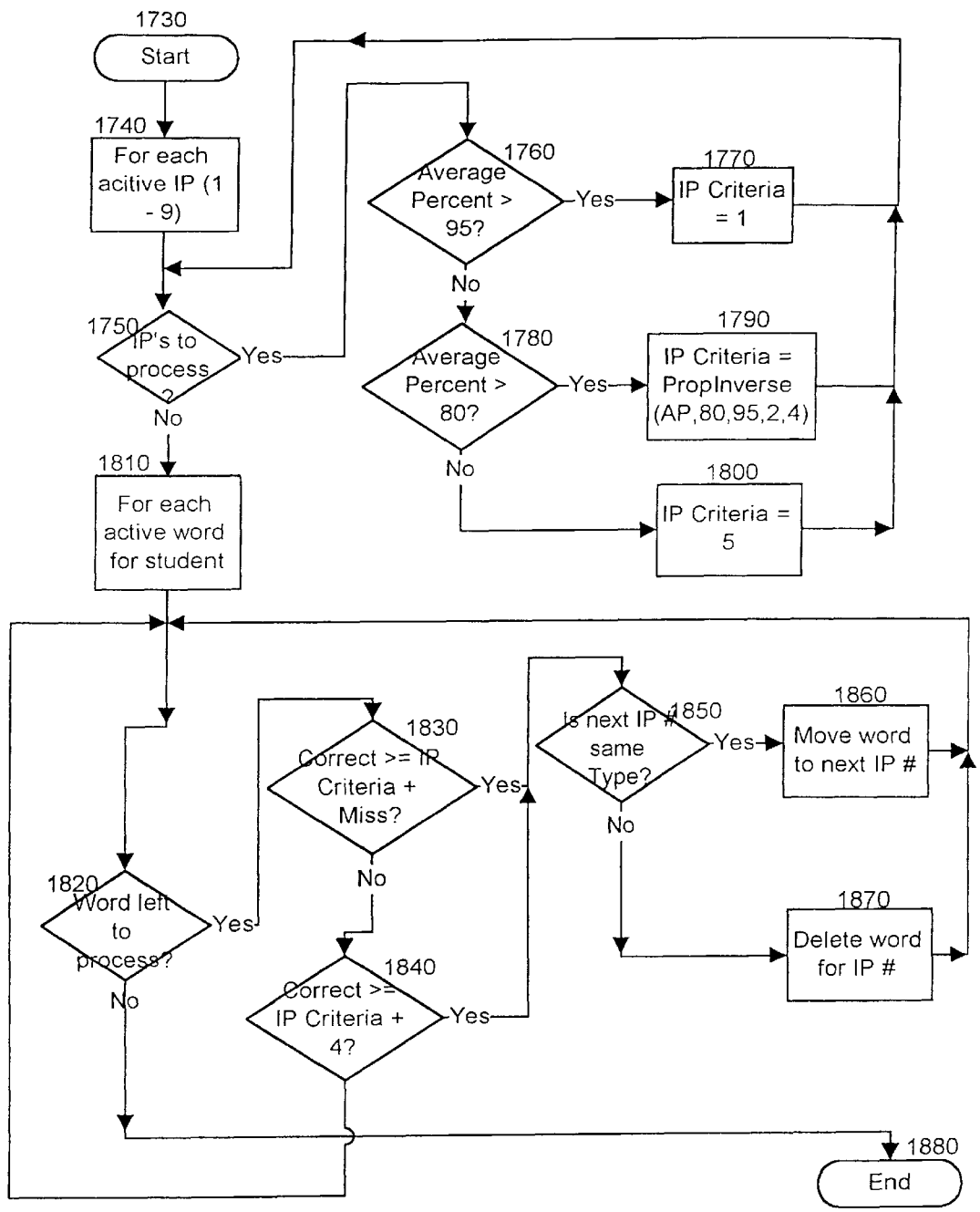
FIG. 10 is a high-level flow chart illustrating a process that moves words from one interactive process to another according to the invention that may be implemented by the computer system shown in FIG. 18.

Step 180, "Activate Interactive Process" refers to the process shown in FIG. 10 which involves possibly adding one of the nine interactive processes for the student to do on his/her next trial based on various criteria such as student performance and age. In other words, step 180 adjusts which of the nine IP's will be available for selecting and use to test the student in the next trial. The process continues with step 190.

Figure 11:
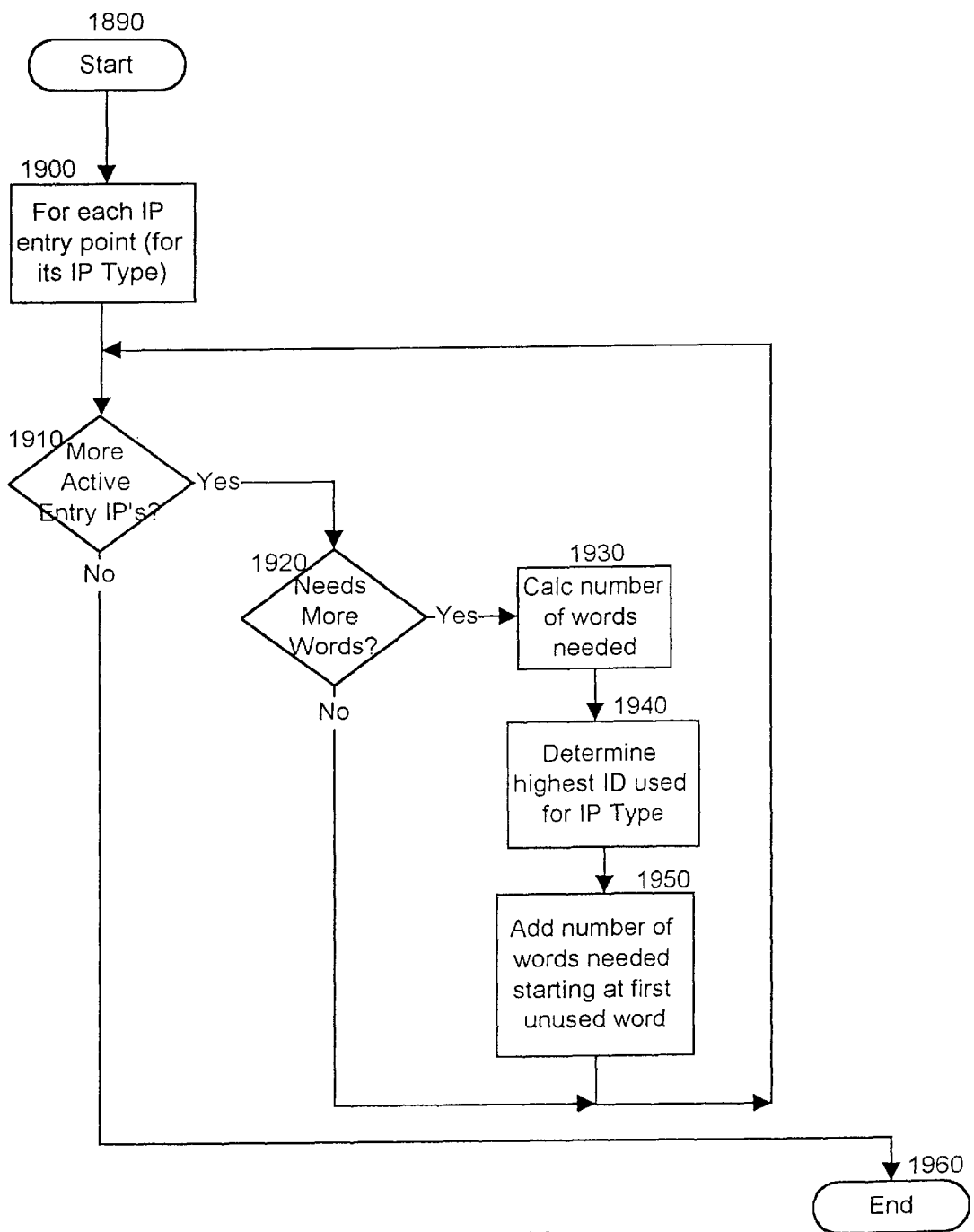
FIG. 11 is a high-level flow chart illustrating a process that adds words to the inventive interactive processes according to the invention that may be implemented by the computer system shown in FIG. 1B.

Step 190, "Move Words" refers to the process shown in FIG. 11 which involves moving words from one IP to another IP if the student has responded to the IP utilizing that word correctly the required number of times. Words are moved to a subsequent interactive process within its Interactive Process Type (IPT), or deleted if there is no IP where the word can be moved. The process continues with step 200.

Step 200, "Add Words" refers to the process shown in FIG. 11 which involves adding whatever number of words is needed to the first active IP within an IP Type. The process continues with step 220.

Step 220, "Number of Words" refers to the process shown in FIG. 1 which, involves determining the number of words for each IP Type. The process returns to step 30.

Step 230, End, is the last step in FIG. 1 and follows a yes in step 60.

Sign On Process 20

The sign on process shown as step 20 in FIG. 1 and described in more detail in FIGS. 2(*a*)–(*f*) is used to establish which student is participating in the inventive process so that individualized historical information captured during previous trials for this student can be used to precisely control current and future process interactions with the student.

The sign on process 20 determines whether the number of students is greater than the number of displayed buttons on which to place student names. The buttons as shown in FIG. 2(*c*) are a convenient way for a student to identify himself/herself to the computer C410.

If there are too many students, then the student who is signing on is prompted to enter the first few letters of his/her last name. As soon as there are enough letters to limit the list of student to available buttons, the names are placed on the buttons. At this point the student uses the mouse C435 to click his/her name on the list.

Next, the student is asked for his/her password as shown in FIG. 2(*d*). As soon as the correct password is entered, the password entry box disappears and the OK button receives the focus as shown in FIG. 2(*e*). The student clicks the OK button and the main screen is presented (FIG. 2(*f*)) with all choices activated.

Step 260. "Start", is the start of the Sign On process 20 represented in FIG. 2(*a*).

Step 270, "Activate New Student button", involves making the New Student button visible, eg, not grayed out, and ready to activate the new student process whenever the New Student Button is pressed.

Step 280, "Too many Students", is a decision point which essentially asks the question: Is the number of students that have used the process at a particular location greater than the number of buttons on which to place student names?" If one or more letters have been typed by the student in step 300, then only students whose last name begins with those letters are counted. If yes, go to step 290. If no, continue with step 310.

Step 290, "Ask for First Letters of name", follows a yes in step 280. The student who is signing on is prompted to enter the first few letters of his/her last name. The process continues with step 300.

Step 300. "Wait for character typed" follows step 290. The process pauses until a letter is typed, then continues with step 280.

Step 310, "Put student names on buttons" follows a no in step 280. Names are placed on buttons for student names. The process continues with step 320.

Step 320, "Activate Student Buttons", follows step 310. Student buttons are visible and can be pressed. The process continues with step 330.

Step 330, Wait for button press", follows step 320. The process pauses until a student name button (or other active button) is pressed by, for example, utilizing the mouse C435 to select a button shown on display C450.

Step 340, "Student Name Button Pressed". The Student name buttons can be pressed after activated in step 320. If the student name button is pressed the process moves to step 370.

Step 350, "New Student Button" is active until and unless an existing student is selected in step 340, in which case it is deactivated. Any time that the New Student Button is active, pressing it results in the new student sign on procedure. The process continues with step 390.

Step 360, "Cancel Button Pressed". The Cancel Button is always active and can be pressed at any time. The effect of pressing the Cancel Button is to immediately end the Sign On process by moving the process to step 400.

Step 370, "Deactivate New Student Button" follows step 340. The New Student button is grayed out and will not work, since it does not apply during the sign on of an existing student. The process continues with step 380.

Step 380, "Password Procedure". The student is required to enter his/her password. Failure to enter the correct password results in no one being signed on. The process continues with step 400.

Step 390, "New Student Sign On", follows step 350. New student name, date of birth, and password are entered and stored for future reference.

Step 400, "End", ends the sign on process 20 represented by FIG. 2(*a*).

Show Main Screen Process 30

The shown main screen process shown as step 30 in FIG. 1 is described in more detail in FIG. 3. The purpose of this procedure is to show the student the main options available and to respond to student choices.

The shown main screen process 30, as shown in FIG. 3, begins with start step 410 and then continues with step 420.

Step 420, "Activate Sign On and Exit Buttons", makes these buttons visible on the display C450, eg. not grayed out and ready to respond if pressed. The process continues with step 430.

Step 430, "Program Starting", is a decision point. If the process is just starting, the answer is yes, and the process moves to step 440, "Sign On". Otherwise, the answer is no and the Sign On procedure is skipped.

Step 20, "Sign On", follows a yes in step 430. The student is identified in the Sign On procedure 20 as described above in relation to FIG. 2(*a*).

Step 450, "Student Signed On", is a decision point. If yes, there is a student signed on, step 460 (Activate Start, Password, and Preview Buttons) is performed. If no, there is not a student signed on. This would happen if the cancel button were pressed during the Sign On procedure. A no for step 450 results in step 470, Deactivate Start, Password and Preview Buttons; the procedures associated with these buttons depend upon an identified student.

Step 480, "Calculate student performance and display", follows step 460 and step 470. Calculations are based on data captured from previous trials. Numbers calculated include total trials completed by this student, number of trials completed this month and this week. The number days since a trial was completed is calculated and displayed if the number is greater than one. Level is determined from the total number of points to date for the student.

Step 490, "Wait for Button to be pressed", follows step 480. Any active button can be pressed at any time. The pressing of an active button is necessary and sufficient to continue the process.

Step 500, "Start Button Pressed", is a decision point and follows step 490. If yes (the Start Button was the button pressed), do step 555, Exit, which directs the process to step 40 of FIG. 1.

Step 510, "Sign On Pressed", is a decision point and follows a no in step 500. If yes (the Sign On button was the button pressed), do step 20, the Sign On procedure explained above in reference to FIG. 2 and then return to step 420 of FIG. 3.

Step 520, "Password Pressed", is a decision point and follows a no in step 510. If yes (the Password button was the button pressed), do step 525, Password Change.

Step 525, "Password Change" follows step 520. The student can change his/her password by entering the old password, then entering a new password twice. The process then returns to step 420.

Step 530, "Preview Pressed", is a decision point and follows a no in step 520. If yes (the Preview button was the button pressed), do step 80 as described in relation to FIG. 2 above and then return to step 420.

Step 550, "Exit Button Pressed", follows step 510. If The Exit button has been pressed, do step 555, Exit. This sequence returns to Overview (FIG. 1) and results in exiting the entire program.

Preview Procedure 80

Figure 4:
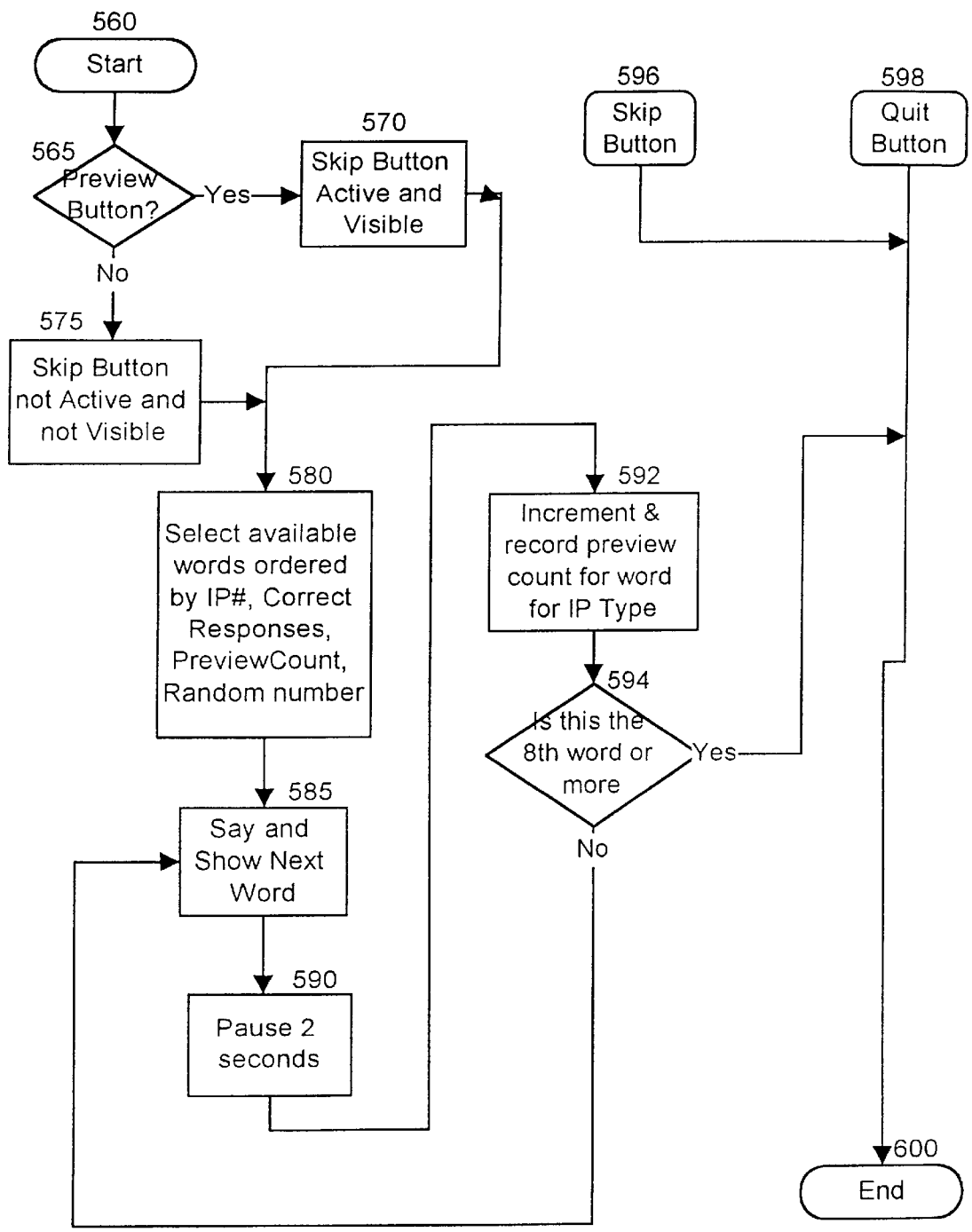
FIG. 4 is a high-level flow chart illustrating a preview mode according to the invention that may be implemented by the computer system shown in FIG. 18.

The preview procedure shown as step 80 in FIG. 1 is described in more detail in FIG. 4.

The preview procedure 80 lets the student see words and hear them pronounced without having to make any response and without effecting any process behavior or scoring. The preview process is activated when the student presses the Preview Button from the Main Screen. It is also activated for certain, selected students (eg. younger students or student with less than top Average Percentages) as the first process after the Start Button 10 is pressed.

When the preview procedure 80 is activated automatically after the Start button is pressed, a Skip button 596 is visible. The Skip button 596 allows the student to skip the Preview and continue with the trial without penalty.

Furthermore, If the Quit button 598 is pressed, the trial ends by proceeding to end step 600 as shown in FIG. 4.

The Preview button can be pressed as many times as the student chooses. Each time the preview button is pressed, eight words are said and shown, then the focus returns to the main screen. If the Quit button 9 is pressed, the Preview ends immediately.

Step 560, "Start", begins the preview procedure 80 shown in FIG. 4.

Step 565, "Preview Button" follows step 560 and is a decision point which asks the question: "Was the preview process activated by the student pressing the Preview Button from the Main Screen?" If yes, go to step 570. If no, go to step 575.

Step 570, "Skip Button Active and Visible" follows a yes in step 565. The skip button 596 is made visible and activated. The skip button 596 will allow a student who did not choose the Preview procedure to skip it without penalty. The process continues with step 58C.

Step 575, "Skip Button not Active and not Visible" follows a no in step 565. Because the student chose the preview procedure from the main screen, the skip button 596 is hidden. The Quit button 598, however, remains active. The process continues with step 580.

Step 580, "Select available words ordered by IP#, Correct Responses, Preview Count, Random Number" follows steps 570 and 575. Words appropriate to the data-driven IP behavior that can be previewed are selected in step 580. The process continues with step 585.

Step 585, "Say and Show Next Word" follows step 580. The next word from the group of words selected in step 580 is said and shown. The process continues with step 590.

Step 590, "Pause 2 seconds" follows step 585. The length of time from the beginning of one word to the beginning of the next word is preferably about two seconds and can be adjusted appropriately. The process continues with step 592.

Step 592, "Increment and Record preview count for word for IP Type" follows step 590. The number of times a word is previewed within an IP Type is recorded. Preview count effects whether and when a word will be previewed again. The process continues with step 594.

Step 594, "Is this the $8^{th}$ word or more?" follows step 592 and is a decision point which presents the question: "Is this at least the $8^{th}$ word?" If yes, the process goes to step 600, ending the preview procedure 90 shown in FIG. 4. If no, the process returns to step 585 to Say and Show the next word.

Step 596, "Skip Button" can be pressed any time it is active, as determined in step 565. If the skip button is pressed the preview procedure 80 stops immediately, but any other scheduled processes continue. The process continues with step 600.

Step 598, "Quit Button" 9 can be pressed any time. The Quit Button 9 is always active. If the Quit Button 9 is pressed, the Preview procedure 80 stops immediately and any other scheduled processes are cancelled. If the Quit button 9 is pressed when the Preview Procedure 80 did not start from the Preview button, then an incomplete status is given to the student. The process continues with step 600.

Step 600, "End", ends the preview procedure 80 represented by FIG. 4.

Choose From List: Interactive Process Type 1

Choose From List 110 is an IPT in which a list of words is shown continuously to the student during the testing procedure. Preferably, the list of words includes two to eight words. The choose from list IPT 110 includes three interactive process differing mainly by whether a target word from the list is either (1) shown and said, (2) shown only, or (3) said only.

The student must then select the target word from the displayed list by, for example, pointing with the mouse C435 and pressing a button on the mouse C435 when the cursor is over the correct word in the list.

When the target word is spoken and shown, it familiarizes the student with the word and makes it likely that a student totally unfamiliar with the word will be able to respond correctly and gain experience with the word.

When the target word spoken only, it gives reasonable assurance that the student is familiar with the word and/or the phonics of the word.

The target word, shown only for a short period of time (show interval), assures the student's quick and accurate visual perception of the word.

Figure 5A:
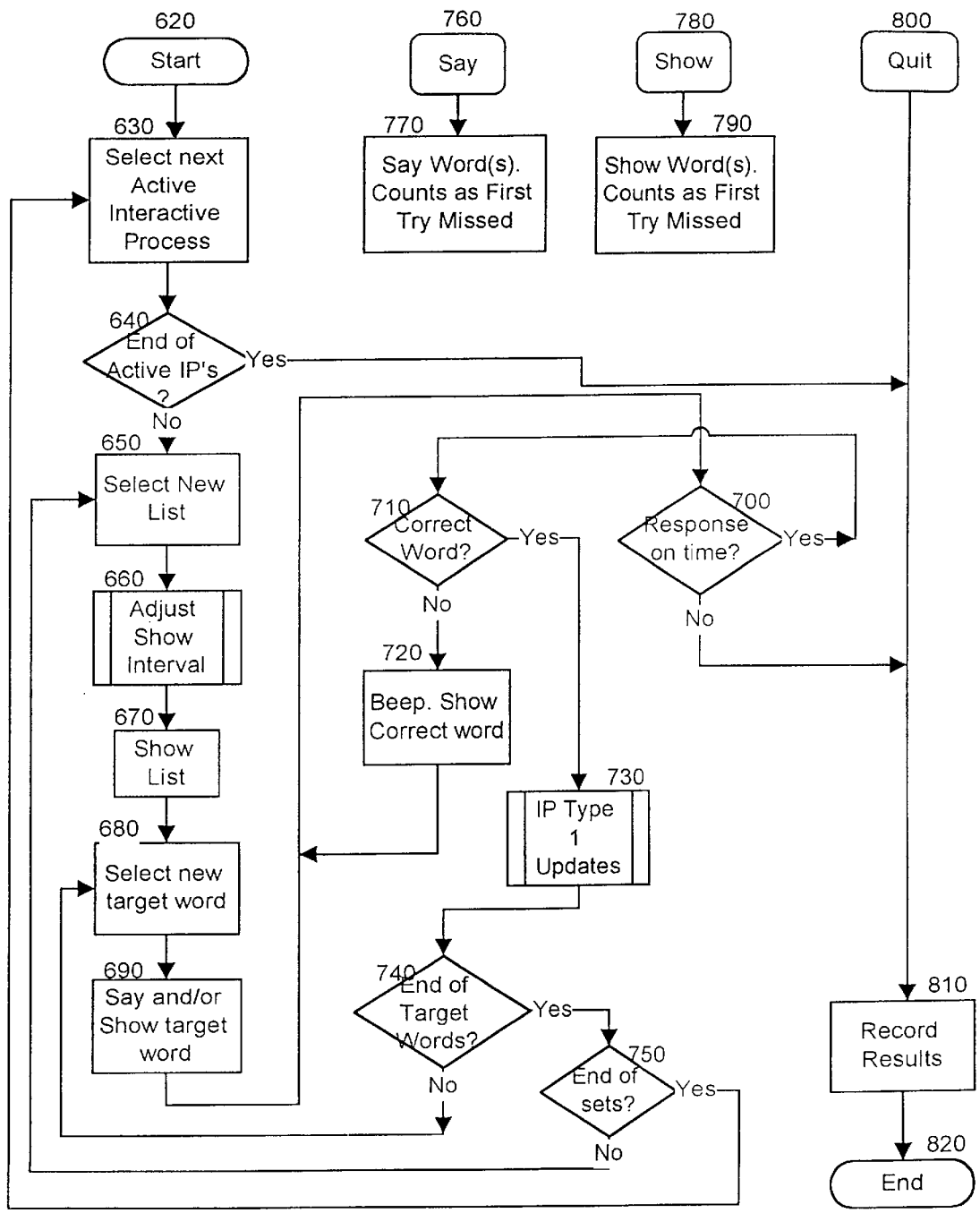
FIG. 5(a) is a high-level flow chart illustrating the Choose From List interactive process according to the invention that may be implemented by the computer system shown in FIG. 18.
Figure 5B:
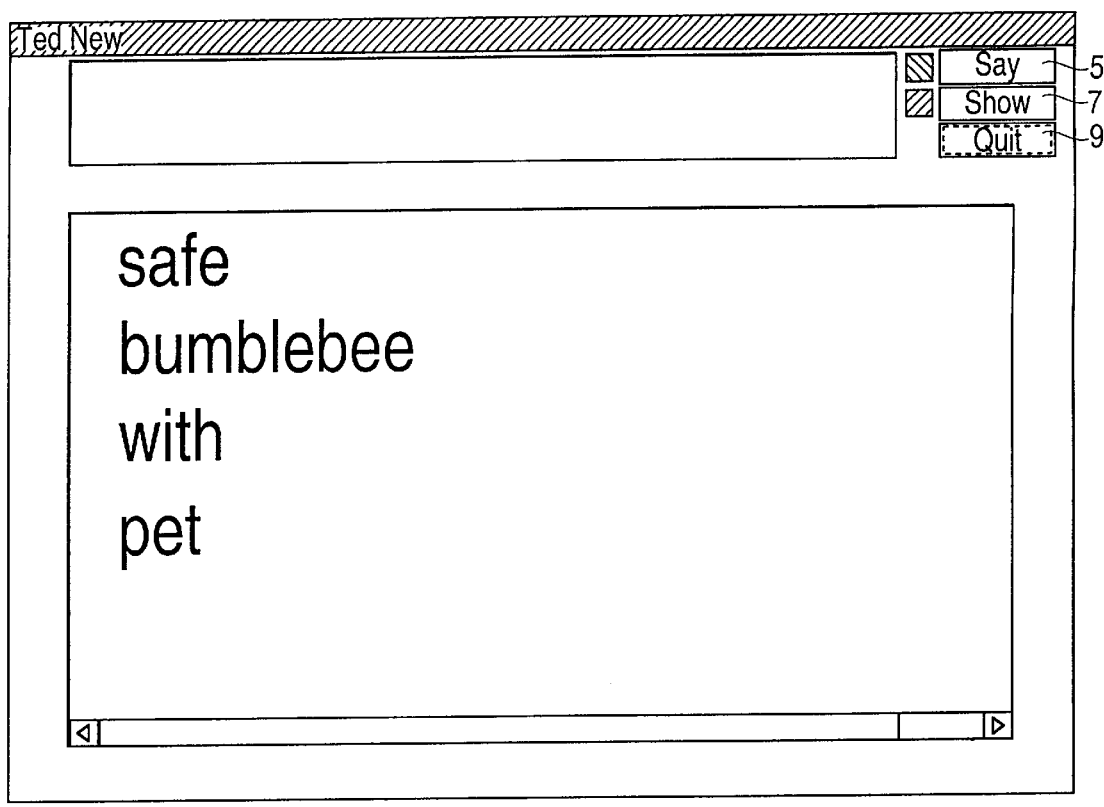
FIGS. 5(b)–(j) are examples of screen displays that may be generated by the Choose From List interactive process of FIG. 5(a)
Figure 5C:
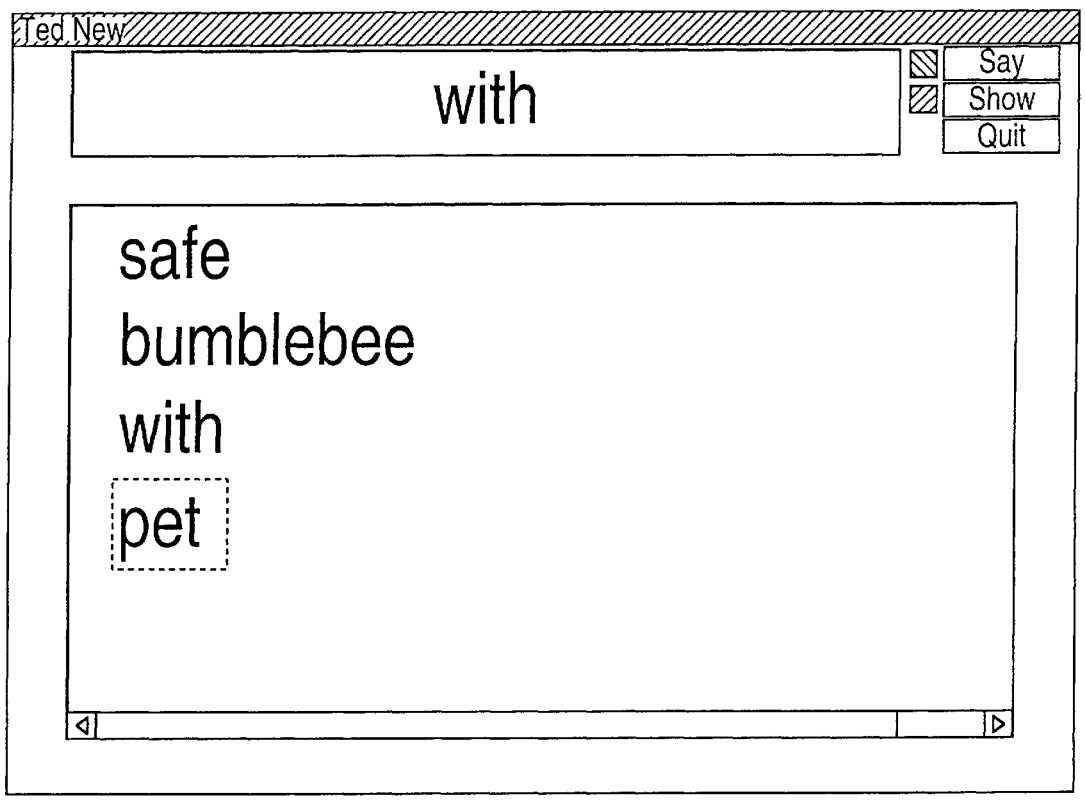
Figure 5D:
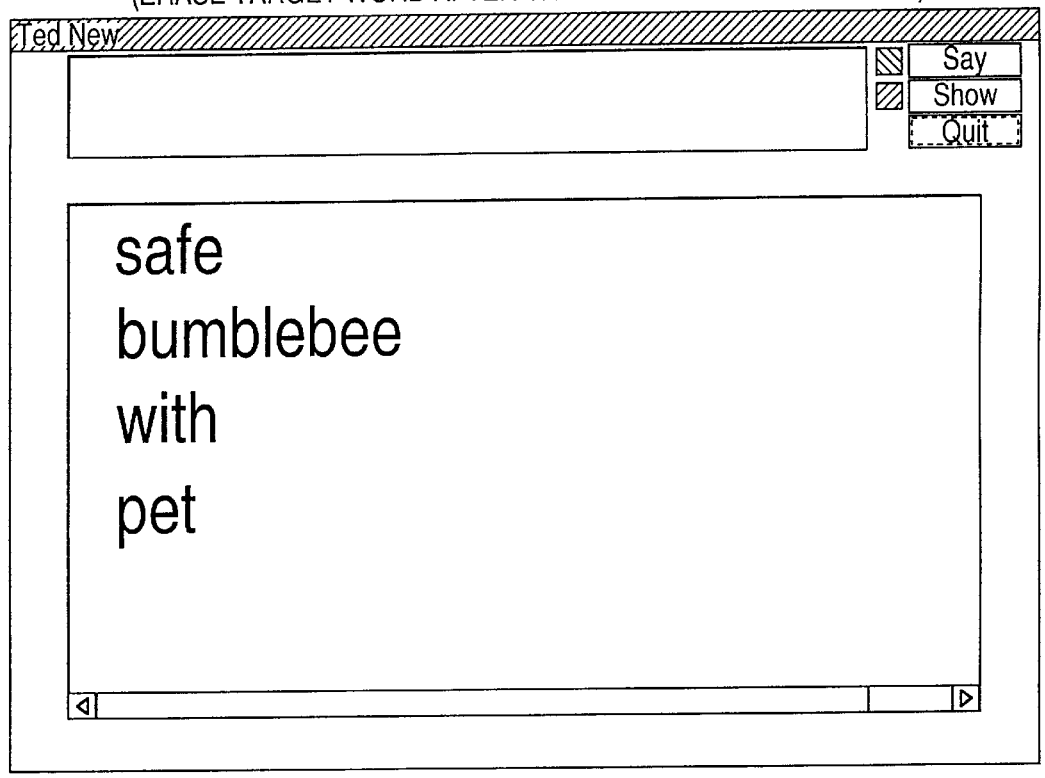
Figure 5E:
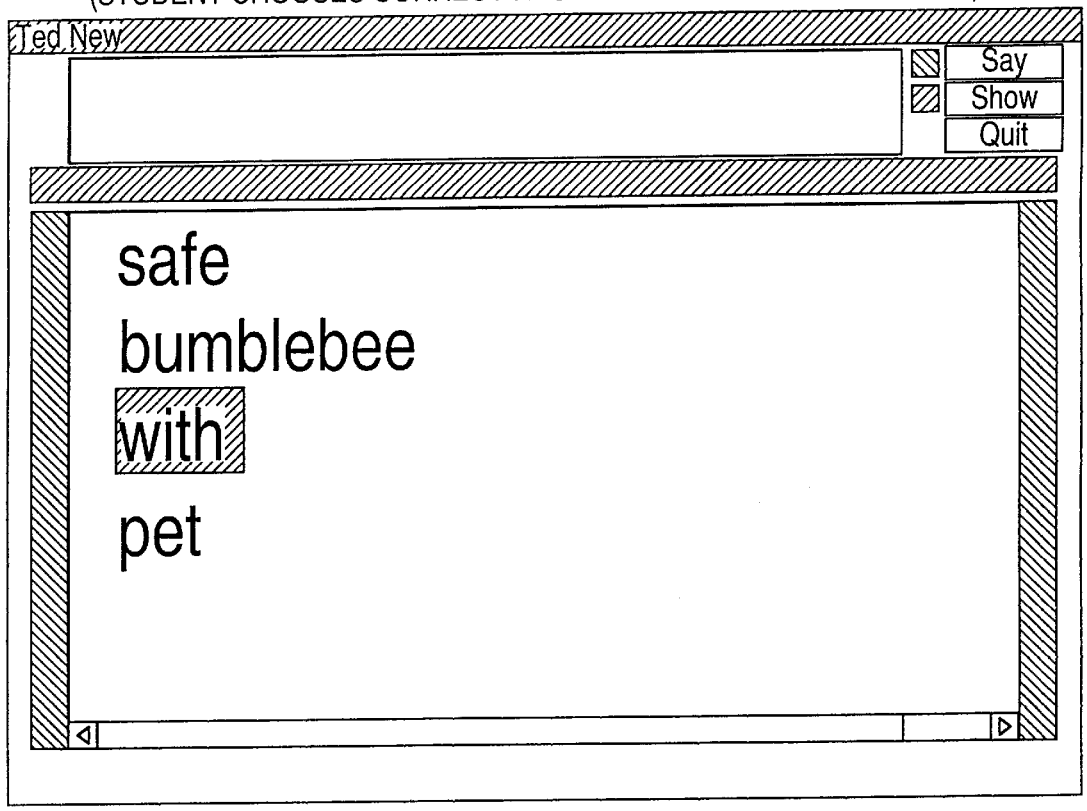
Figure 5F:
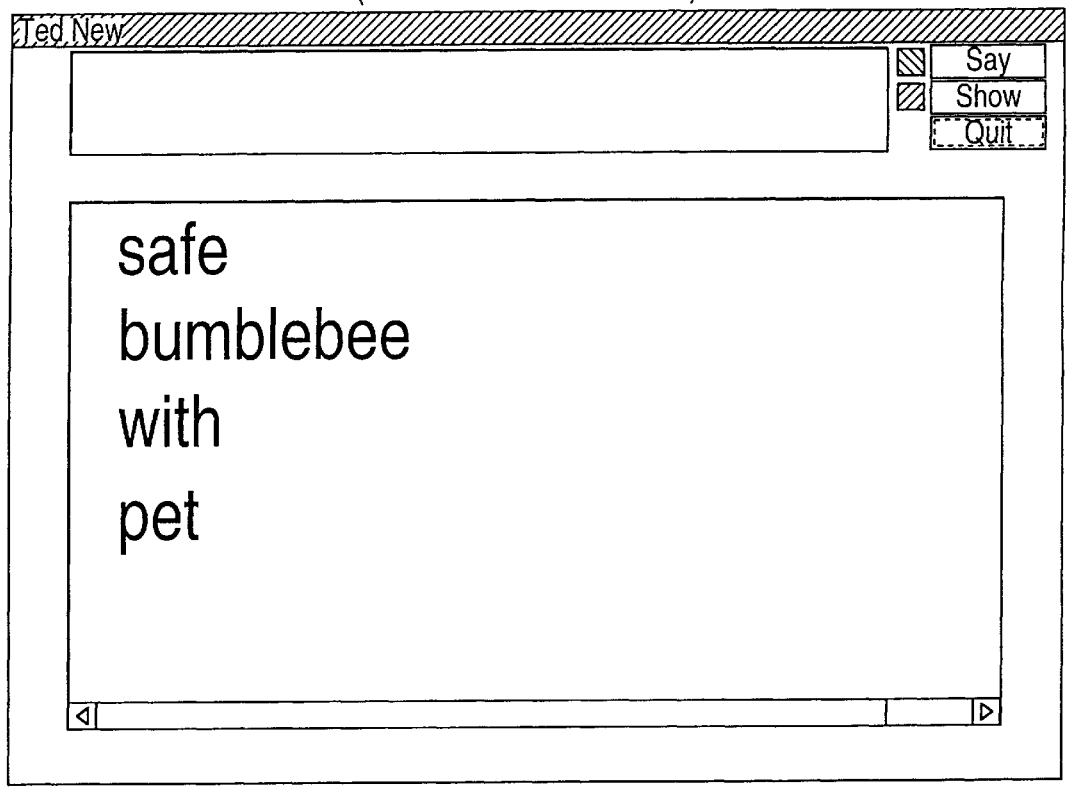
Figure 5G:
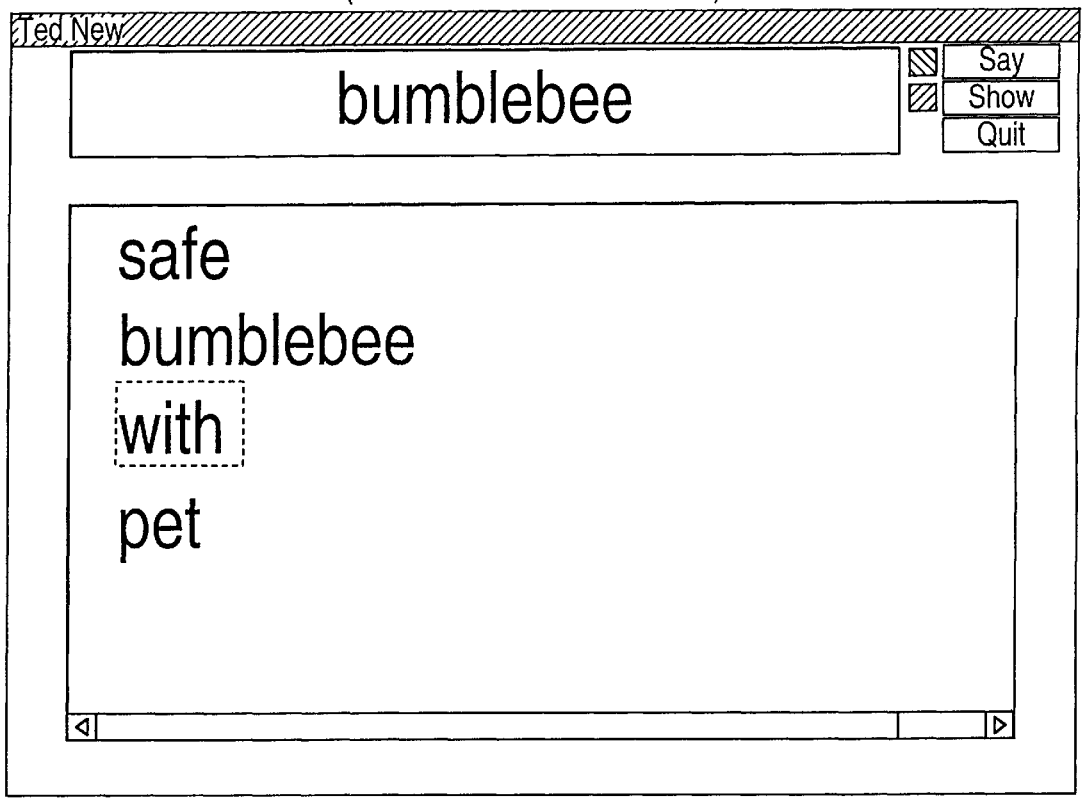
Figure 5H:
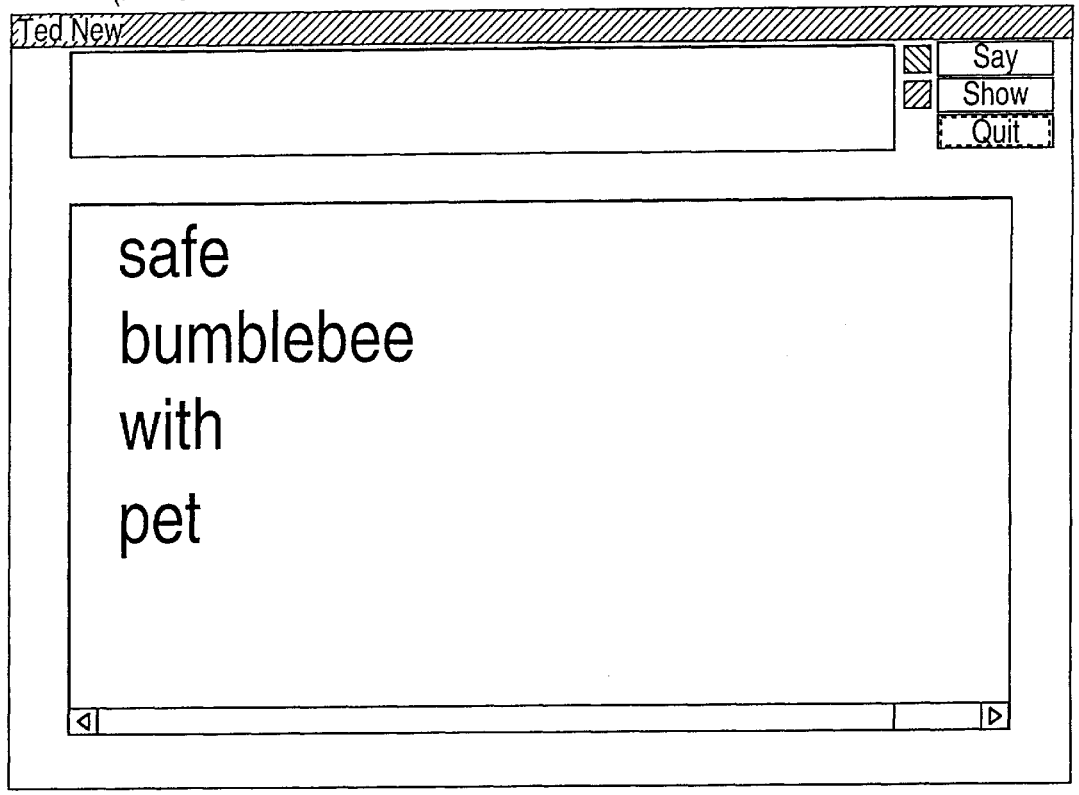
Figure 5I:
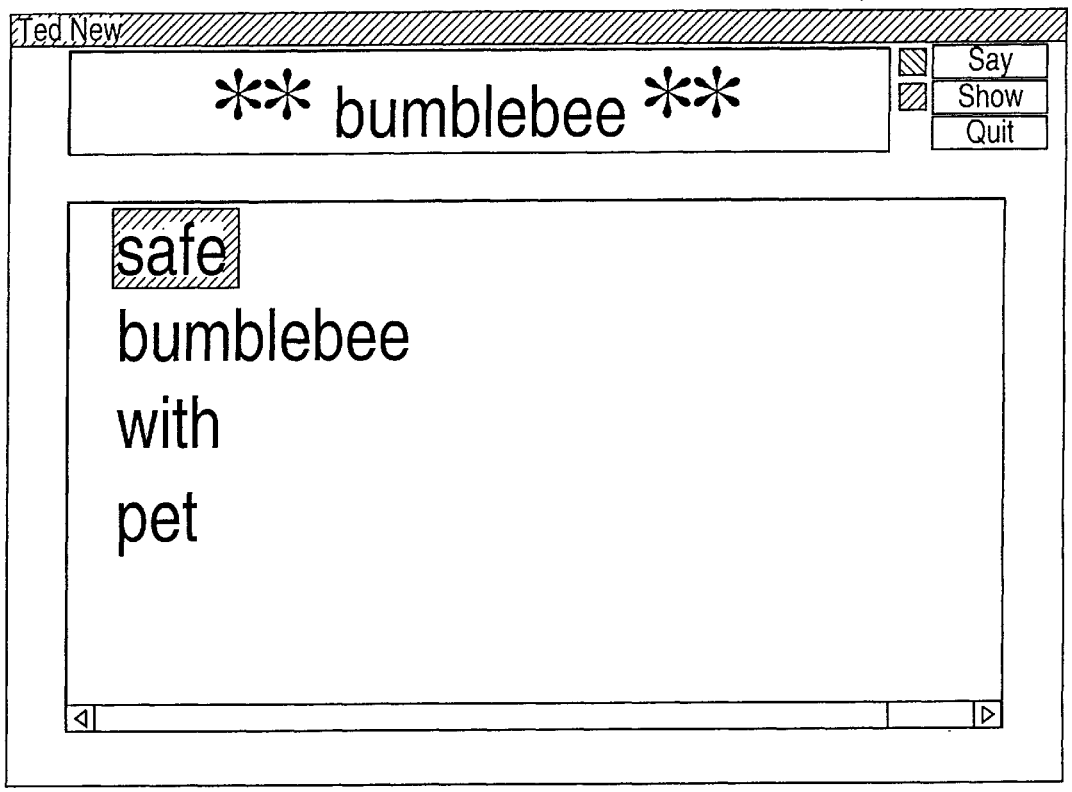
Figure 5J:
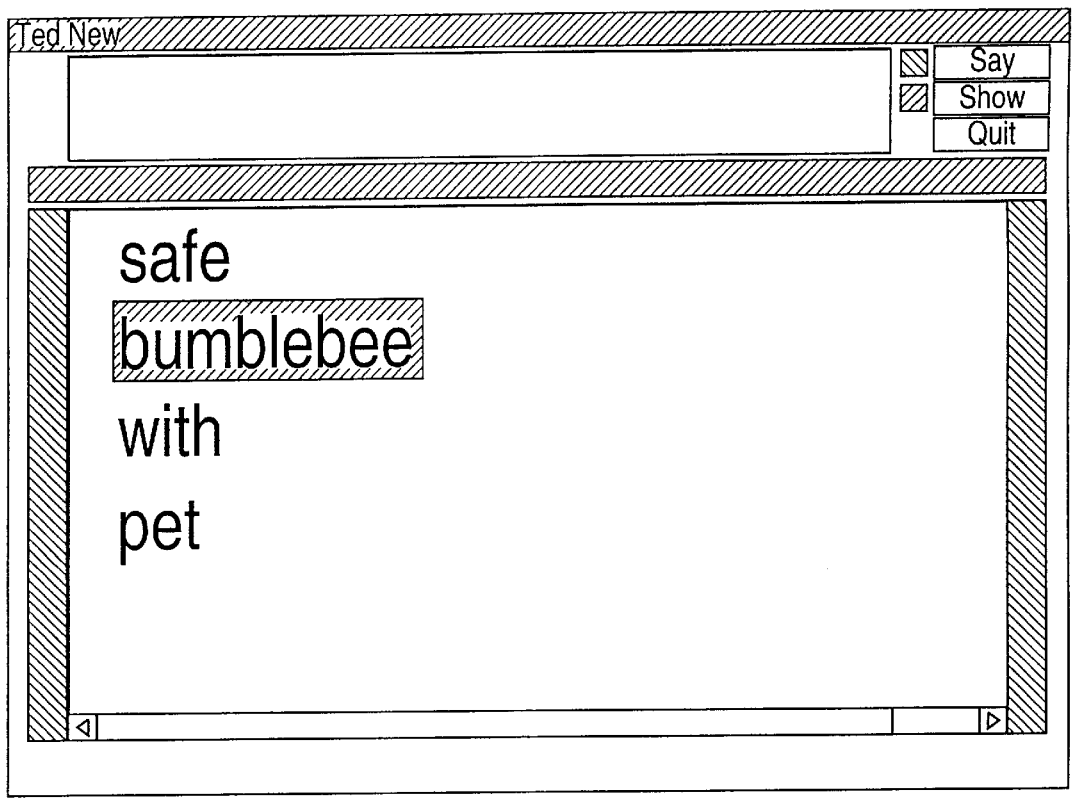

The choose from list IPT 110 may be implemented as diagrammatically shown in FIG. 5(a).

Step 620, "Start", is the beginning of the Choose from List IPT 110 as shown in FIG. 5(a).

Figure 12A:
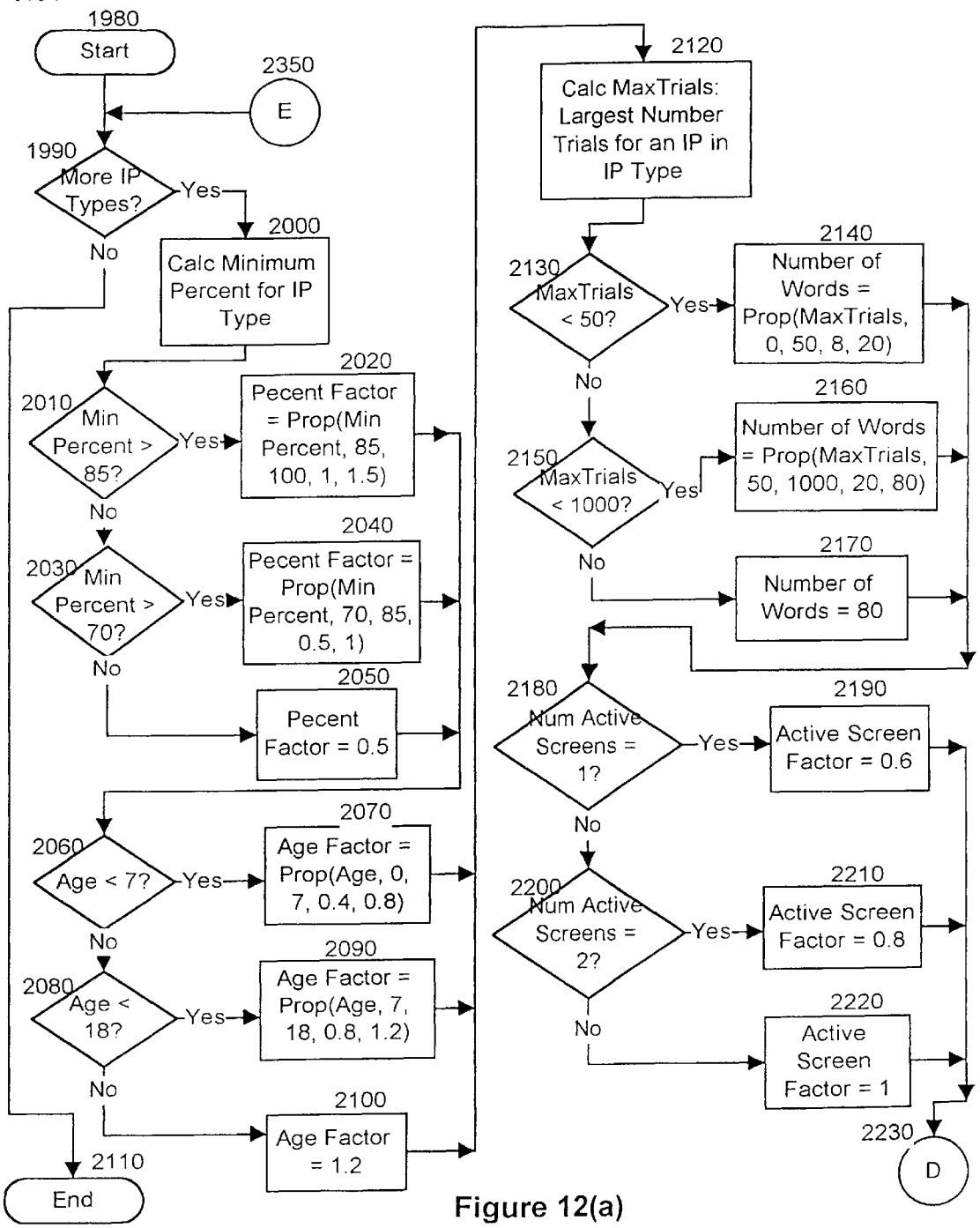
FIGS. 12(a)–(b) are high-level flow charts illustrating a process that determines the number of words for each inventive interactive process according to the invention that may be implemented by the computer system shown in FIG. 18.
Figure 12B:
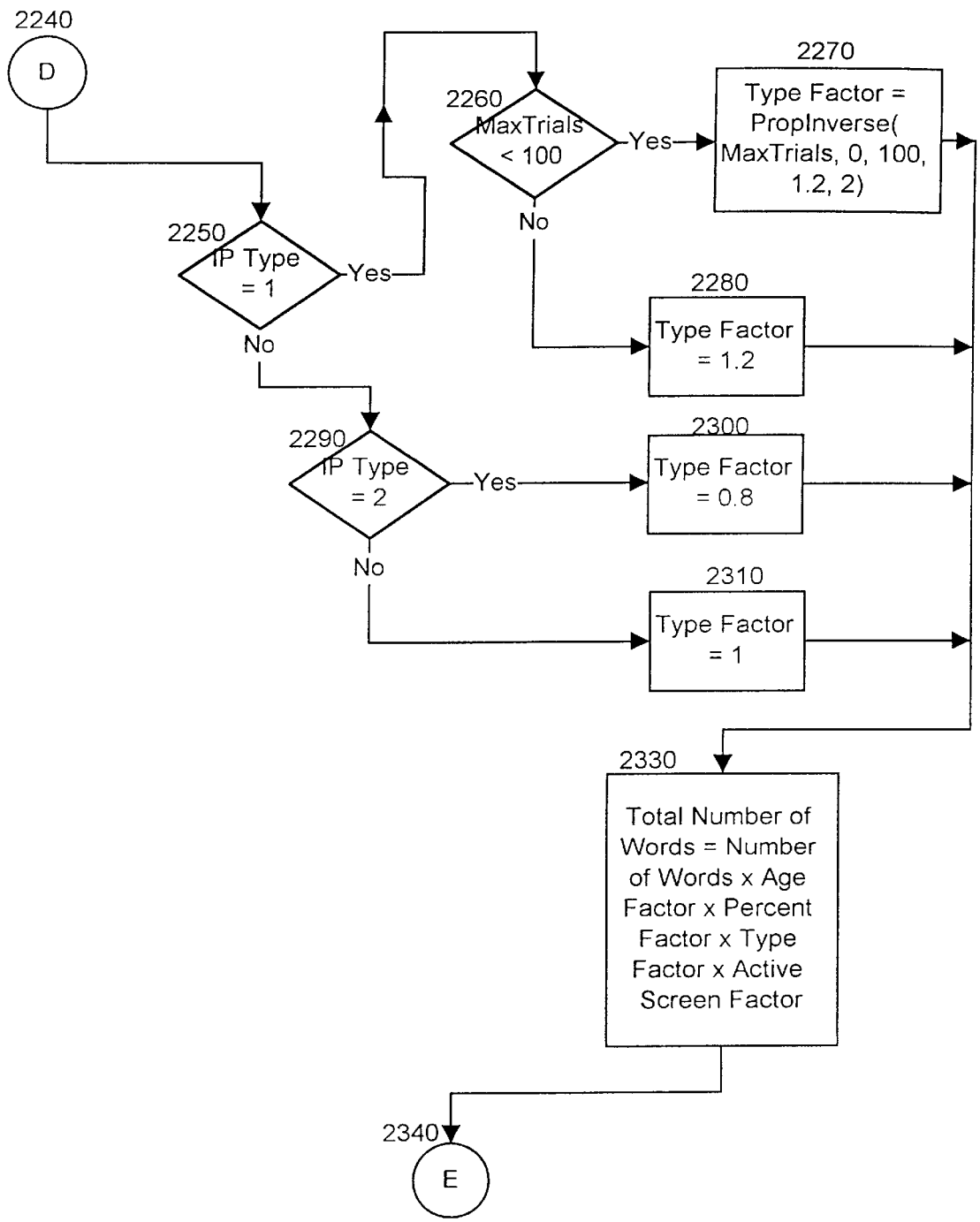

Then step 620 select the next active interactive process within IPT 110. There are three Interactive Processes, IP#1, IP#2, and IP#3, in the Choose from List IP Type 110 corresponding to said and show, said only, and shown only, respectively. Activation of an IP has already occurred at this point. Activation occurs after the end of each trial, or by age defaults, if this is the first trial. For details, see Activate Interactive Processes procedure 180 (FIG. 10), Move Words procedure 190 (FIG. 11) and Add Words procedure 200 (FIG. 12). Step 630 simply selects in sequence the next active IP for this student.

Step 640, "End of Active IP's", follows step 630 and is a decision point which asks the question: "Are there any more active IP's to process?" If yes, continue with step 650. Otherwise, the answer is no, the process goes to step 810 to Record Results before exiting Choose from List procedure 110.

All words in a given list will be either said and shown, said only, or shown only, depending on which of the three Interactive Processes is presently being processed (IP#1, IP#2, or IP#3, respectively).

Step 650, "Select New List" selects a new list of words for the current IP. The list of words is selected based on previous trails (or age defaults if this is the first trial) and by taking the next number of words needed in random order. See steps 170, 180, 190, 200 and 220 in FIG. 1 for determination of what words go to each Interactive Process and under what conditions. The process continues with step 660.

Step 660, "Adjust Show Interval", follows step 650. Show Interval is the length of time in milliseconds the target word is displayed when the word is shown during the IP's. For details of the adjust show interval procedure 660, see FIG. 16(*b*). The process continues with step 670.

Step 670, "Show List", follows step 660 and displays the list of words selected in step 650 to the student on the display C450. The process continues with step 680.

FIG. 5(*b*) is an example of a screen display that results from step 670 and illustrates a displayed list of words (safe, bumblebee, with, and pet). FIG. 5(*b*) also illustrates the Say button 5, Show button 7, and Quit button 9 which are explained with reference to steps 760, 780 and 800, respectively.

Step 680, "Select new target word", follows step 670. New target words are randomly selected from among words in a list; words, which have not been selected for this IP during this trial, are given a higher priority of being selected than words which have not been just used as target words. The process continues with step 690.

Step 690, "Say and/or Show Target Word", follows step 680 and communicates the target word to the student. The Interactive Process which is being used determines whether each word is said, shown, or both. (IP#1=Say and Show, IP#2=Say Only, IP#3=Show Only).

FIG. 5(*c*) is an example of a screen display that illustrates the Show-type of communication of the target word (with). The target word is momentarily displayed as illustrated by the displayed target word (with) in FIG. 5(*c*) and the subsequent screen display of FIG. 5(*d*) in which the target word is no longer displayed.

Step 690 also starts a response time counter that may be implemented with the clock C510 shown in FIG. 18. The response time counter determines how fast the student responds to the IP. The process continues with step 700.

Step 700, "Response on time", follows step 690 and is a decision point which determines if the student's response to the IP is fast enough. As mentioned above, response timer begins elapsing when the target word is said and/or shown in step 690. If the end of the allotted time period occurs before the student responds, the answer is no to step 700, the response is counted as incorrect, and the procedure ends with a recordation of the students performance in record results step 810. If the student responds within the allotted time, the process continues with step 710.

The preferred allotted time period is 10 seconds for students age 10 and above and 10 to 25 seconds for students less than age ten with the allotted time inversely proportional to age between 0 and 10 years.

Step 710, "Correct Word", follows a yes in step 700 and is a decision point based on whether the word the student chose is the correct word. If no, then the process goes to step 720. If yes, the process continues with step 730.

FIG. 5(*e*) is an example of a screen display that illustrates a student correctly selecting the target word (with) from the displayed list of words. As the student manipulates the input device C440 and/or mouse C435, one of the words in the list is demarcated using, for example, highlighting as shown in FIG. 5(*d*). Further manipulation by the student, such as pressing a button on the mouse C435, will cause the highlighted word to be selected as the student's response.

As further shown in FIG. 5(*e*), when the student selects the correct word (target word) from the displayed list of words, positive feedback is provided to the student. FIG. 5(*e*) illustrates one type of positive feedback which includes a visual indicator having two components: the horizontal bar provides response time feedback whose length is inversely proportional to the response time and the vertical bar provides feedback of a correct response.

Auditory feedback may also be used in place of or in combination with the visual feedback.

Step 720, "Beep, Show Correct Word", follows a no in step 710. The process beeps at, or otherwise provides negative auditory feedback to the student, and shows the correct word at the top of the viewing area. The process then returns to step 700 to await a correct response within the allotted time.

The series of exemplary screen displays beginning at FIG. 5(*f*) further illustrates the Choose From List IP: FIG. 5(*f*) illustrates the initial display of the list of words (safe, bumblebee, with, pet); FIG. 5(*g*) illustrates communication of a new target word (bumblebee) via the Show process; FIG. 5(*h*) illustrates erasing the target word after the show interval has expired to effect a momentary display of the target word; FIG. 5(*i*) illustrates an incorrect response of the student who selected "safe" instead of the target word "bumblebee" and the result which displays the correct target word; and FIG. 5(*j*) illustrates the student's second (correct) response to the IP.

Step 730, "IP Type 1 Updates", follows a yes decision in step 710 and updates the choose from list IP type procedure. In general, the IP type 1 update procedure 730 adjusts the process behavior according to the student's performance to further accomplish the data driven aspects of the invention. See FIG. 15 for details of the IP Type 1 Update procedure 730. The process continues with step 740.

Step 740, "End of Target Words", follows step 730 and is a decision point which presents the question: "Has the number of target words already given to the student, reached the total number to be given for the set?" The number of target words is preferably a random number between the number of words in the set and one less than the number of words in a set determined before the set starts. Every word that is not answered correctly adds one to the total number of target words for the set. For example, if the words in a set is 5, then initially the number of target words is either 4 or 5. When the student misses a word, the number of target words is increased by one. If the answer to step 740 is yes, the process continues with step 750. Otherwise, the answer is no and the process returns to step 680.

Step 750, "End of Sets", follows a yes response to step 740. Step 750 is a decision point which presents the question is "Are there more sets of words left to process?" The total number of sets to process is determined following the previous trial, or by age defaults if this is the first trial. A yes response to this step results in the process returning to step 630, a no response returns the process to step 650.

Step 760, "Say", occurs whenever the say button 5 is pressed. This step can occur at any time and interrupts whatever is in process to pronounce the target word by, for example, reading a stored sound file in memory 415 or mass storage device C420 a playing the read file over speaker C490 and/or headphone C495. After step 760, step 770 is executed and then a return to the point in the process in effect at the start of step 760.

Step 770, "Say Word(s). Counts as First Try Missed." follows step 760. Because the student asked for assistance by having the computer pronounce the active or target word for the student, the active word will be counted as incorrect on the first try. The process then returns to the point in effect at the start of step 760.

Step 780, "Show", occurs whenever the show button 7 is pressed. This step can occur at any time and interrupts whatever is in process. Step 780 results first in step 790, then in a return to the point in the process in effect at the start of step 780.

Step 790, "Show Word(s). Counts as First Try Missed." follows step 780. Because the student asked for assistance by having the computer display the active word is shown to the student, the active word will be counted as incorrect on the first try. The process then returns to the point in effect at the start of step 780.

Step 800, "Quit", occurs whenever the Quit button 9 is pressed. This step can occur at any time and interrupts whatever is in process. Quit step 800 results in an immediate end to the current Interactive Process and any other scheduled Interactive Processes. The trial is counted as incomplete for the student. step 810 follows this step.

Step 810, "Record Results", is done at the end of Choose from List IPT for all Interactive Processes done, whether the IP's were completed, incomplete because of student performance problems, or incomplete because the Quit button 9 was pressed. Step 810 is simply the recording of student responses in sufficient detail for all calculations, setup of the next trial, and reports. Step 820, End, follows step 810 and ends the choose from list procedure 110.

Fill in Letter Blanks: Interactive Process Type 2

Fill in Letter Blanks 130 is an Interactive Process Type in which a student types in the letters corresponding to blanks which have been substituted for letters in a word.

Fill in Letter Blanks 130 includes three interactive processes differing mainly by whether a target word is first (1) shown and said, (2) shown only, or (3) said only.

When the target word is spoken and shown, the process familiarizes the student with the word and makes it more likely that a student who does not know the word will be able to respond correctly and gain experience with the word.

When the target word is spoken only, the student never sees the letters that he/she must type, which requires greater familiarity with the word.

The target word shown only for a short period of time, assures the student's quick and accurate visual perception of the word.

Figure 6A:
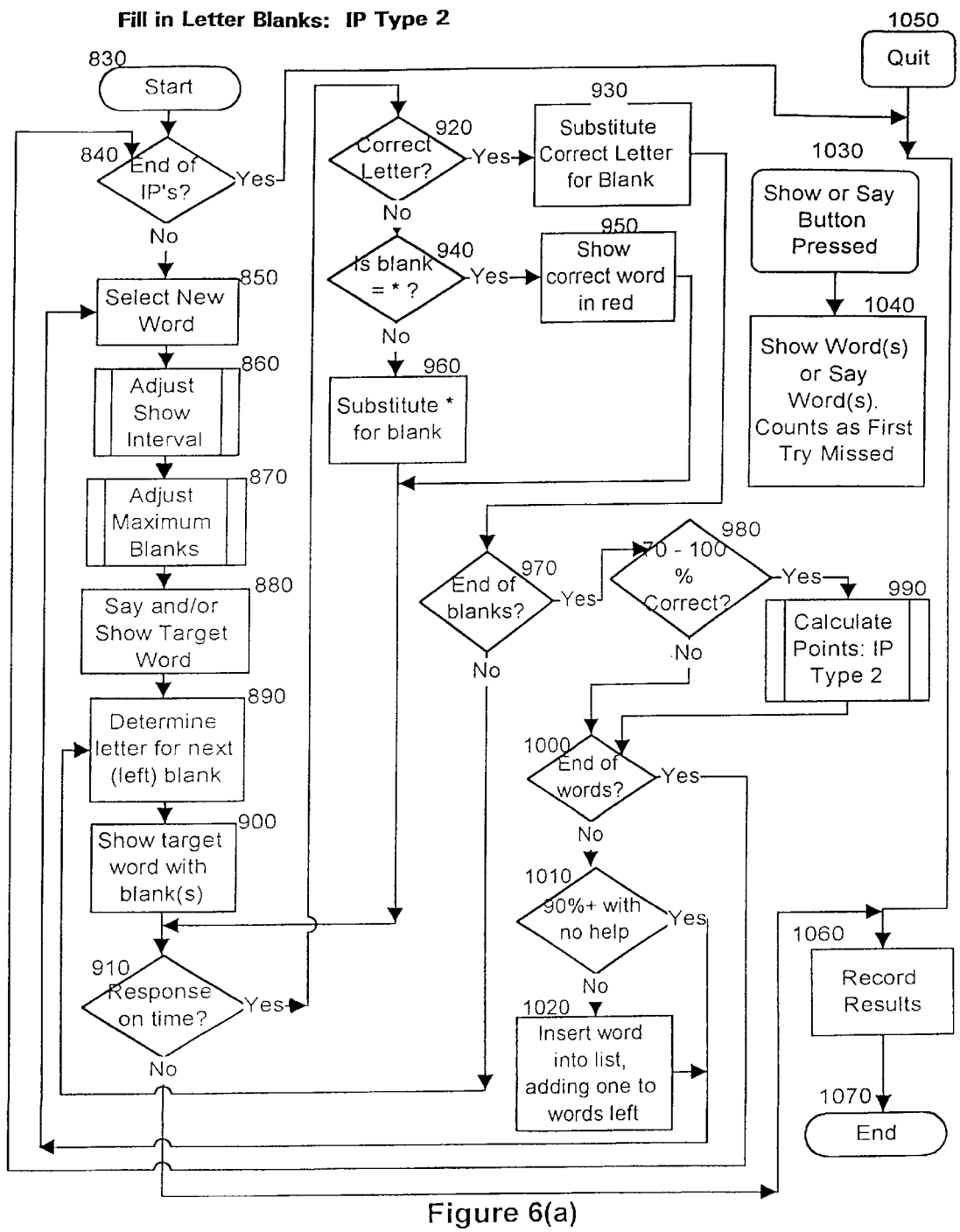
FIG. 6(a) is a high-level flow chart illustrating the Fill in Letter Blanks interactive process according to the invention that may be implemented by the computer system shown in FIG. 18.

The Fill in Letter Blanks IPT 130 may be implemented as diagrammatically shown in FIG. 6(a). Exemplary screen displays for the Fill in Letter Blanks IPT are shown in FIGS. 6(b)–(f).

Step 830, "Start", is the beginning of Fill in Letter Blanks procedure 130.

Step 840, "End of IP's", follows step 830. There are three Interactive Processes, IP#4, IP#5, and IP#6, in the Fill in Letter Blanks IP Type corresponding to whether the target word is (1) shown and said, (2) shown only, or (3) said only, respectively.

Activation of IP's within IPT 130 occurs after the end of each trial, or by Age Defaults, if this is the first trial. See Activate Interactive Process procedure 180 (FIG. 9), Move Words procedure 190 (FIG. 10) and Add Words procedure 200 (FIG. 11).

Step 840 poses the question: "Are there any more active IP's to process?" If yes, the end of the IP's has not been reached so continue with step 850. Otherwise, the end of the active IP's has been reached and the process then proceeds to step 1060 to Record Results before exiting Fill in Letter Blanks.

Step 850, "Select new word", follows a no response to step 840. The next word to be shown is selected from a list of words in random order. The process continues with step 860.

The list of words, or available words from which to select the new word, are determined by the Add Words procedure shown in FIG. 12 for the first IP in each IPT and by the Move Words procedure shown in FIG. 11 for all other IP's. Except for older students who skip some of the very easy words, every student will eventually get every word. The selection and order of words (within available words) is made by sorting the available words by (1) the number of times the word was previously presented within the current IP (descending) and a randomly assigned number.

Furthermore, words are numbered sequentially with an ID number. The assigned number ID of each word determines the choice of words in the Add Words procedure of FIG. 12. The words ID sequence correlates with word difficulty in that easy (eg. common, concrete) words are used often at first and hard (eg. complex, abstract) words are used regularly only after the student has responded satisfactorily to around 3000 or more words. The start point depends on student age, with older students skipping over the extremely easy words.

A precise and complete sequencing of words by difficulty is intentionally avoided in the preferred embodiment, so that there often will be a mixture of known and unknown words with which the student is working.

Step 860, "Adjust Show Interval", follows step 850. The length of time the next target word remains on the screen is altered slightly according to the adjust show interval process 860 described in more detail in relation to FIGS. 16(a)–(d). The process continues with step 870.

Step 870, "Adjust Maximum Blanks", follows step 860. The maximum number of letters which can be blank are determined in step 870 as described in more detail in relation to FIG. 13. The process continues with step 880.

Step 880, "Show and/or Say Target Word", follows step 870. Words will be communicated to the student using one of three IP's: either said and show, said only, or shown only, depending on which of the three Interactive Processes is currently being processed (IP#4, IP#5, or IP#6, respectively). The process continues with step 890.

Figure 6B:
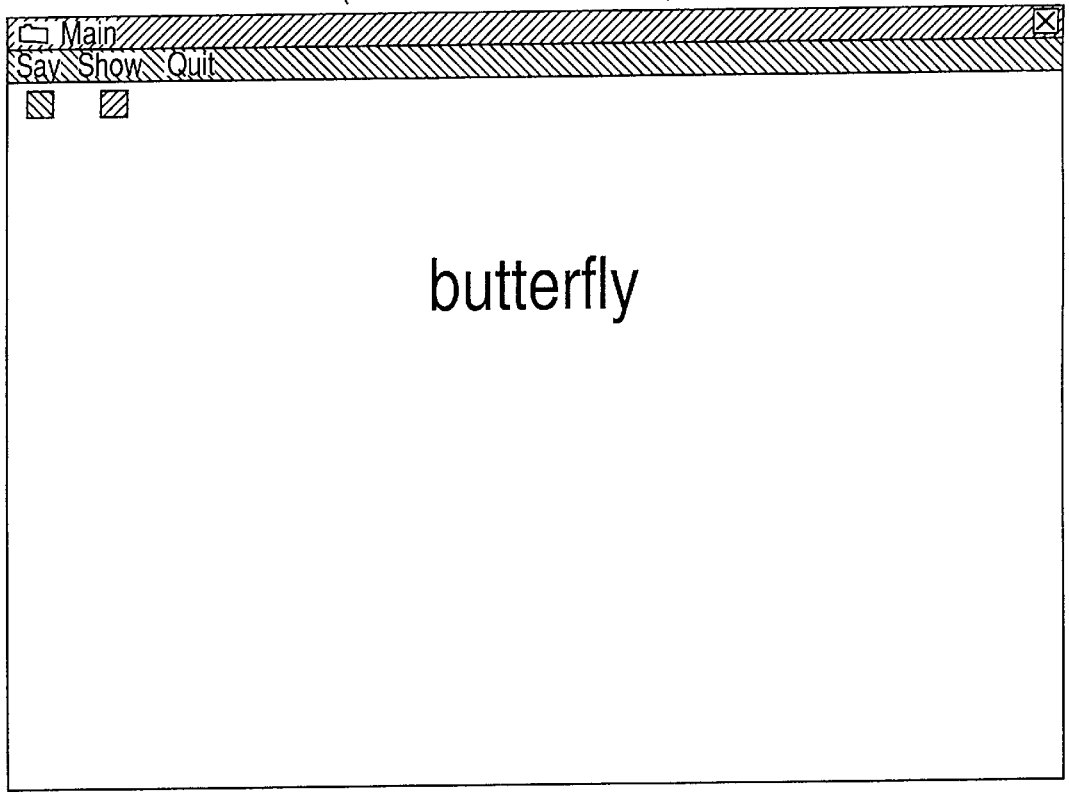
FIGS. 6(b)–(f) are examples of a screen displays that may be generated by the Fill in Letter Blanks interactive process of FIG. 6(a)
Figure 6C:
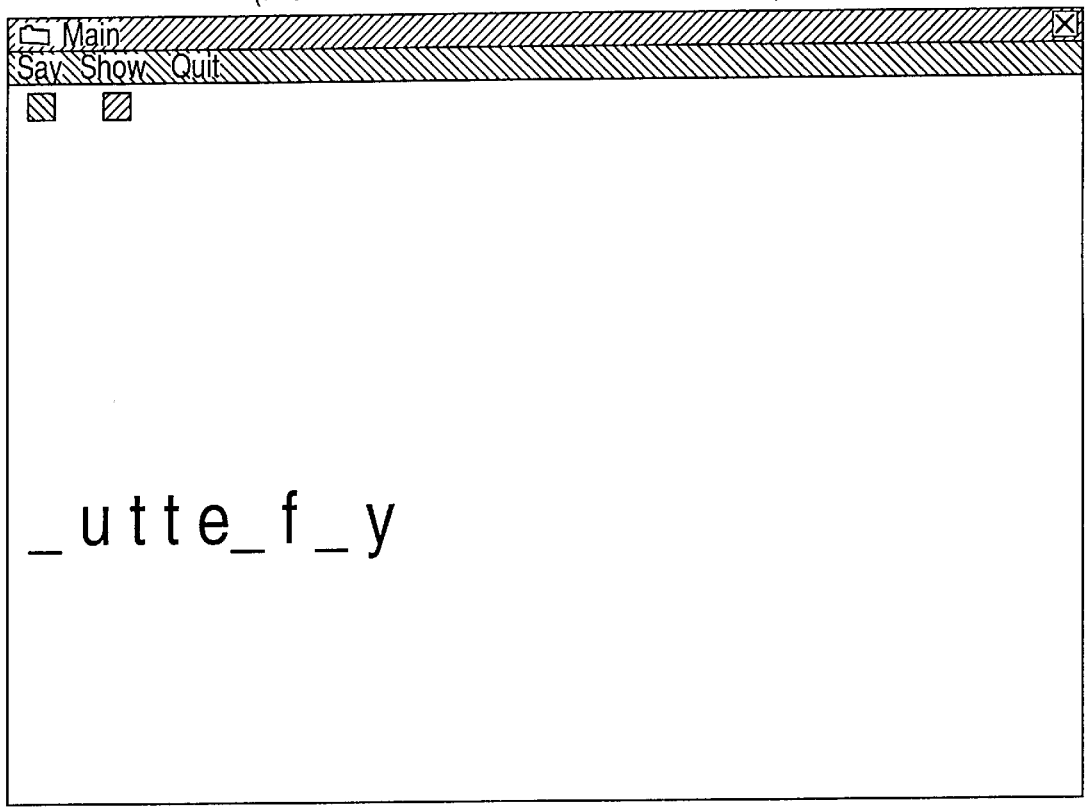
Figure 6D:
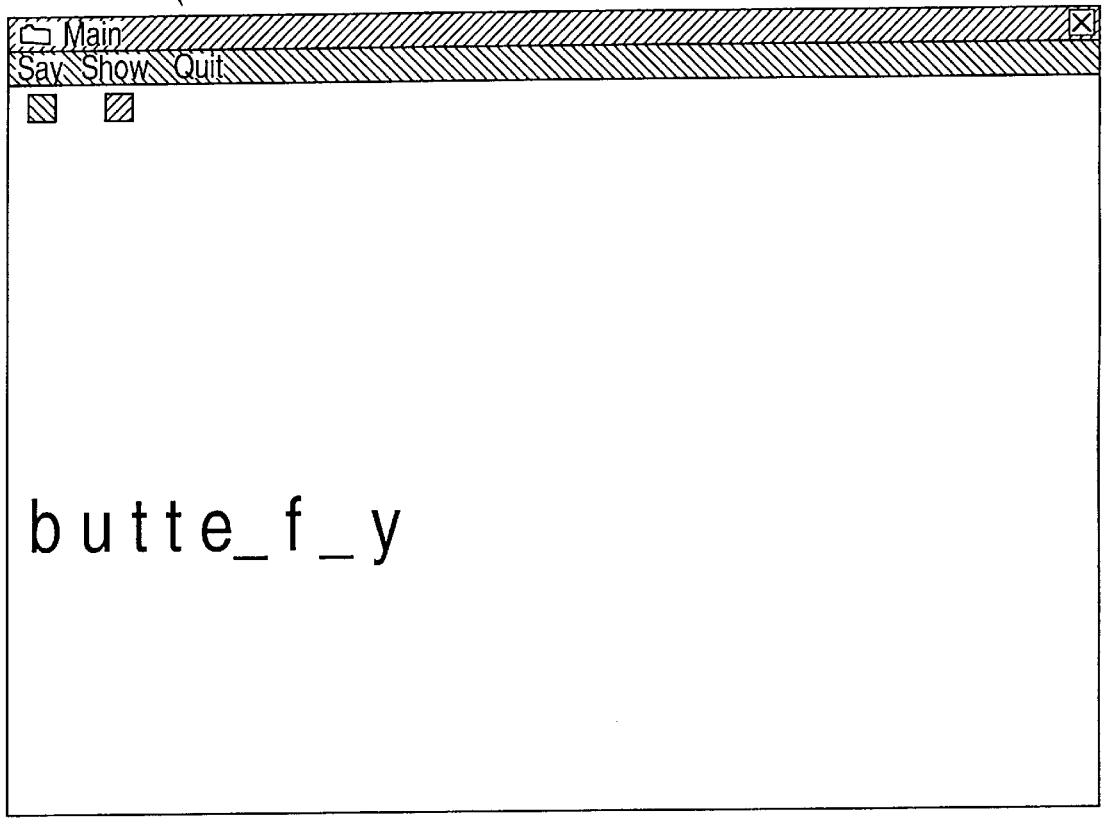
Figure 6E:
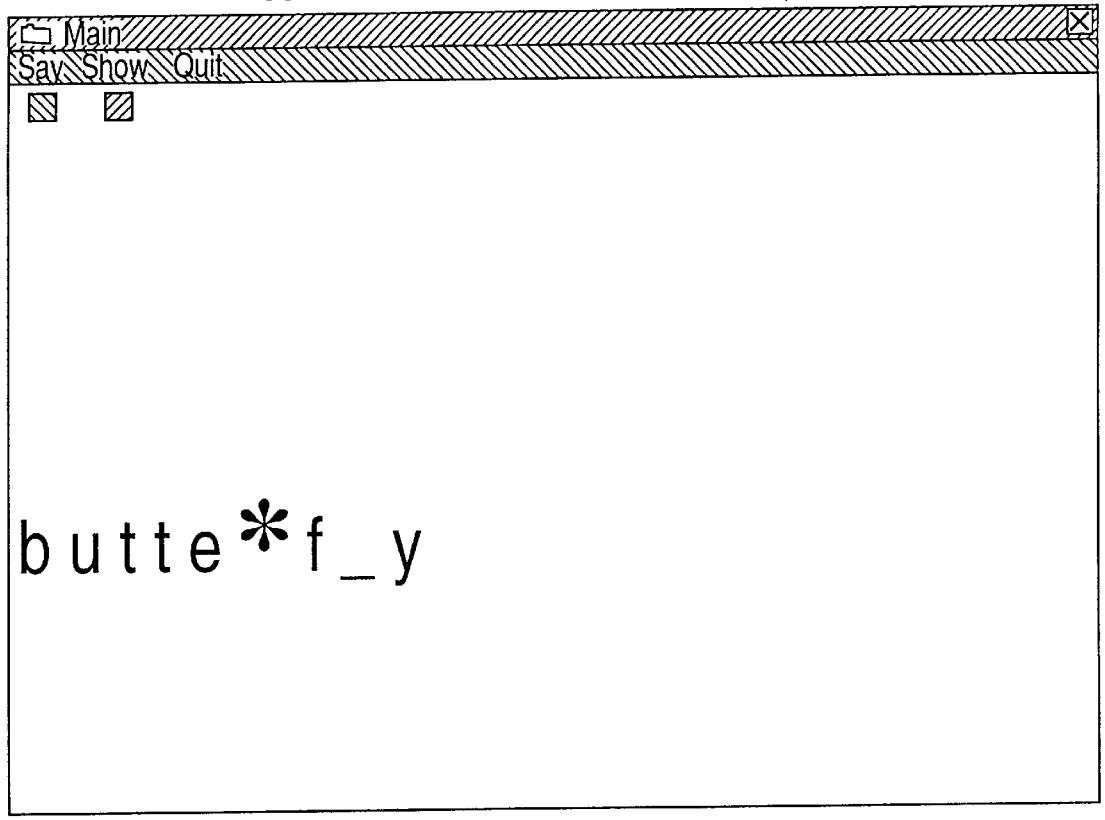
Figure 6F:
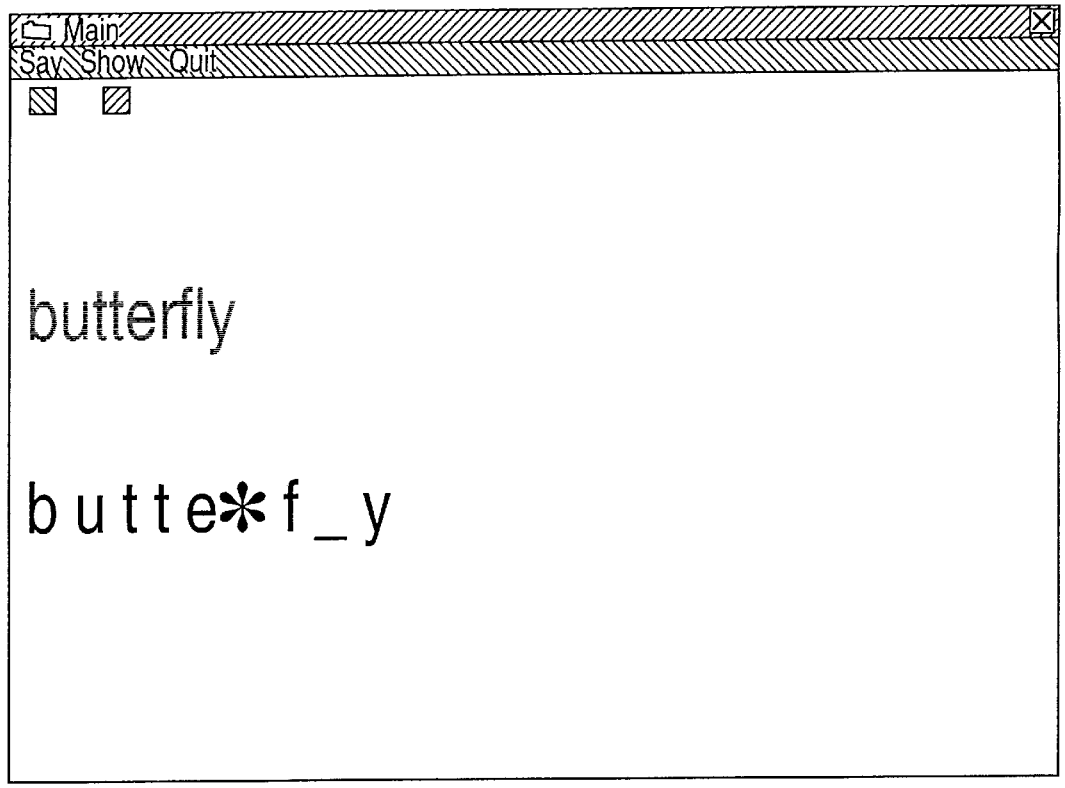

FIG. 6(b) is an exemplary screen display resulting from step 880 illustrating a Show of target word butterfly.

Step 890, "Determine letter for next blank", is a process which determines which letter(s) in the next target word will be left blank or replaced by a symbol. The number and type of letters, for which a blank can be substituted, starts with vowels only for a new student. Then additional letters are added one at a time at a rate that correlated with the number of trials, age and average percent.

Thus, a skilled typist familiar with the words would be using all 26 letters of the alphabet within a relatively few number of trials, whereas a young child, who searches sequentially for letters on the keyboard, would have new letters introduced at a much slower rate.

If there is not a sufficient range of letters in a target word to match the current letters which can be blank, additional letters are temporarily added to the "can be blank list" one at a time, until letters in the target word are found which can be blank. Thus, the number of letters a new typist has to contend with is minimized as much as possible, and then gradually increased. The process continues with step 900.

Step 900, "Show Target Word with blank(s)." The current target word, including blanks substituted for letters, is shown continuously. As the correct letters are typed, letters are substituted for the blanks that were holding their place. The process continues with step 910.

FIG. 6(*c*) is an exemplary screen display resulting from step 900 showing the target word "butterfly" with blanks ("_utte_f_y").

Step 910, "Response on Time", follows step 900 and is a decision point which decides if the student's response time is satisfactory. The student is timed by initiating the response timer (which may be implemented in software that utilizes the clock C510 shown in FIG. 18) when a target word is initially presented (said and/or shown) to the student. If the student responds within the allotted time, the process continues with step 920. If the student fails to respond on time the process moves to step 1060, Record Results, which records an incomplete for the student on this trial.

Step 920, "Correct Letter", follows a yes response to step 910. Step 910 is a decision point which poses the question: "Is the letter just typed the correct letter to substitute for the next, left-most blank"? If yes, step 930 is performed. If no, step 940 is performed.

Step 930, "Substitute Correct Letter for Blank", follows a yes response on step 920. The letter is counted as correct and the display shows the letter in place of the blank that was holding the place of this letter. The process then moves to step 970.

FIG. 6(*d*) is an exemplary screen display resulting from step 930 and a first correct entry of the left-most letter "b".

Step 940, "Is blank=*", follows a no on step 920. Step 940 is a decision point which poses the question: "Is a star (*) holding the place of the next target letter?" If a star (*) is holding the place of the next letter (instead of an underline character holding the place) the answer is yes, meaning that this letter has already been missed, and the process should continue with step 950. If the answer is no, then the letter has not been missed before the current response, and the process continues with step 960.

Step 960, "Substitute * for blank", follows a no response on step 940. Step 960 is reached if the student is missing the current letter for the first time. A symbol such as a "*" indicates that the letter was entered incorrectly. The process returns to step 910.

FIG. 9(*e*) is an exemplary screen display resulting from an incorrect entry of a letter other than "r" wherein a "*" is used to hold the place of the incorrect entry.

Step 950, "Show correct word in red", follows a yes on step 940. The student has missed the letter at least twice, so the correct word will be shown, preferably in a different color such as red. The process returns to step 910.

FIG. 6(*f*) is an exemplary screen display resulting from a second (or greater) incorrect entry of a letter other than "r" wherein a "*" is used to hold the place of the incorrect entry and wherein the correct word "butterfly" is also displayed (the black and white drawing does not show the preferred different color for this correct word that is mentioned above).

Step 970, "End of Blanks", follows step 930. Step 970 is a decision point which poses the question: "Is the student at the end of the target word—no more blanks substituted for letters?" A yes response means that the student is finished with the target word for now, and the process continues with step 980. A no response means that there is still one or more blanks left in the word, and the process returns to step 890.

Step 980, "70–100% Correct", follows a yes on step 970. Step 980 is a decision point which test whether the student has performed satisfactorily by, for example, posing the question: "Is the percent of correct responses to missing letters for the last word in the range of 70–100?" If yes, step 990. If no, step 1000.

Step 990, "Calculate Points", follows a yes on step 980 and calculates student performance on a point scale as more particularly described in relation to FIG. 20 below. The process continues with step 1000.

Step 1000, "End of Words", follows a no on step 980, and follows step 990. Step 1000 is a decision point which poses the question: "Have the scheduled number of words for the IP been presented?" If yes, the process returns to step 840. If no, the process continues with step 1010.

Step 1010, "90% with no help", follows a no response on step 1000. This is a decision point which poses the question: "Was the last word completed with 90% accuracy or higher?" If yes, the process returns to step 850. If no, the process continues on step 1020.

Step 1020, "Insert word into list, adding one to words left", follows a no on step 1010. The IP for the last word resulted in student performance of less than 90%, so this word will be given again by inserting this word into the list of words and increasing the total number of words to complete the process by one. The process returns to step 850.

Step 1030, "Say or Show Button Pressed". The Say and Show buttons 5,7 are active at all times, and immediately interrupt any part of the process. The target word is said if the Say button 5 is pressed. The target word is shown if the Show Button 7 is pressed. In either case, the process continues immediately after the target word is said or shown. The word is considered to have been missed (incorrect response) on the first try if the Say or Show button (5 or 7) is pressed.

Step 1050, "Quit". The Quit button 9 is active at all times, and pressing it immediately interrupts any part of the process. The Quit button 9 activates step 1060, Record Results, then bypassing any other scheduled Interactive Processes (IP#1–IP#9) by ending at step 1070.

Step 1060, "Record Results", is done at the end of Fill in Blanks for all Interactive Processes done, whether the IP's were completed, incomplete because of student performance problems, or incomplete because the Quit button 9 was pressed. This step is simply the recording of student responses in sufficient detail for all calculations, setup of the next trial, and reports. The process continues with step 1070.

Step 1070, "End", follows step 1060 and ends the process represented by FIG. 6(*a*).

Determine Sequence: Interactive Process Type 3

Determine Sequence 150 is an Interactive Process Type in which two to eight words are said and/or shown in random positions and in random order (first sequence). A list is of these same words in an order (second sequence) unrelated to the order originally presented is then shown continuously to the student. The student must then select the words, one by one, in the first sequence.

The Determine Sequence IPT 150 includes three interactive processes differing mainly by whether the first sequence of words is (1) shown and said, (2) shown only, or (3) said only.

The Determine Sequence IPT 150 may be implemented as diagrammatically shown in FIG. 7(*a*) beginning with start step 1080. FIGS. 7(*b*)–(*h*) are exemplary screen displays that may result from the Determine Sequence IPT 150.

Step 1090, "End of IP's", follows step 1080 and is a decision point which poses the question: "Has the end of active Interactive Processes of Determine Sequence Type been reached?" If yes, the process moves to step 1290, Record Results, then skips any other scheduled Interactive Processes (IP's). If no, the process continues with step 1100.

Step 1100, "Adjust Show Interval", follows a no in step 1090. The length of time a target word is shown is adjusted slightly as more particularly described in relation to FIGS. 16(*a*)–(*d*). The process continues with step 1110.

Step 1110, "Select a new list of words, Deactivate Say and Show Buttons", follows step 1100. In step 1110, a set of 2 to 8 words is selected. The Say and Show buttons (5,7) cannot be used until all words have been presented to the student, thus, they are deactivates in step 1110. The process continues with step 1120.

Step 1120, "Select next word", follows step 1110. Words in the current set are selected in random order (first sequence), unrelated to the order (second sequence) they will subsequently appear in a list.

Step 1130, "Say and/or Show target word" is a communication step that communicates the current target word selected in step 1120. The active IP determines how the words are communicated: said and shown, said only, or shown only (IP#7, IP#8, and IP#9 respectively) The process continues with step 1140.

FIG. 7(*b*) is an exemplary screen display illustrating a Show of the first word in the first sequence ("tongue").

Step 1140, "End of Words 1", follows step 1130 and is a decision point that poses the question: "Has the end of words to present been reached?" If yes, the process continues with step 1150. If no, the process returns to step 1120 to Select and present the next word.

FIGS. 7(*c*) and (*d*) are exemplary screen displays illustrating a Show of the second and third words from the first sequence ("girl" and "houses", respectively).

Step 1150, "Show List of words, Activate Say & Show Buttons", follows step 1140. The list of words just presented is shown in an unrelated order (second sequence) in a list. The list is now ready for the student to begin to selecting words in the order first presented (first sequence). The process continues with step 1160.

FIG. 7(*e*) is an exemplary screen display showing the result of step 1150 wherein the list of words just presented in FIGS. 7(*b*)–(*d*) is shown in the second sequence ("tongue", "houses", and "girl", respectively)

Step 1160, "Response on time" follows step 1150. This is a decision point which determines if the student's response time is acceptable. A response timer starts after the last target word was presented and restarts every time the student makes a response. Step 1160 poses the question: "Did the student respond within the allowed time period?" If the student fails to respond within the allotted time, the answer is no; in this case the process moves to step 1290, Record Results, then all subsequent scheduled Interactive Processes (IP's) are skipped and the trial is considered incomplete. If yes, the student responded in time, and the process continues with step 1170.

Step 1170, "Correct Word", follows step 1160. This is a decision point which poses the question: "Was the word selected the correct word according to the first sequence words were presented?" If yes, the process continues with step 1180. If no, the word selected was not the correct word, the process moves to step 1175.

FIGS. 7(*f*)–(*h*) are exemplary screen displays illustrating a student correctly selecting the words in the first sequence ("tongue", "girl" and "houses", respectively).

Step 1175, "Beep. Show Correct Word", follows a no in step 1170. This step gives feedback to the student by, for example, sounding a beep and showing the correct word. The process returns to step 1150.

Step 1180, "Correct $1^{st}$ try, no help", follows a yes in step 1170. This is a decision point which poses the question: "Was the response correct on the first try with no assistance?" If yes, the process continues with step 1190. If no, the process goes to step 1210.

Step 1190, "Show Green Vertical Bars" follows step 1180. Green vertical bars on the left and right sides of the viewable area, are visible for about ½ of a second. Step 1190 provides quick and precise feedback to the student and does not interfere with a rapid succession of student responses. Other ways of expressing this feedback could also be used in step 1190. The process continues with step 1200.

Figure 21:
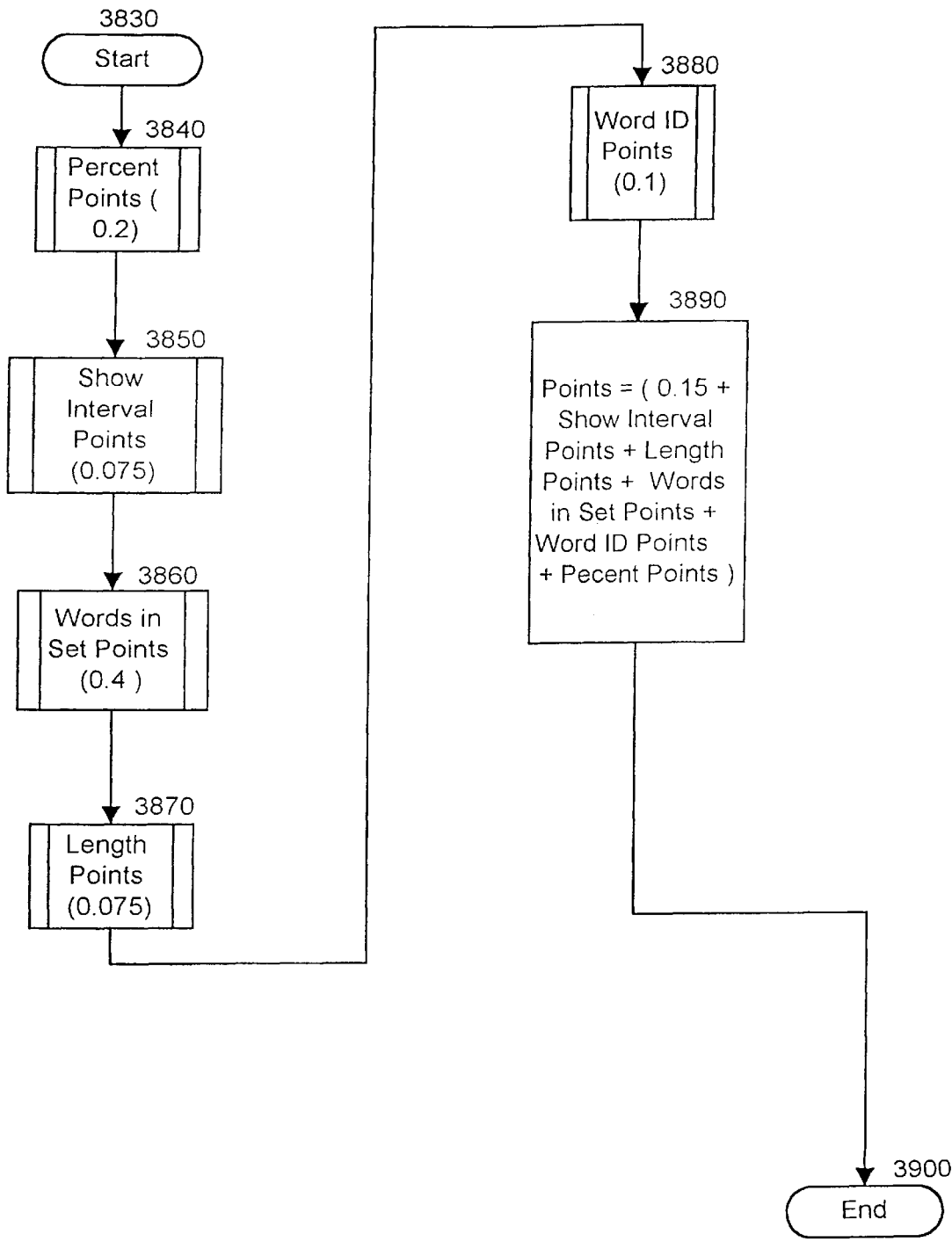
FIG. 21 is a high-level flow chart illustrating a process that calculates points for IP type 3 (Determine Sequence)

Step 1200, "Calculate Points", follows step 1190 and is performed to calculate the student's performance on a point basis as described in relation to FIG. 21. The process then continues with step 1220.

Step 1220, "End of Words 2", follows step 1210 and follows step 1200. Step 1220 is a decision point that poses the question: "Has the student correctly identified all words in the correct order?" Even words that are missed must be answered correctly before the student can continue. If the answer is yes, then the process continues with step 1230. If the answer is no, there are more words for the student to identify in the correct first sequence, and the process returns to step 1150.

Step 1230, "End of Sets", follows a yes for step 1220. This is a decision point that poses the question: "Has the end of all sets of words for the present Interactive Procedure (IP#7, IP#8 or IP#9) been reached?" If yes, the process returns to step 1090. If no, there is another set for the present Interactive Process, the overall process returns to step 1110.

Step 1240, "Show", is active for all parts of the process represented by FIG. 7(*a*) except for steps 1110 through 1150. Except as otherwise noted, the Show Button 7 can be pressed at any time and results in the temporary interruption of the overall process until step 1250 is completed. Step 1250 follows the current step.

Step 1250, "Show word(s). Counts as First Try Missed." follows show step 1240. If the target word is shown by activating the show word button 7 as in step 1240, the target word is counted as missed on the first try, and the process in effect at the time the Show Button 7 was pressed, resumes.

Step 1260, "Say", is active for all parts of the process represented by FIG. 7(*a*) except for steps 1110 through 1150. Except as otherwise noted, the Say Button 5 can be pressed at any time and results in the temporary interruption of the overall process until step 1270 is completed. Step 1270 follows the current step.

Step 1270, "Say word(s). Counts as First Try Missed." follows step 1260. If the target word is said by activating the say word button 5, the target word is counted as missed on the first try, and the process in effect at the time the Show Button 7 was pressed, resumes.

Step 1280, "Quit", is active for all parts of the process represented by FIG. 7. The Quit Button 9 can be pressed at any time and results in the interruption of the process represented by FIG. 7. Step 1290, Record Results, follows the current step, and any subsequent scheduled Interactive Processes are skipped.

Step 1290, "Record Results", is done at the end of Determine Sequence IPT 150 for all Interactive Processes done, whether the IP's were completed, incomplete because of student performance problems, or incomplete because the Quit button 9 was pressed. This step is simply the recording of student responses in sufficient detail for all calculations, setup of the next trial, and reports. Step 820, End, follows this step.

Step 1300, "End", follows step 1290 and exits the process represented by FIG. 7(*a*).

Adjust Words in Set (WIS) Procedure 170

Words in Set (WIS) is the number of words (2–8) in the list from which a student chooses the target word in the IP's for Interactive Process Type 1 (Choose From List) and Interactive Process Type 3 (Determine Sequence). More words in the WIS will require greater visual perception and increased word recognition ability. The invention utilizes the WIS to adjust the degree of difficulty of the current IP according to student performance and/or age.

In general, student performance determines how large the WIS will be. The preferred embodiment utilizes the student's average percent correct to determine a base number of trials ("Top") over which the number of words in the set is gradually and proportionally increased to 8. An age factor is used to adjust the number of trials. Preferably, the age factor is between 0.3 to 8.

If there have not been enough trials to use the largest number of words in a set, then the proportion of trials (to the top or the range) is calculated, and the same proportion between 1 and 8 determines the Ideal number of words in a set. If the Ideal number differs from the actual number of words in set, then the actual number in incremented by 1 or −1.

Another aspect of student performance, namely the response time of the student to past IP's, is also used by the invention to determine the WIS. The preferred embodiment utilizes the average response time to adjust the WIS.

The Adjust Words in Set procedure 170 may be implemented as diagrammatically shown in FIGS. 8(*a*)–(*b*) beginning with start step 1310.

Then, the age factor is accounted for in step 1320, "Age<7" which is a decision point that poses the question: "Is the age of the student less than seven years old?" If yes, continue with step 1330. If no, do step 1340.

Step 1330, "Age Factor=PropInverse(Age, 0, 7, 2, 3)" follows a yes in step 1320. For a student less than seven years old, the age factor will be between 2 and 3, inversely proportional to age between 0 and 7. The PropInverse calculation procedure is described in more detail in relation to FIG. 14. The process continues with step 1370.

Step 1340, "Age>18" follows a no in step 1320 and is a decision point that poses the question: "Is the age of the student less than eighteen years old (and not less than seven years old)?" If yes, continue with step 1350. If no, do step 1360.

Figure 14:
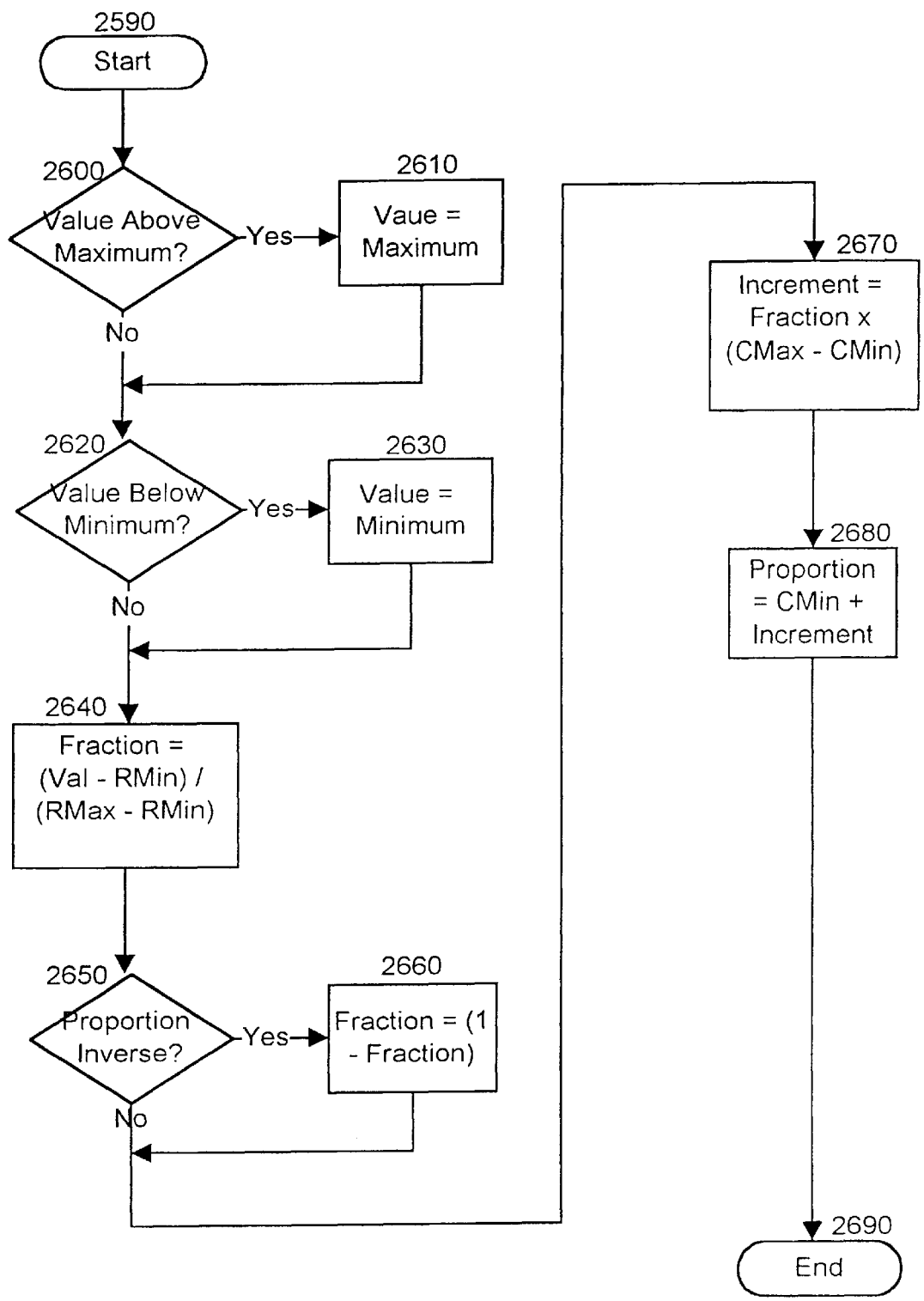
FIG. 14 is a high-level flow chart illustrating a proportion/proportion inverse calculation procedure according to the invention that may be implemented by the computer system shown in FIG. 18.

Step 1350, "Age Factor=PropInverse(Age, 7, 17, 0.2, 2)" follows a yes in step 1340 and utilizes the PropInverse calculation procedure shown in FIG. 14. By using this PropInverse calculation procedure, the age factor will be between 0.2 and 3, inversely proportional to age between 7 and 18. The process continues with step 1370.

Step 1360, "Age Factor=0.2" follows a no in step 1350. If the student is 18 or older, then the Age Factor is a small fraction which will reduce the overall number of trials it takes to adjust/increase words in set to its maximum.

Then the invention factors in student performance by adjusting the base number of trials ("Top") over which the number of words in the set is gradually and proportionally increased to 8.

Step 1370, "Average Percent>95" follows steps 1330, 1350, and 1360. Step 1370 is a decision point that poses the question: "Is the average percent for this IP greater than 95?" If yes, continue with step 1380. If no, do step 1390.

Step 1380, "Top=PropInverse(AP, 95, 100, 30, 100)" follows a yes in step 1370 and utilizes the PropInverse calculation procedure shown in FIG. 14. Top is the upper limit of the range of trials over which the number of words in each set/list is gradually increased. In this case, Top is preferably between 30 and 100, inversely proportional to average percent correct between 95 and 100. The process continues with step 1410.

Step 1390, "Average Percent>80" follows a no in step 1370. Step 1390 is a decision point that poses the question: "Is the average percent for this IP greater than 80 (and not greater than 95)?" If yes, continue with step 1400. If no, do step 1410.

Step 1400, "Top=PropInverse(AP, 80, 95, 100, 400)" follows a yes in step 1390. Top is the top of the range of trials over which the number of words in each set/list is gradually increased. In this case, Top will be between 100 and 400, inversely proportional to average percent correct between 80 and 95. The process continues with step 1410.

Step 1405, "Top=PropInverse(AP, 0, 80, 400, 2500)" follows a no in step 1390. In this case, Top will be between 400 and 2500, inversely proportional to average percent between 0 and 80. The process continues with step 1410.

Then, the invention factors in the response time of the student to further adjust the WIS as follows.

Step 1410, "Response Time<2" follows steps 1380, 1400 and 1405. Step 1410 is a decision point which poses the question: "Is the average time from the first presentation of the target word to the student's correct response less than 2 seconds (2000 milliseconds) for this Interactive Procedure?" If yes, continue with step 1400. If no, do step 1410.

Step 1420, "RT Factor=Prop(RT, 0, 2, 0.2, 1)" follows a yes in step 1410 and utilizes the Proportion (Prop) calculation procedure shown in FIG. 14. In this case, the RT Factor (Response Time Factor) will be between 0.2 and 1, proportional to response time between 0 and 2000 milliseconds (2 seconds). The process continues with step 1460.

Step 1430, "Response Time<3" follows a no for step 1410. Step 1430 is a decision point that poses the question: "Is the average time from the first presentation of the target word to the student's correct response less than 3 seconds (and not less than 2 seconds) for this Interactive Procedure?" If yes, continue with step 1440. If no, do step 1450.

Step 1440, "RT Factor=Prop(RT, 2, 3, 1, 3)" follows a yes in step 1430 and utilizes the Proportion (Prop) calculation procedure shown in FIG. 14. In this case, the RT Factor (Response Time Factor) will be between 1 and 3, proportional to response time between 2000 and 3000 milliseconds (2 and 3 seconds). The process continues with step 1460.

Step 1450, "RT Factor=3" follows a no in step 1430. In this case, the RT Factor (Response Time Factor) will be 3, the highest value for Response Time Factor. The process continues with step 1460.

Step 1460, "IP Type=1", follows steps 1420, 1440, and 1450. Step 1460 is a decision point that poses the question: "Is the Interactive Procedure Type equal to one (Choose from List)?" If yes, continue with step 1470. If no, go to step 1480.

Step 1470, "Top=Top×RT Facto×Age Factor", follows a yes in step 1460. As mentioned above, Top is the top of the range of trials over which the number of words in each set/list is gradually increased. Top was calculated in step 1380, 1400, or 1405. Top is changed or updated to the previously calculated Top value multiplied times the Response Time Factor multiplied times the Age Factor. The process continues with step 1490.

Step 1480, "Top=Top×RT Factor×Age Factor", follows a no in step 1460. In this case, the IP Type is Type 3, Determine Sequence. Top is the top of the range of trials over which the number of words in each set/list is gradually increased. Top was calculated in step 1380, 1400, or 1405. Top is changed or updated to the previously calculated value multiplied times ten for IP Type 3. The process continues with step 1490.

Step 1490, "A" connects FIG. 8(*a*) to FIG. 8(*b*)

Step 1500, "A" starts FIG. 8(*b*), connecting FIG. 8(*b*) to the end of FIG. 8(*a*).

The invention then adjusts the minimum words in the set according to student age and performance. The preferred embodiment adjusts the minimum words in the set beginning with step 1510.

Step 1510, "Age<7 and Average Percent<90", follows step 1500 and is a decision point that poses the question: "Is the age of the student less than seven and the Average Percent less than 90?" If yes, go to step 1520. If no, go to step 1530.

Step 1520, "Minimum Words in Set=2", follows a yes in step 1510. The minimum of two words per set is only for a very young child whose performance is not up to par. The process continues with step 1540.

Step 1530, "Minimum Words in Set=3", follows a no in step 1510. The minimum WIS is normally three. The process continues with step 1540.

Step 1540, "Maximum Words in Set=8", follows steps 1520 and 1530. The largest number of words that can be in a set/list is eight. The process continues with step 1550.

Step 1550, "Trials>Top", follows step 1540, and is a decision point that poses the question: "Do the number of trials completed for the current IP exceed the value of Top, calculated is step 1470 or 1480. If yes, go to step 1570. If no, go to step 1560.

Step 1560, "Ideal Words in Set=Prop(Trials, 1, Top, Minimum Words in Set, Maximum Words in Set)". The Ideal Words in Set will be somewhere between Minimum Words in Set and Maximum Words in Set, proportional to 1 and Top. The process continues with step 1580.

Step 1570, "Ideal Words in Set=Maximum Words in Set" represents the case where the Ideal is the same as the Maximum Words in Set (8). The process continues with step 1580.

Step 1580, "Ideal Words in Set>Words in Set & Last Trial OK", follows steps 1560 and 1570, and is a decision point that poses the question: "Are both of the following true (1) the just calculated Ideal Words in Set greater than the current number of Words in set and (2) the last trial was completed successfully?" If yes, the student's performance justifies increasing the difficulty by adding a word to WIS by proceeding to step 1590. If no, go to step 1600.

Step 1590, "Words in Set=Words in Set+1", follows a yes in step 1580. The number of words in a set in increased by one thereby increasing the difficulty. The process continues with step 1630.

Step 1600, "Ideal Words in Set<Words in Set", follows a no in step 1580, and is a decision point. The question: "Is the just calculated Ideal Words in Set less than the current number of Words in Set." If yes, then the IP is too hard and the WIS should be reduced by proceeding to step 1610. If no, go to step 1620.

Step 1610, "Words in Set=Words in Set−1", follows a yes in step 1600. The number of words in a set in decreased by one thereby decreasing the difficulty. The process continues with step 1630.

Step 1620, "No change in Words in Set", follows a no in step 1600. There is no change in the WIS because the invention has determined the appropriate degree of difficulty for the student at that moment. The process continues with step 1630.

Step 1630, "End", follows steps 1590, 1610 and 1620, and ends FIG. 9.

Activate Interactive Processes (IP#1–IP#9) 180

The activate interactive processes procedure 180 is shown in FIG. 1 and more particularly described in FIG. 9. In general, procedure 180 determines which of the nine IP's to activate for the student. Only active IP's are utilized to test the student.

The lowest number active IP is the Word Entry IP. Thus, IP#1, IP#4, and IP#7 are the Word Entry IP's, unless IP#1 is stopped for a student because it is too easy, in which case IP#2 would be the Word Entry IP.

In other words, a Word Entry IP is an IP that gets words from the main word list. All other IP's get the words that they use from the previous IP within the IP type. See FIG. 10 Move Words and FIG. 11 Add Words. The Add Words procedure shown in FIG. 11 is for Word Entry IP's and the Move Words procedure of FIG. 10 is for all other IP's.

To be eligible for activation, an IP must be inactive, and must have enough words assigned to it. Only one IP at a time can be made active following a given trial. Once an IP is active, it generally stays active.

The activate interactive process procedure 180 begins, as shown in FIG. 9, with step 1640, "Start."

Step 1650, "For each of the nine IP's (Until one is added)" follows step 1640 and sets up a loop that checks each IP for activation. Information about the nine Interactive Processes is made ready in order of IP number for processing. More specifically, the IP's are checked in the following order: 1, 2, 3, 4, 5, 6, 7, 8, 9. The process continues with step 1660.

Step 1660, "No more IP's to check", follows step 1650 and is a decision point that poses the question: "Has the end of Interactive Processes (IP's) been reached?" If yes, go to step 1720 and exit. If no, continue with step 1670.

Step 1670, "Already Active", follows a no in step 1660, and is a decision point that poses the question: "Is the IP presently being examined already active?" If yes, the process returns to step 1660 to check then next IP. If no, the process continues with step 1680.

Step 1680, "Enough Words Assigned", follows a no in step 1670, and is a decision point that poses the question: "Have enough words been assigned to this IP for this student to start the IP?" For this determination, the invention utilizes the move words procedure 190 shown in FIG. 10 regarding the movement of words to an IP. The number of Words required to start IP Types 1 and 3 is preferably the number of Words in Set×4 for IP's (1–3 and 7–9) in the Choose From List IP 110 and the Determine Sequence IPT 150.

For IP Type 2 (Fill in Letter Blanks) which includes IP's (4–6), however, step 1670 checks whether 15 words have been assigned.

If the answer to step 1670 is yes, the process goes to step 1700. If no, the process continues with step 1690.

Step 1690, "Word Entry IP for Type", follows a no in step 1680, and is a decision point that poses the question: "Is the Interactive Procedure the Word Entry Interactive Procedure for its Interactive Procedure Type?" See FIG. 11 Add Words. If the IP is a Word Entry IP, then the number of words assigned is unimportant, since this type of procedure can get any number of words at any time from the main word list. Thus, if the answer is yes, the process continues with step 1700. If the answer is no, the process returns to step 1660 to check another Interactive Process.

Step 1700, "Prev IP Active>2 trials", follows a yes in step 1680 and a yes in step 1690. Step 1700 is a decision point that poses the question: Has the immediately preceding IP been active for more than two trials?" If yes, the process continues with step 1720. If no, the process returns to step 1660 to check another IP.

Step 1710, "Add this IP only", follows a yes in step 1700. The current IP is added and the process terminates before a second IP can be added. The process moves to step 1720.

Step 1720, "End", ends FIG. 10

Move Words Procedure 190

To ensure that a student has learned to read a word, words are propagated from one Interactive Process to another IP within an IP type. In this way, the invention utilizes a plurality of IP's to reinforce learning of a particular word.

Within an Interactive Process Type, a word is moved sequentially from one Interactive Process to the next after the student has responded correctly the required number of times. The lowest number active IP is the Word Entry IP. Word Entry IP's get words as needed directly from the main word list and are not the subject of the illustrated implementation of the Move Words process 190 shown in FIG. 10 (see FIG. 11, Add Words). The movement between IP's is the process addressed by FIG. 10, Move Words procedure 190.

As in the adjust words in set procedure 170 described in FIGS. 8(*a*)–(*b*), the Move Words procedure 190 references FIG. 14—Proportion/Proportion Inverse (Prop/PropInverse) to perform calculations.

The Move Words procedure 190, as shown in FIG. 10, begins with step 1730, "Start."

Step 1740, "For each active IP (1–9)", follows step 1730 and sets up a do loop for each of the active IP's. In other words, step 1740 sequentially selects each of the active Interactive Processes (IP's) for the current student.

Step 1750, "IP's to process", follows steps 1740, 1780, 1800, and 1810. Step 1750 is a decision point that poses the question: "Are any IP's left to process?" If the answer is yes, then the process moves to step 1760, where IP Criteria is calculated. If no, all active IP's have had criteria calculated, and the process moves to step 1810 to define words to be processed.

Step 1760, "Average Percent>95", follows step 1750, and is a decision point that poses the question: "Is the Average percent for the current IP greater than 95?" If yes, the process moves to step 1770. If no, the process goes to step 1780.

Step 1770, "IP Criteria=1", follows a yes in step 1760. Step 1770 sets the Interactive Procedure Criteria for a word to move to the next IP (or deleted if there is no next IP) to one.

Step 1780, "Average Percent>80", follows a no in step 1760 and is a decision point that poses the question: "Is the average percent for the current IP greater than 80 (and not greater than 95)?" If yes, the process moves to step 1790. If no, the process goes to step 1800.

Step 1790, "IP Criteria=PropInverse (AP, 80, 95, 2, 4)", follows a no in step 1760. Step 1790 sets the Criteria for the words in the current Interactive Procedure, to move to the next IP (or deleted if there is no next IP) to 2, 3 or 4—inversely proportional to the average percent of correct responses between 80 and 95. The process continues with step 1750.

Step 1800, "IP Criteria=5", follows a no in step 1780. The process continues with step 1750.

Step 1810, "For each active word for student", follows a no in step 1750 and sets up a do loop for each active word. In other words, step 1810 sequentially selects each of the words that will be processed, namely active words. Active words are words that have been presented as target words in their presently assigned IP. The process continues with step 1820.

Step 1820, "Word left to process", follows step 1810 and is a decision point that poses the question: "Are there any words selected in step 1810 which have not been processed?" If yes, the process moves to step 1830. If no, the process ends with step 1880.

Step 1830, "Correct>=IP Criteria+Miss", follows a yes in step 1820, and is a decision point that poses the question: "Is the number of correct responses for the current word greater than or equal to the IP Criteria plus the number of times the word was missed?" If yes, the process moves to step 1850. If no, the process goes to step 1840.

Step 1840, "Correct>=IP Criteria+4", follows a no in step 1830, and is a decision point that poses the question: "Is the number of correct responses for the current word greater than or equal to the IP Criteria plus four?" Thus, the maximum number of misses that is added to IP Criteria is four. If yes, the process moves to step 1850. If no, the process returns to step 1820.

Step 1850. "Is next IP # same type", follows steps 1830 and 1840. Step 1850 is a decision point that poses the question: Is the IP Type of the next IP the same as the IP Type of the current IP?" For example: IP's 1,2, &3 are the same type (Choose From List). Thus for IP#3, the next IP is IP#4, which is a different type (Fill in Letter Blanks), so the answer would be no. If yes, the process moves to step 1860. If no, the process goes to step 1870.

Step 1860, "Move word to next IP", follows a yes in step 1850. The word is moved to the next number IP. The process continues with step 1820.

Step 1870, "Delete word for IP#", follows a no in step 1850. The word is deleted, since there is not a subsequent IP of the same type. The process continues with step 1820.

Step 1880, "End", ends the move words procedure 190 represented by FIG. 10.

Add Words Procedure 200

Words are added to the Word Entry IP's for each IP Type. The Word Entry IP is the lowest number active IP within an IP Type. As mentioned above, a Word Entry IP is an IP that gets words from the main word list and all other IP's get the words that they use from the previous IP within the IP type.

In general, the Add Words procedure 200 determines the number of words needed and the maximum word ID used to date. Then, the Add Words procedure 200 sequentially adds next words from the main word list to the IP in question.

The Add Words procedure may be implemented as shown in FIG. 11 beginning with Start step 1890. Then step 1900 "For each IP entry point (for its IP Type)" selects the lowest number active IP for each IP Type for processing.

Step 1910, "More Active Entry IP's", follows step 1900, and is a decision point which poses the question: "Are there more IP's to process, from those selected in step 1900?" If yes, the process continues with step 1920. If no, the process represented by FIG. 12 ends with step 1960.

Step 1920, "Needs More Words", follows a yes in step 1910, and is a decision point that poses the question: "Does the presently selected IP need more words?" If the IP has less than the average number of target words for the IP Type (multiplied by two), then it needs more words. If the answer to step 1920 is yes, the process moves to step 1930: If no, the process returns to step 1910.

Step 1930, "Calculate number of words needed", follows a yes in step 1920 and determines the number of words needed. The ideal number of words is the average number of target words for the IP Type multiplied by two. See FIGS. 12(*a*)–(*b*) entitled "Number of Words (for each IP Type)" for an explanation of how the number of words is determined for each IP type. The number of words needed that is calculated by step 1930 is the ideal number of word minus the number of words presently assigned to the IP.

Step 1940, "Determine the highest ID used for IP Type", follows step 1930. All words are numbered and entered into the process in numerical order. The ID of numbers used is recorded along with the word itself, so the process has continuous and immediate access to this information.

Step 1950, "Add number of words needed starting at first unused words.", follows step 1940. Step 1950 starts at the lowest number word which has not been used by the present IP for this student and adds words until the number of words needed is satisfied. The process then returns to step 1910.

Step 1960, "End", exits the Add Words process 200 represented by FIG. 11.

Number of Words (for each IP Type)

The base total number of words to ask the student on the next trial for each IP Type is determined by the maximum trials completed by the student in any IP comprising the IP Type in question. The base total number of words is then adjusted by multiplying the base total number by percent factor, age factor, number of active screens factor, and type factor (which IP Type)

FIGS. 12(*a*)–(*b*) together represent an implementation of the Number of Words process 220. These figures reference FIG. 14—Proportion/Proportion Inverse (Prop/PropInverse) calculation procedure.

The implementation of the Number of Words process 220, as shown in FIG. 12(*a*), begins with step 1980, "Start."

Step 1990, "More IP Types", follows step 1980 and is a decision point which poses the question: "Are there any more of the three IP Types to be processed?" If no, all three IP Types have been addressed, and the process represented by FIGS. 12(*a*)–(*b*) ends. If yes, the process continues with step 2000.

Step 2000, "Calculate Minimum Percent for IP Type." The student's lowest performance, measured by the lowest percent correct of any active IP in the IP Type is determined in step 2000 and used to determine the number of words to be utilized as further explained below. The process continues with step 2010.

Step 2010, "Min Percent>85", follows step 2000 and is a decision point that poses the question: "Is the minimum percent (calculated in step 2000) greater than 85?" If yes, then the process continues with step 2020. If no, then step 2030 is performed.

Step 2020, "Percent Factor=Prop(Min Percent, 85, 100, 1, 1.5)" follows a yes in step 2010. The percent factor will be between 1.0 and 1.5, proportional to the minimum average percent between 85 and 100 and is calculated in step 2020. The process continues with step 2060 which presents an age-based test as explained below.

Step 2030, "Min Percent>70", follows a no in step 2010 and is a decision point that poses the question: "Is the minimum percent (calculated in step 2000) greater than 70?" If yes, then the process continues with step 2040. If no, then step 2050 is performed.

Step 2040, "Percent Factor=Prop(Min Percent, 70, 85, 1, 1.5)" follows a yes in step 2030. In this case, the percent factor will be between 0.5 and 1.0, proportional to the minimum average percent between 70 and 85. The process continues with step 2060.

Step 2050, "Percent Factor=0.5" follows a no in step 2030. The percent factor will be 0.5 if the minimum average percent is not above 70. The process continues with step 2060.

Step 2060, "Age<7", follows steps 2020, 2040, and 2050. Step 2060 is a decision point which accounts for the student's age by posing the question: "Is the age of the student less than seven years old?" If yes, the process moves to step 2070. If no, the process continues with step 2080.

Step 2070, Age Factor=Prop(Age,0,7, 0.4, 0.8)", follows a yes in step 2060. In this case, the Age Factor will be between 0.4 and 0.8, proportional to the student's age between 0 and 7. The process continues with step 2120.

Step 2080, "Age<18", follows a no in step 2060 and is another age-based decision point that poses the question: "Is the age of the student less than eighteen years old (and not less than seven years old)?" If yes, the process moves to step 2090. If no, the process moves to step 2100.

Step 2090, "Age Factor=Prop(Age,7, 18, 0.8, 1.2)", follows a yes in step 2060. In this case, the Age Factor will be between 0.8 and 1.2, proportional to the student's age between 7 and 18. The process continues with step 2120.

Step 2110, "End", follows a no in step 1990, and ends the Number of Words process 200 represented by FIGS. 12(*a*)–(*b*).

Step 2120, "Calc MaxTrials: Largest number Trials for an IP Type.", follows steps 2070, 2090, and 2100. Step 2120 calculates MaxTrials which is the number of trials in the active IP with the most trials of any IP in the current IP Type. The process continues with step 2130.

Step 2130, "MaxTrials<50", follows step 2120, and is a decision point that poses the question: "Is the maximum number of trials in any active IP in the current IP Type, calculated in step 2120, less than 50?" If yes, the process moves to step 2140. If no, go to step 2150.

Step 2140, "Number of Words=Prop(MaxTrials, 0, 50, 8, 20)", follows a yes in step 2130. In this case, the Number of Words is between 8 and 20, proportional to the maximum number of trials between 0 and 50. The process continues with step 2180.

Step 2150, "MaxTrials<1000", follows a no in step 2130", and is a decision point that poses the question: "Is the maximum number of trials in any active IP in the current IP Type, calculated in step 2120, less than 1000 (and not less than 50)?" If yes, the process continues with step 2160. If no, step 2170 is performed.

Step 2160 "Number of Words=Prop(MaxTrials, 50, 1000, 20, 80)", follows a yes in step 2150. In this case, the Number of Words is between 20 and 80, proportional to the maximum number of trials between 50 and 1000. The process continues with step 2180.

Step 2170 "Number of Words=80", follows a no in step 2150 and occurs when MaxTrials is greater than or equal to 1000. In other words, step 2170 sets the Number of Words to 80. The process continues with step 2180.

Step 2180, "Num Active Screens=1", follows steps 2140, 2160, and 2170 and is a decision point that poses the question: "Is there one and only one active screen for this student for the current IP Type?" If yes, go to step 2190. If no go to step 2200.

Step 2190, "Active Screen Factor=0.6", follows a yes in step 2180. The Active Screen factor is 0.6. The process continues with step 2230.

Step 2200, "Num Active Screens=2", follows a no in step 2180 and is another decision point that poses the question: "Are there exactly two active screens for this student for the current IP Type?" If yes, go to step 2210. If no, go to step 2220.

Step 2210, "Active Screen Factor=0.8", follows a yes in step 2200. In this case, the Active Screen factor is 0.8. The process continues with step 2230.

Step 2220, "Active Screen Factor=1", follows a no in step 2200. In this case, the Active Screen factor is 1. The process continues with step 2230.

Step 2230, "D", connects FIG. 12(*a*) to FIG. 12(*b*).

Step 2240, "D", begins FIG. 12(*b*) as a connector from FIG. 12(*a*).

Step 2250, "IP Type=1", follows step 2240 and is a decision point that poses the question: "Is the IP Type being processed IP Type 1 (Choose from List)?" If yes, then step 2260 is performed. If no, the process continues with step 2290.

Step 2260, "MaxTrials<100", follows a yes in step 2250 and is a decision point that poses the question: "Are the maximum number of trials for this IP Type (calculated in step 2120) less than 100?" If yes, go to step 2270. If no, do step 2280.

Step 2270, "Type Factor=PropInverse(MaxTrials, 0, 100, 1.2, 2)", follows a yes in step 2260. In this case, Type Factor will be between 1.2 and 2, inversely proportional to the maximum number of trials between 0 and 100. The process continues with step 2330.

Step 2280, "Type Factor=1.2", follows a no in step 2260. In this case, Type Factor is set to 1.2. The process continues with step 2330.

Step 2290, "IP Type=2", follows a no in step 2250 and is a decision point that poses the question: "Is the IP Type being processed IP Type 2 (Fill in Letter Blank)?" If yes, then go to step 2300. If no, move to step 2310.

Step 2300, "Type Factor=0.8", follows a yes in step 2290. In this case, Type Factor is set to 0.8 for IP Type 2 (Fill in Letter Blank). The process continues with step 2330.

Step 2310, "Type Factor=1", follows a no in step 2290. In this case, Type Factor is set to 1 for IP Type 3 (Determine Sequence). The process continues with step 2330.

The portion of the Number of Words process 220 described above determines various factors which are utilized to calculate the total number of words. These factors include number of words, age, percent correct, IP type and active screen. The calculation of the total number of words is then performed by step 2330.

Step 2330, "Total Number of Words=Number of Words× Age Factor×Percent Factor×Type Factor×Active Screen Factor". This step follows steps 2270, 2280, 2300, 2310. The total number of words for the current IP Type is found by multiplying the number of words (steps 2140, 2160, 2170) times Age Factor times Percent Factor times Type Factor times Active Screen Factor. The process continues with step 2340.

Step 2340, "E" is a connector that ends FIG. 12(*b*) and returns the process to step 2350 in FIG. 12(*a*).

Adjust Maximum Blanks Procedure 870

When the student is being tested with IP type 2 (Fill in Letter Blank), the degree of difficulty may be adjusted by adjusting how many blanks are to be filled in by the student.

The variable Maximum Blanks is utilized by the invention to represent the maximum number of blanks which can be substituted for letters in a word during IP type 2 (Fill in Letter Blank). The number of actual blanks for any given presentation of a word is a random number between 1 and Maximum Blanks.

The letter(s) which will be shown as blank are randomly determined with every showing of every word, including repetition of a missed word.

The average percent correct determines base number of trials ("Top") over which blanks are gradually and proportionally added. This is one of the data driven aspects of the invention and is utilized to accurately adapt the difficulty of the process according to student achievement.

Another data driven aspect is the Age Factor which is used to adjust the number of trials over which blanks are gradu-
ally and proportionally added. The Age Factor preferably ranges from 0.3 to 8 as further explained below.

The largest value that Maximum Blanks is permitted to attain is 14. If there have not been enough trials to use the largest maximum, then the proportion of trials (to the Top or the range) is calculated, and the same proportion between 1 and 14 determines the Maximum Blanks.

Figure 13:
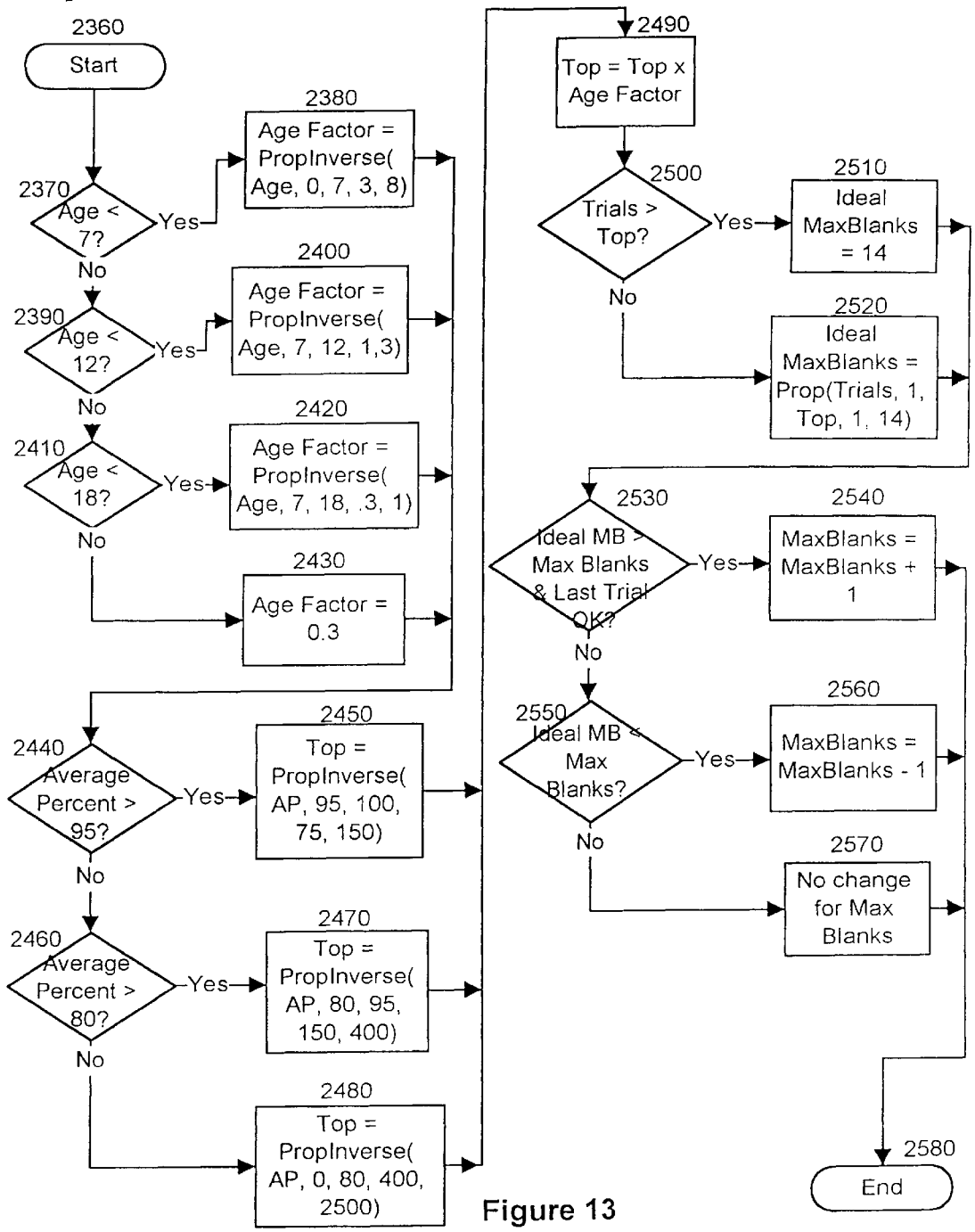
FIG. 13 is a high-level flow chart illustrating a process that adjusts the maximum number of blank letters in the Fill in Letter Blanks interactive process of FIG. 6(a) according to the invention that may be implemented by the computer system shown in FIG. 18.

The Adjust Maximum Blanks process 870 may be implemented as diagrammatically shown in FIG. 13.

As shown in FIG. 13, the Adjust Maximum Blanks process 870 begins with step 2360, "Start."

Step 2370, "Age<7", follows step 2360 and is a decision point that poses the question: "Is the age of the student less than seven years old?" If yes, the process moves to step 2380. If no, the process continues with step 2390.

Step 2380, Age Factor=Prop(Age, 0, 7, 3, 8)", follows a yes in step 2370. In this case, the Age Factor will be between 3 and 8, proportional to the student's age between 0 and 7. The process continues with step 2440.

Step 2390, "Age<12", follows a no in step 2370 and is decision point that poses the question: "Is the age of the student less than twelve years old (and not less than seven years old)?" If yes, the process moves to step 2400. If no, the process moves to step 2410.

Step 2400, "Age Factor=Prop(Age, 7, 12, 1, 3)", follows a yes in step 2370. In this case, the Age Factor will be between 1 and 3, proportional to the age between 7 and 12. The process continues with step 2440.

Step 2410, "Age<18", follows a no in step 2390. This is a decision point that poses the question: "Is the age of the student less than eighteen years old (and not less than twelve years old)?" If yes, the process moves to step 2420. If no, the process moves to step 2430.

Step 2420, "Age Factor=Prop(Age, 12, 18, 0, 3, 1)", follows a yes in step 2410. In this case, the Age Factor will be between 0.3 and 1, proportional to the age between 12 and 18. The process continues with step 2440.

Step 2430 "Age Factor=0.3" sets the Age Factor to 0.3 for a student 18 years or older.

Step 2440, "Average Percent>95", follows steps 2380, 2400, 2420, 2430 and is a decision point that poses the question: "Is the Average Percent for the student in This IP greater than 95. If yes, go to step 2440. If no, go to step 2460.

Step 2450, "Top=PropInverse(AP, 95, 100, 75, 150)" calculates a value for variable Top which is the top of the range of trials over which maximum blanks are gradually increased from 1 to 14. In this case, Top is between 75 and 150, inversely proportional to average percent correct between 95 and 100. The process continues with step 2490.

Step 2460, "Average Percent>80", follows a no in step 2440 and is a decision point that poses the question: "Is the Average Percent for the student in This IP greater than 80 (and not greater than 95). If yes, go to step 2470. If no, go to step 2480.

Step 2470, "Top=PropInverse(AP, 80, 95, 150, 400)" calculates a value for variable Top which is the top of the range of trials over which maximum blanks are gradually increased from 1 to 14. In this case, Top is between 150 and 400, inversely proportional to average percent between 80 and 95. The process continues with step 2490.

Step 2480, "Top=PropInverse(AP, 0, 80, 400, 2500)" calculates variable Top when the average percent correct is less than or equal to 80. In this case, Top is between 400 and 2500, inversely proportional to average percent between 0 and 80. The process continues with step 2490.

Step 2490, "Top=Top×Age Factor", follows steps 2450, 2470, 2480 and factors in the students age by adjusting the variable Top by multiplying the just calculated Top times the just calculate Age Factor.

Step 2500, "Trials>Top", follows step 2490 and is a decision point that poses the question: "Is the number of trials completed for this IP greater than Top (calculated is step 2490)?" If yes, the process continues with step 2510. If no, then step 2520 is performed.

Step 2510, "Ideal MaxBlanks=14", follows a yes in step 2500. In this case, the Ideal maximum number of blanks that can be substituted for letters in a word is 14.

Step 2520, "Ideal MaxBlanks=Prop(Trials, 1, Top, 1, 14)" calculates the Ideal maximum number of blanks that can be substituted for letters in a word. In this case Ideal MaxBlanks is between 1 and 14 proportional to number of trials between one and Top. The process continues with step 2530.

Step 2530, "Ideal MB>Max Blanks & Last Trial OK", follows steps 2510 and 2520. This step is a decision point that poses the question: "Are both of the following true (1) Ideal maximum blanks (calculated in steps 2510, 2520) is greater than the current number of Maximum Blanks and (2) the most recent trial was completed successfully by the student"? If yes, go to step 2540. If no, go to step 2550.

Step 2540, "MaxBlanks=MaxBlanks+1", follows a yes in step 2530. The number of maximum blanks for the current IP is increased by one.

Step 2550, "Ideal MB<Max Blanks", follows a no in step 2530 and is a decision point that poses the question: "Is the Ideal maximum blanks (calculated in steps 2510, 2520) greater than the current number of Maximum Blanks"? If yes, go to step 2560. If no, go to step 2570.

Step 2560 "MaxBlanks=MaxBlanks−1", follows a yes in step 2550. In this case, the number of maximum blanks for the current IP is decreased by one.

Step 2570, "No change for Max Blanks", follows a no for step 2550. In this case, there is no change to the maximum number of blanks which can be substituted for letters in a word.

Step 2580, "End", ends the Adjust Maximum Blanks process 870 represented by FIG. 13.

Proportion/Proportion Inverse

Two formulas (Prop and PropInverse) used by the invention as variously described above may be implemented by the process shown in FIG. 14. Generally speaking, these formulas (Prop and PropInverse) determine the proportion (or inverse proportion) that a given number (student's response) is between two other numbers (range of student responses) and then calculate a number which is the same proportion between a second set of numbers (program behaviors)

The Prop and PropInverse formulas preferably utilize the following five variables:

Val=Value of a student behavior;

RMax=(Raw Maximum) the maximum expected value for the student behavior;

RMin=(Raw Minimum) the minimum expected value for the student behavior;

CMax=(Calculated Maximum) the maximum value to be assigned to process behavior; and CMin=(Calculated Minimum) the minimum value to be assigned to process behavior The calculated value that is returned by the Prop and PropInverse formulas is the value utilized for altering process behavior.

The invention also accounts for student behavior which is out of the expected range as follows. If the value for student behavior is above the range of expected behaviors, it is treated as if it were the maximum expected value. If the value for student behavior is below the range of expected behaviors, it is treated as if it were the minimum expected value.

The Prop and PropInverse formulas also utilize an intermediate variable named Fraction which is the fraction that the student behavior represents within the range of expected values. Subtracting the Fraction from the number one gives the Fraction's inverse.

The invention utilizes the variable Fraction to alter program behavior to further accomplish one of the data driven aspects of the invention. Preferably, the amount to increment the minimum program behavior is equal to the range (CMax−CMin) multiplied times the Fraction (just calculated). Proportion (or Proportion Inverse) is then the minimum process behavior value (CMin) plus the Increment.

The above general description of the Prop and PropInverse formulas and their effect on program behavior is further described in relation to the exemplary implementation shown in FIG. 14 which begins with step 2590, "Start."

Step 2600, "Value above Maximum", follows step 2600 and is a decision point that poses the question: "Is the Value (first parameter) greater than the maximum value for the range to which it is being compared (third parameter)?" If yes, go to step 2610. If no, continue with step 2620.

Step 2610, "Value=Maximum", follows a yes in step 2600. As mentioned above, an out-of-range value is assigned maximum value of the range. The process continues with step 2620.

Step 2620, "Value below Minimum", follows a no in step 2600 and also follows step 2610. Step 2620 is a decision point that poses the question: "Is the Value (first parameter) smaller than the minimum value for the range to which it is being compared (third parameter)?" If yes, go to step 2630. If no, continue with step 2640.

Step 2630, "Value=Minimum", follows a yes in step 2620. The value to be compared is considered to be the minimum value in the range when it is out-of-range. The process continues with step 2640.

Step 2640, "Fraction=(Val−RMin)/RMax−RMin)", follows a no in step 2620 and follows step 2630. Val, RMin, and RMax are the first, second and third parameters mentioned above. Fraction is a decimal with a value of one or less. Fraction is an intermediate variable which is used to represent the proportional distance which variable Val is between RMin and RMax.

Step 2650, "Proportion Inverse", follows step 2640 and is a decision point that poses the question: "Is the function Proportion Inverse?" If yes, go to step 2660. If no, continue with step 2670. In this way, the process shown in FIG. 14 can be used to perform both the Prop and PropInverse calculations.

Step 2670, "Increment=Fraction×(CMax−CMin)", follows steps 2650, 2660. Increment is the product of Fraction (calculated in step 2640) times the difference of parameters four and five, representing the range of process behaviors.

Step 2680, "Proportion=CMin+Increment", follows step 2670. The value returned by the function is parameter four plus Increment (calculated in step 2670).

Step 2690, "End", ends FIG. 16

IP Type 1 (Choose From List) Update Procedure 730

The IP type 1 update procedure 730 is initiated by the Choose From List interactive process explained in reference to FIG. 5 above. In general, the IP type 1 update procedure 730 adjusts the process behavior for the Choose From List interactive process according to the student's performance to further accomplish the data driven aspects of the invention.

Figure 15:
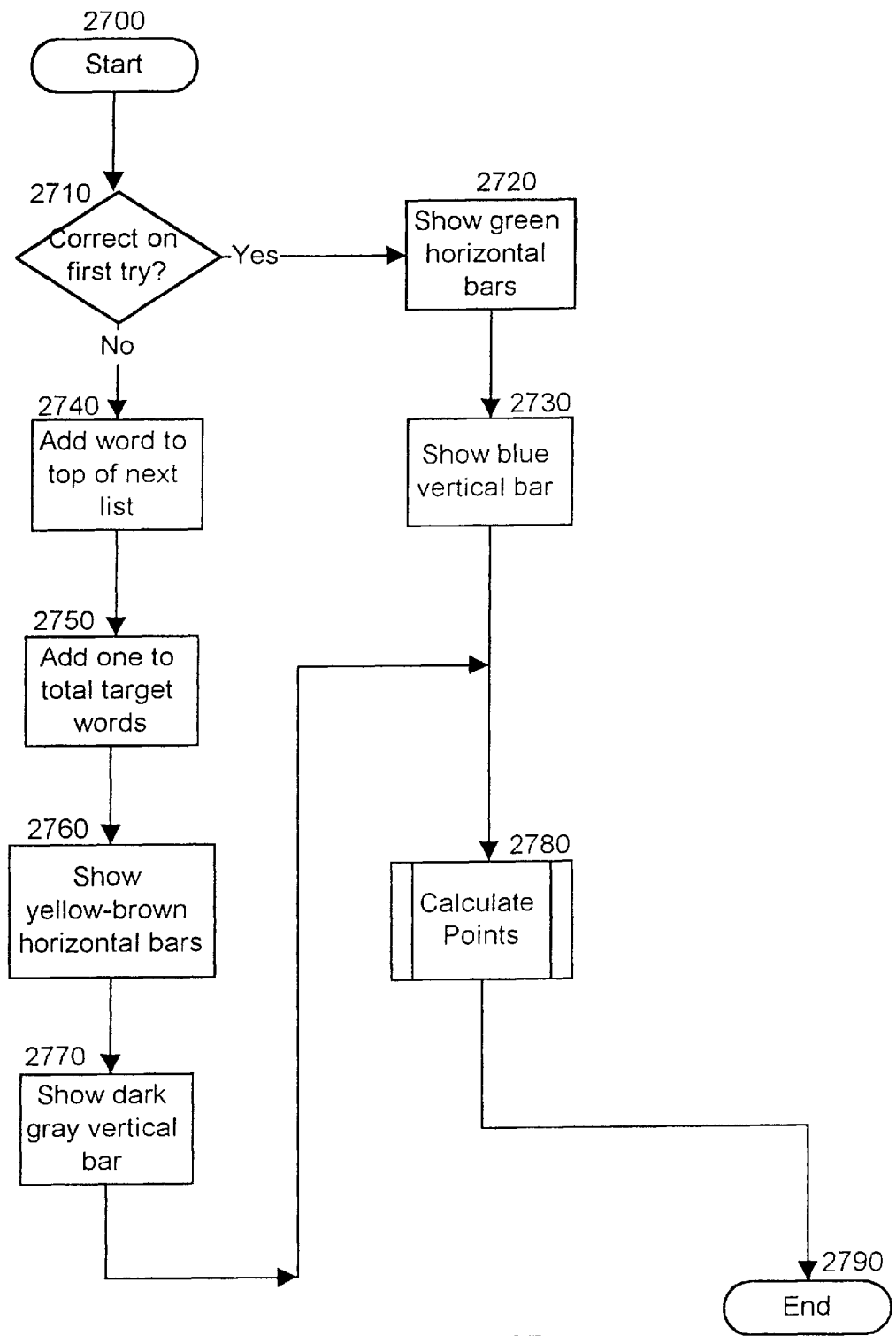
FIG. 15 is a high-level flow chart illustrating a process that updates the Choose From List interactive process according to the invention that may be implemented by the computer system shown in FIG. 18.
Figure 16A:
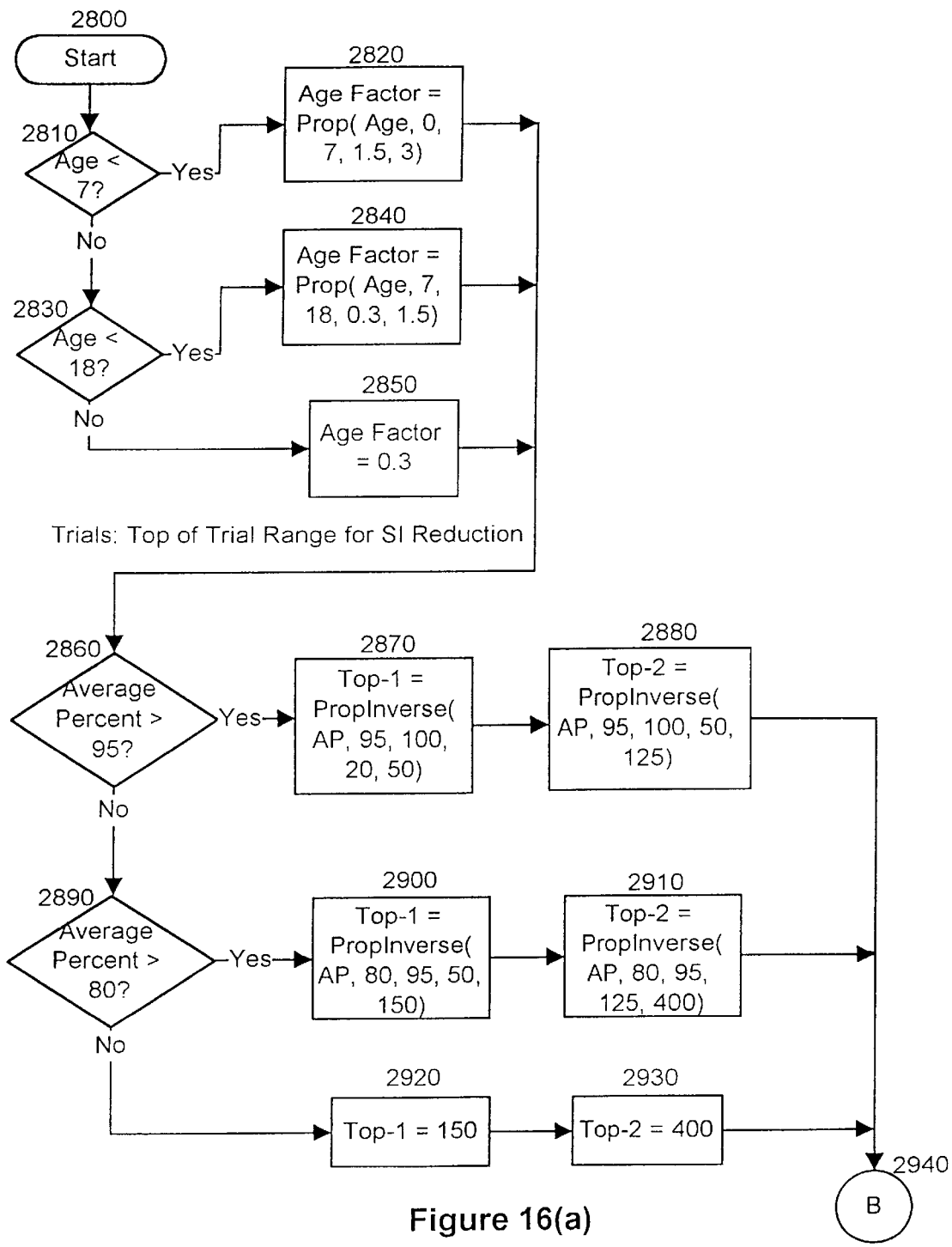
FIGS. 16(a)–(d) are high-level flow charts illustrating a process that adjusts the show interval when a word is displayed in the inventive interactive processes according to the invention that may be implemented by the computer system shown in FIG. 18.
Figure 16B:
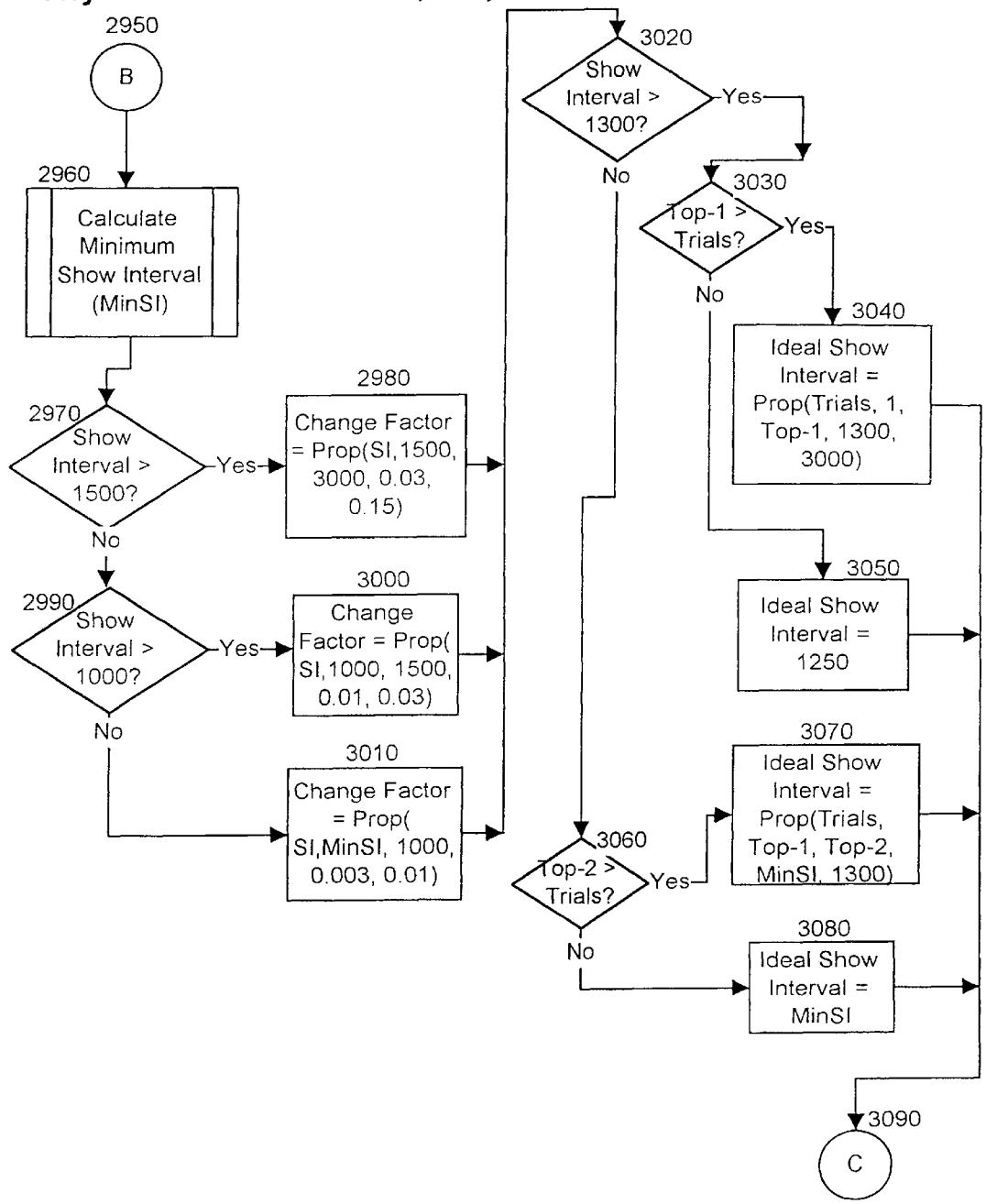
Figure 16C:
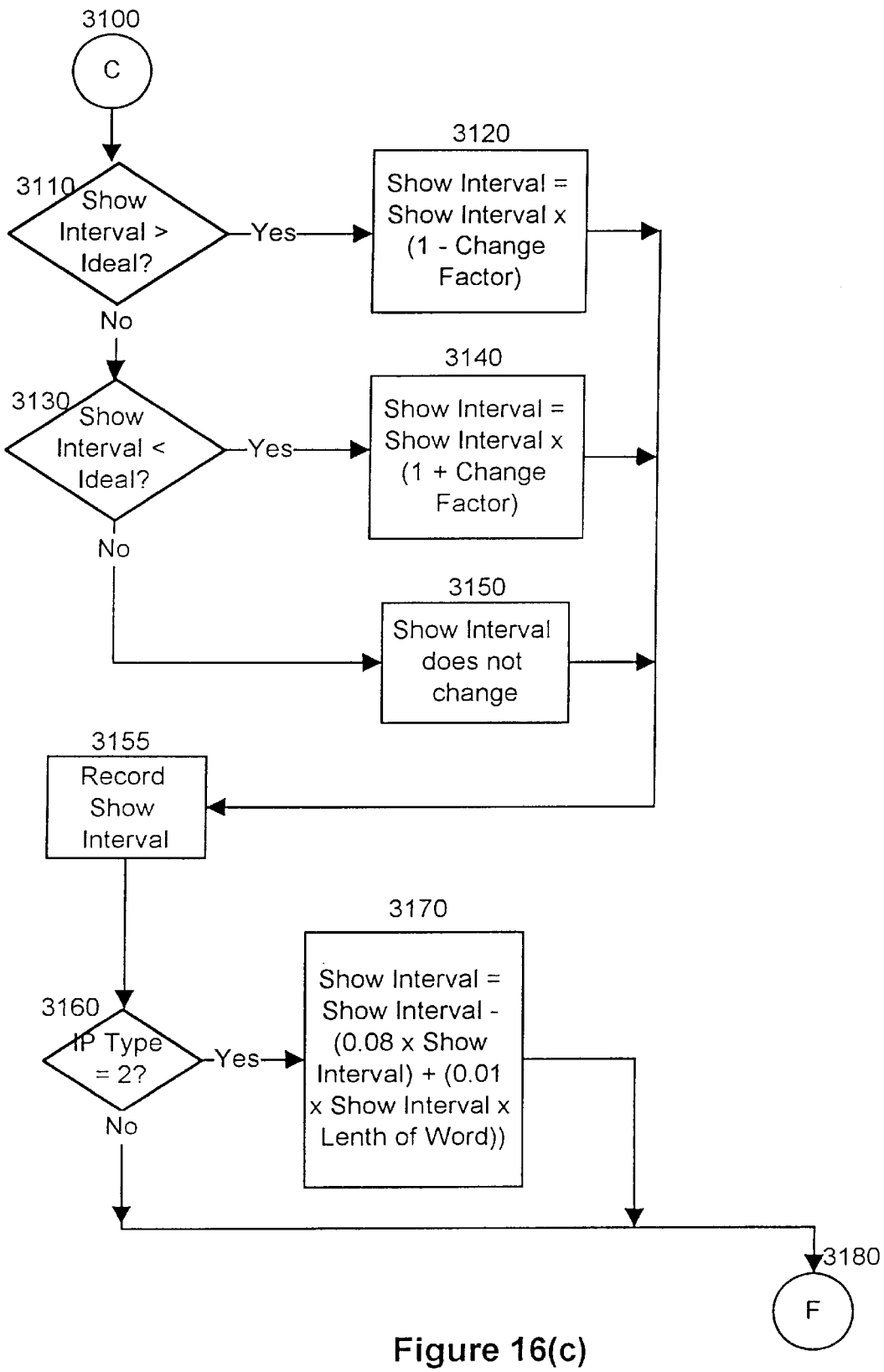
Figure 16D:
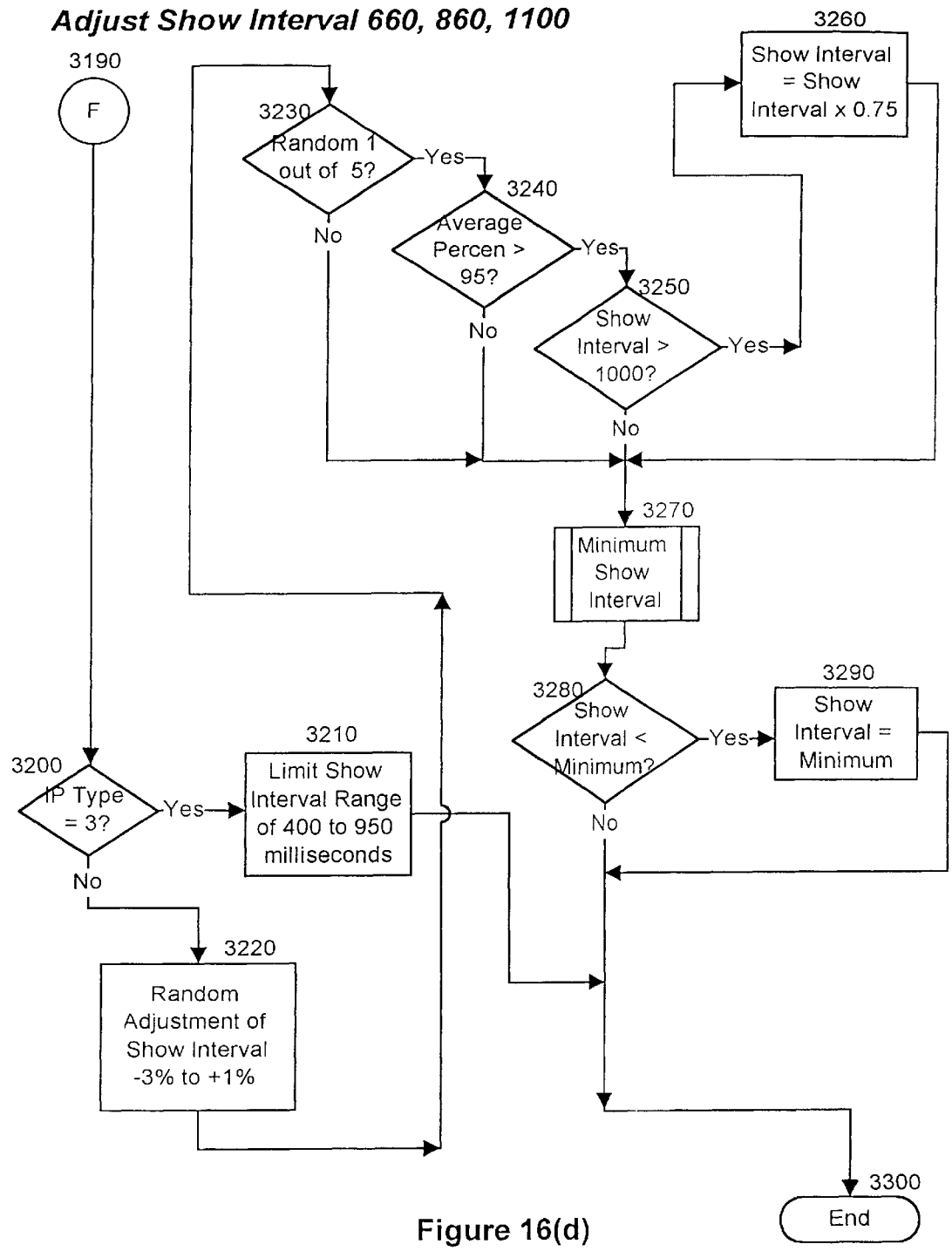

The IP type 1 update procedure 730 may be implemented as shown in FIG. 15 beginning with step 2700, "Start."

Step 2710, "Correct on First Try", follows step 2700 and is a decision point that poses the question: "Was the correct response was on the first try for this presentation, without assistance (such as pressing the Say or Show button 5 or 7, respectively), and within the required time period?" If yes, move to step 2720 to reward the student for correct behavior. If no, go to step 2740 because the substandard student behavior merits punishment and appropriate adjust of the Choose From List interactive process.

Step 2720, "Show green horizontal bar", follows a yes in step 2710. To reward the student for a correct response, some type of positive feedback is generated such as displaying green horizontal bars on either side of the screen for a fraction of a second. The process continues with step 2730.

Step 2730, Show blue vertical bar", follows step 2720. To further reward the student for a response received within the required time period and to provide the student with a variable feedback that depends upon the speed of the response, step 2730 momentarily displays blue vertical bars wherein the height of the vertical bar is proportional to the speed of the response. Preferably, the horizontal bar is displayed (step 2720) at the same time that vertical bars are displayed (step 2730).

Step 2780, "Calculate Points" follows step 2730 and calculates the student's performance on a point scale as described in detail in relation to FIG. 19 below. The process continues with step 2790.

Step 2790, "End", follows step 2780. The process represented by FIG. 15 ends.

Adjust Show Interval 660, 860, 1100

Show interval is the length of time a target word remains visible on display C450, preferably measured in milliseconds. Logically, For IP's which are "Say Only", show interval is 0. In general, shorter show intervals require quicker perception and word recognition on the part of the student. The show interval for a given IP is adjusted slightly (usually decreased) after each word is shown down to a minimum show interval based on student performance.

In addition, there is random variability factor for all show intervals, the magnitude of this variability factor depends on student performance.

The rate of decrease of the show interval is directly related to the duration of the show interval. In other words, large show intervals are decreased faster than short show intervals.

In general, the show interval rate of decrease is inversely related to the following factors:
  number of trials
  average percent
  age (through 18)

Show intervals are captured or recorded for each word to check whether shorter show intervals make a substantial difference in student performance. In such a case, show intervals are temporarily increased.

As mentioned above, there is a minimum show interval for each student based on performance and age.

The invention also utilizes an ideal show interval to determine whether the current show interval should be altered, and if so, in what direction.

Furthermore, the Average Percent correct is used to determine a base number of completed student trials (Top-1 and Top-2) which should be taken for the show interval to decrease to 1300 milliseconds (Top-1) and to decrease to the Minimum Show Interval (Top-2).

The Age factor gives longer number of trials for younger children to get to their minimum show interval. SI Factor (Show Interval Factor) results in quicker reductions in show intervals at slower speeds.

The Adjust Shown Interval procedure is referenced as steps 660, 860 and 1100 in FIGS. 5, 6, 7, respectively.

The Adjust Show Interval may be implemented as shown in FIGS. 16(*a*)–(*d*). Minimum Show Interval (FIG. 17) and Proportion (FIG. 14) are other processes represented by flow charts and used in the Adjust Show Interval procedure.

The Adjust Show Interval procedure shown begins, as shown in FIG. 16(*a*) with step 2800, "Start."

Step 2810, "Age<7" follows step 2800 and is a decision point that accounts for the student's age by posing the question: "Is the age of the student less than seven years old?" If yes, continue with step 2820. If no, do step 2830.

Step 2820, "Age Factor=PropInverse(Age, 0, 7, 1.5 3)" follows a yes in step 2810. In this case, the age factor is preferably between 1.5 and 3, inversely proportional to age between 0 and 7. The process continues with step 2860.

Step 2830, "Age>18" follows a no in step 2810 and is a decision point that further accounts for the student's age by posing the question: "Is the age of the student less than eighteen years old (and not less than seven years old)?" If yes, continue with step 2840. If no, do step 2850.

Step 2840, "Age Factor=PropInverse(Age, 7, 18, 0.3, 1.5)" follows a yes in step 2830. In this case, the age factor is preferably between 0.3 and 1.5, inversely proportional to age between 7 and 18. The process continues with step 1370.

Step 2850, "Age Factor=0.3" follows a no in step 2830. Older students such as those 18 years or older get the smallest age factor (preferably 0.3).

Step 2860, "Average Percent>95", is a decision point that accounts for student performance by posing the question: "Is the average percent for the current IP greater than 95?" If yes, go to step 2870. If no, move to step 2890.

Step 2870, "Top-1=PropInverse(AP, 95, 100, 20, 50)", follows step 2860. Top-1 is the top of the range of trials over which the show interval is gradually decreased to 1300 milliseconds. In this case, Top-1 will be between 20 and 50, inversely proportional to average percent between 95 and 100. The process continues with step 2880.

Step 2880, "Top-2=PropInverse(AP, 95, 100, 50, 125)", follows step 2870. Top-2 is the top of the range of trials over which the show interval gradually decreased from just under 1300 milliseconds to the minimum show interval for the student. In this case, Top-2 will be between 50 and 125, inversely proportional to average percent between 95 and 100. The process continues with step 2940.

Step 2890, "Average Percent>80", is a decision point that further accounts for student performance by posing the question: "Is the average percent for the current IP greater than 80?" If yes, go to step 2900. If no, move to step 2920.

Step 2900, "Top-1=PropInverse(AP, 80, 95, 50, 150)", follows step 2860. Top-1 is the top of the range of trials over which the show interval gradually decreased to 1300 milliseconds. In this case, Top-1 will be between 20 and 50, inversely proportional to average percent between 95 and 100. The process continues with step 2910.

Step 2910, "Top-2=PropInverse(AP, 95, 100, 50, 125)", follows step 2870. Top-2 is the top of the range of trials over which the show interval gradually decreased from just under 1300 milliseconds to the minimum show interval for the student. In this case, Top-2 will be between 50 and 125, inversely proportional to average percent between 95 and 100. The process continues with step 2940.

Step 2920, "Top-1=150"; follows a no in step 2920. Top-1 is the top of the range of trials over which the show interval gradually decreased to 1300 milliseconds. In this case where the student performance is low, Top 1 is 150 trials. The process continues with step 2930.

Step 2930, "Top-2=400", follows step 2920. Top-2 is the top of the range of trials over which the show interval gradually decreased from just under 1300 milliseconds to the minimum show interval for the student. In this case, Top 2 is 400 milliseconds.

Step 2940, "B", ends FIG. 16(*a*) and connects FIG. 16(*a*) to FIG. 16(*b*). Similarly, step 2950, "B", begins FIG. 16(*b*) as a connector from FIG. 16(*a*).

Step 2960, "Calculate Minimum Show Interval (MinSI)", follows step 2950. The smallest or minimum show interval that can be used for this student is calculated as further described in relation to FIG. 17 below.

Step 2970, "Show Interval>1500", follows step 2960 and is a decision point. If yes, the process moves to step 2980. If no, go to step 2990.

Step 2980, "Change Factor=Prop(SI, 1500, 3000, 0.03, 0.15)", follows a yes in step 2970. In this case, the maximum show interval is 3 seconds (3000 milliseconds). The Change Factor will be between 0.03 and 0.15, proportional to the current show interval (SI) between 1500 and 3000 milliseconds. The process continues with step 3020.

Step 2990, "Show Interval>1000", follows a no in step 2970 and is another decision point. If yes, the process moves to step 3000. If no, go to step 3010.

Step 3000, "Change Factor=Prop(SI, 1000, 1500, 0.01, 0.03)", follows a yes in step 2990. In this case, the Change Factor will be between 0.01 and 0.03, proportional to the current show interval (SI) between 1000 and 1500 milliseconds. The process continues with step 3020.

Step 3010, "Change Factor=Prop(SI, MinSI, 1000, 0.003, 0.01)", follows a no in step 2990. In this case, the Change Factor will be between 0.003 and 0.01, proportional to the current show interval (SI) between the minimum show interval for the student and 1000 milliseconds. The process continues with step 3020.

Step 3020, "Show Interval>1300", follows steps 2980, 3000, 3010 and is a decision point that poses the question: "Is the show interval for current student for the current IP greater than 1300 milliseconds?" If yes, go to step 3030. If no, go to step 3060.

Step 3030, "Top-1>Trials", follows a yes in step 3020 and is a decision point that poses the question: "Is Top-1 (calculated in FIG. 16(*a*)) greater than the number of trials the student has completed using the current IP?" If yes, the student is still in the upper range, and the Ideal Show Interval is calculated in step 3040. If no, the student should no longer be in the Top-1 range, so the Ideal Show Interval is 1250.

Step 3040, "Ideal Show Interval=Prop(Trials, 1, Top-1, 1300, 3000)", follows a yes in step 3030. In this case, the ideal show interval will be between 1300 and 3000 milliseconds, proportional to number of trials between 1 and Top-1. The process continues with step 3090.

Step 3050, "Ideal Show Interval=1250", follows a no in step 3030. Show Interval is greater than 1300 (step 3020), which is in the Top-1 range, yet Top-1 is greater than the number of trials for Top-1 processing (step 3030); thus the Ideal Show Interval should be moved from the "above 1300 millisecond range" to the "below 1300 millisecond range". A value of 1250 milliseconds for the Ideal Show Interval set in step 3050 does this. The process continues with step 3090.

Step 3060, "Top-2>Trials", follows a no in step 3020 and is a decision point that poses the question: "Is Top-2 (calculated in FIG. 16(*a*)) greater than the number of trials the student has completed using the current IP?" If yes, the student is still in the range in which trials determines ideal show interval, and the Ideal Show Interval is calculated in step 3070. If no, the student is past the range for calculating intermediary show intervals, thus the Ideal Show Interval is the minimum show interval for the student, the process moves to step 3080.

Step 3070, "Ideal Show Interval=Prop(Trials, Top 1, Top-2, MinSI, 1300)", follows a yes in step 3060. In this case the ideal show interval will be between MinSI and 1300 milliseconds, proportional to number of trials between Top-1 and Top-2. The process continues with step 3090.

Step 3080, "Ideal Show Interval=MinSI", follows a no in step 3060. In this case, the student is past the range for calculating intermediary show intervals, thus the Ideal Show Interval is the minimum show interval for the student. The process continues with step 3090.

Step 3090, "C", follows steps 3040, 3050, 3070, 3080. This is the last step in FIG. 16(*b*). Step 3090 connects FIG. 16(*b*) to FIG. 16(*c*).

Step 3100, "C" begins FIG. 16(*c*) as a connector from FIG. 16(*b*).

Step 3110, "Show Interval>Ideal", follows step 3100 and is a decision point that poses the question: "Is the current show interval greater than the Ideal Show Interval?" If yes, go to step 3120. If no, move to step 3130.

Step 3120, "Show Interval=Show Interval×(1−Change Factor)", follows a yes in step 3110. In this case, the show interval is reduced by the change factor. The process continues with step 3155.

Step 3130, "Show Interval<Ideal", follows a no in step 3110 and is a decision point that poses the question: "Is the current show interval less than the Ideal Show Interval?" If yes, go to step 3140. If no, go to step 3150.

Step 3140, "Show Interval=Show Interval×(1+Change Factor)", follows a no in step 3130. In this case, the show interval is increased by the change factor. The process continues with step 3155.

Step 3150, "Show Interval does not change" follows a no in step 3130. Show Interval stays the same because the show interval equals the ideal show interval. The process continues with step 3155.

Step 3155, "Record Results" follows steps 3120, 3140, 3150. The Show Interval calculated thus far is recorded in, for example, memory C415 for the next time the show interval is changed. Subsequent changes are temporary and will be used for the current word only.

Step 3160, "IP Type=2", follows step 3155. This is a decision point that poses the question: "Is the current IP a Type 2 IP (Fill in Letter Blank)?" If yes, go to step 3170 to further adjust the show interval for IP type 2 and according to the length of the word. If no, continue with step 3180.

Step 3170, "Show Interval=Show Interval−(0.8×Show Interval)+(0.01×Show Interval×Length of Word)." This step follows a yes in FIG. 3160. The show interval is increased slightly for words longer than eight letters and decreased for words shorter than eight letters. The process continues with step 3180.

Step 3180, "F", ends FIG. 16(*c*) and connects FIG. 16(*c*) to FIG. 16(*d*).

Step 3190, "F", begins FIG. 16(*d*) as a connector from FIG. 16(*c*).

Step 3200, "IP Type=3", follows step 3190 and is a decision point that poses the question: "Does the current IP have an IP Type of 3 (Determine Sequence)?" If yes, go to step 3210 to adjust the show interval for IP type 3. If no, continue with step 3220.

Step 3210, "Limit Show Interval Range to 400 to 950" If the Show Interval is above 950 milliseconds, it is now 950 milliseconds for IP type 3. If the Show Interval is below 400 milliseconds, it is now 400 milliseconds. The process skips to step 3300, which is the end of Adjust Show Interval.

Step 3220, "Random Adjustment of Show Interval –3% to +1%" follows a no in step 3200. A random number, preferably between –3% and +1% of the current show interval, is added to the show interval to introduce a random factor into the process which helps keep the student's attention and randomly adjust difficulty within a small range. The process continues with step 3230.

Step 3230, "Random 1 out of 5", follows step 3220 and is a decision point which further introduces a random variability to the process. Whether the decision is a yes or a no is randomly determined, with an 80% chance that the decision will be a no. If yes, go to step 3240. If no, go to step 3270.

Step 3240, "Average Percent>95" follows a yes in step 3230 and poses the question: "Is the average percent for this student on this IP greater than ninety-five. If yes, go to step 3250. If no, go to step 3270.

Step 3250, "Show Interval>1000" follows a yes in step 3240. The question: "Is the present Show Interval greater than 1000 milliseconds (1 second)?" If yes, go to step 3260. If no, go to step 3270.

Step 3260, "Show Interval=Show Interval×0.75", follows a yes in step 3250. Show Interval equals Show Interval times 0.75. For students with an average percent above 95 and a show interval above one second, the Show Interval is dropped by 25 percent on an average of 20 percent of the time.

Step 3270, "Minimum Show Interval", follows a no in step 3230, 3240, 3250 and follows step 3260. The minimum Show Interval for the Student is calculated. See FIG. 17.

Step 3280, "Show Interval<Minimum", follows step 3270 and is a decision point that poses the question: "Is the present show interval is below the Minimum Show Interval." If yes, do step 3290 to prevent a show interval less than the minimum show interval. If no, go to step 3300, then end of Adjust Show Interval.

Step 3290, "Show Interval=Minimum", follows a yes in step 3280. In this case, too low a show interval is prevented by setting the Show Interval equal to the Minimum Show Interval (calculated in step 3270).

Step 3300. "End", ends FIG. 16(*d*) and ends the Adjust Show Interval process that may be implemented as shown in FIGS. 16(*a*)–(*d*).

Minimum Show Interval 2960, 3270

Minimum Show Interval is the shortest show interval in milliseconds that is permitted for a student on a given IP. As described above, the target word is shown to the student for the show interval which can be no less than the minimum show interval.

The base Minimum Show Interval is a function of average percent correct for the IP in question. Additional milliseconds are added for age up to 14, with more added for younger ages. Student Trial Additions are used for the first 50 trials. The Minimum Show interval is the sum of the base minimum, age addition, and student trial addition.

FIG. 14 is a high-level flow chart for performing the Prop and PropInverse (Proportion/Proportion Inverse) calculations which are used for a number of calculations below.

Figure 17:
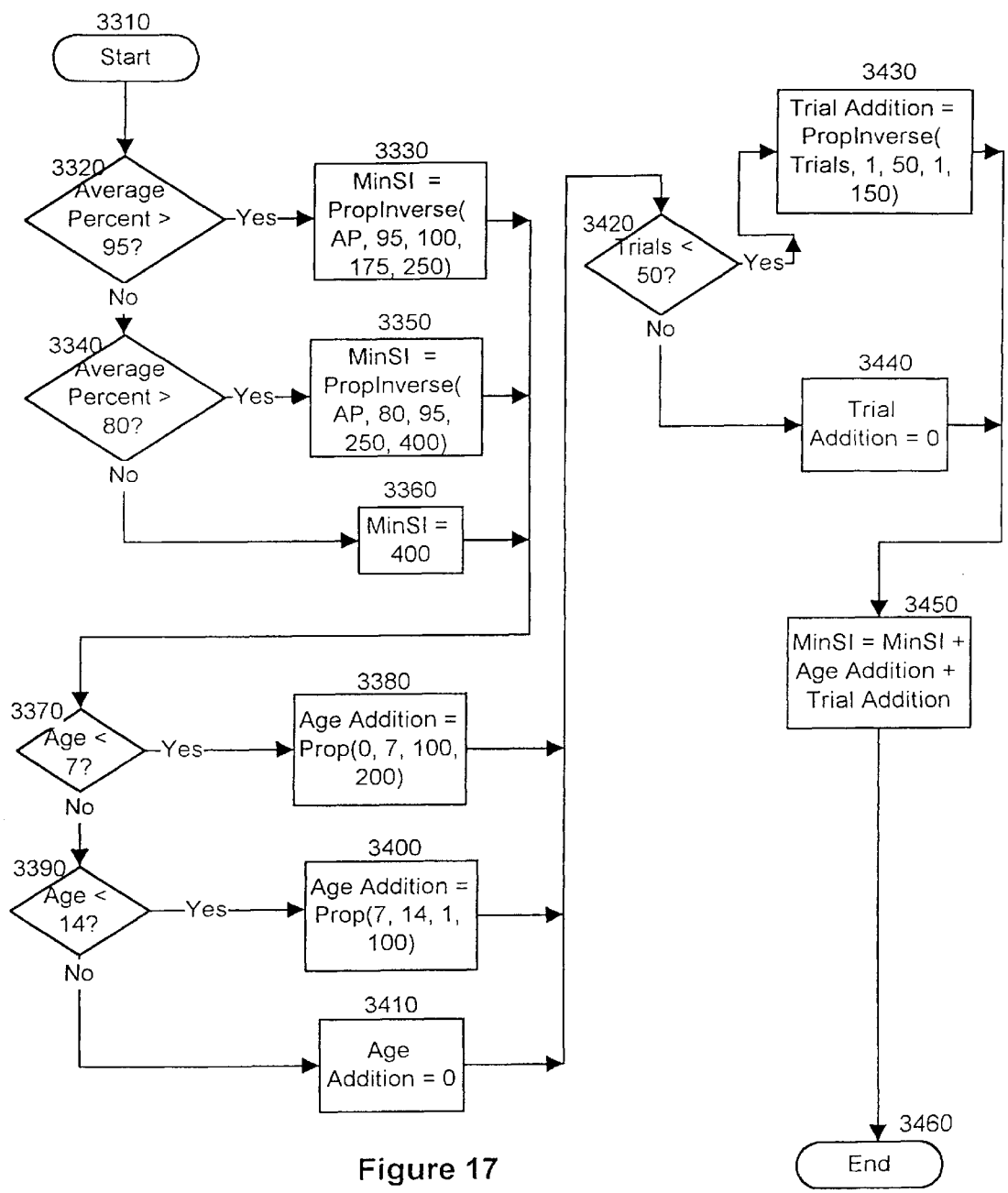
FIG. 17 is a high-level flow chart illustrating a process that determines the minimum show interval when a word is displayed in the inventive interactive processes according to the invention that may be implemented by the computer system shown in FIG. 18.

The Minimum Show Interval determining process may be implemented as shown in FIG. 17 beginning with step 3310, "Start."

Step 3320, "Average Percent>95", follows step 3310 and is a decision point that accounts for student performance by posing the question: "Is the average percent for the current IP greater than ninety-five?"If yes, go to step 3330. If no, move to step 3340.

Step 3230, "MinSI=PropInverse(AP, 95, 100, 175, 250)" follows a yes in step 3320. In this case, the Minimum Show Interval (MinSI) will be between 175 and 250, proportional to the average percent between 95 and 100. The process continues with step 3370.

Step 3340, "Average Percent>80", follows a no in step 3320 and is a decision point that further accounts for student performance by posing the question: "Is the average percent for the current IP greater than eighty (and not greater than ninety-five)?" If yes, go to step 3350. If no, move to step 3360.

Step 3250, "MinSI=PropInverse(AP, 80, 95, 250, 400)" follows a yes in step 3340. In this case, the Minimum Show Interval (MinSI) will be between 250 and 400, proportional to the average percent between 80 and 95. The process continues with step 3370.

Step 3260, "MinSI=400" follows a no in step 3340. For a poorly performing student, the Minimum Show Interval (MinSI) is 400. The process continues with step 3370.

Step 3370, "Age>7" follows steps 3330, 3350, 3360 and is a decision point that factors in student age by posing the question: "Is the age of the student less than seven years old?" If yes, continue with step 3380. If no, do step 3390.

Step 3380, "Age Addition=Prop(Age, 0, 7, 100, 200)" follows a yes in step 3370. The age addition will be between 100and 200, proportional to student age between 0 and 7. The process continues with step 3420.

Step 3390, "Age>14" follows a no in step 3380 and is a decision point that further accounts for student age by presenting the question: "Is the age of the student less than fourteen years old (and not less than seven years old)?" If yes, continue with step 3400. If no, do step 3410.

Step 3400, "Age Addition=PropInverse(Age, 7, 14, 1, 100)" follows a yes in step 3390. In this case, the age addition will be between 1 and 100, inversely proportional to age between 7 and 14. The process continues with step 3420.

Step 3410, "Age Addition=0" follows a no in step 3390. If the student is 14 or older, then there is no Age Addition (Age Addition equals zero). The process continues with step 3420.

Step 3420, "Trials<50" follows steps 3380, 3400, 3410 and is a decision point that accounts for the student's experience level with the invention by posing the question: "Has the student completed fewer than 50 trials which included this IP?" If yes, a Trial Addition is calculated in step 3430. If no, the process continues with step 3440.

Step 3430, "Trial Addition=PropInverse(Trials, 1, 50, 1, 150)" follows a yes in step 3420. In this case, the Trial Addition is between one and one hundred fifty, inversely proportional to the number of trials between one and fifty. The process continues with step 3450.

Step 3440, "Trial Addition=0", follows a no in step 3420. Trial Addition equals zero when the student has experienced 50 or more trials. The process continues with step 3450.

Step 3450 performs the calculation of the Minimum Show Interval (MinSI=MinSI+Age Addition+Trial Addition) which is based on the previous Minimum Show Interval and which factors in the student's age (Age Addition) and student's experience level (Trial Addition).

Step 3460, "End", follows step 3450 and ends FIG. 17 the Minimum Show Interval determining process.

Calculate Points Procedure 2780: IP Type 1 (Choose From List)

When a correct word has been selected as determined by "Correct Word?" decision step 710 (FIG. 5(*a*)) within the Choose From List IP Type 1 procedure, then the IP Type 1 Updates step 730 is performed (FIG. 15) to adjust the IP Type 1 procedure and to provide feedback to the student. Within the IP Type 1 Updates procedure 730 is a step 2780 called calculate points.

The calculate points step 2780 is used to measure student performance. The calculates points step 2780 is actually another procedure that measures student performance in the Choose From List IP. The calculates points step 2780 may be implemented as shown in FIG. 19 which is labelled Calculate Points procedure 2730: IP Type 1 (Choose From List).

The Calculate Points process 2780 for IP Type 1 begins with start step 3500.

Step 3510 is a decision step that poses the question "IP Try=1?" to determine whether the student entered the correct response on the first try. If so, then the student's performance measurement should be the maximum which is handled by progressing to step 3520. If not, then step 3530 is performed.

Step 3520, "IP Try Factor=1" utilizes a variable named "Try Factor" to measure student performance based on how many attempts or tries it takes to answer the choose from list question correctly. In this case, the Try Factor is set to the maximum value (1).

Step 3530 is another decision step that poses the question "IP Try=2?" to determine whether the student entered the correct response on the second try. If so, then the student's performance measurement should be the second highest value by proceeding to step 3540. If not, then step 3550 is performed.

Step 3540 sets the Try Factor variable to the second highest value (0.8).

Step 3550 is another decision step that poses the question "IP Try=3?" to determine whether the student entered the correct response on the second try. If so, then the student's performance measurement should be the third highest value by proceeding to step 3560. If not, then step 3570 is performed.

Step 3560 sets the Try Factor variable to the third highest value (0.4).

Step 3540 sets the Try Factor variable to the lowest value (0.1). Step 3540 also represents a cutoff point in that more than three tries are lumped together into the lowest Try Factor value (0.1).

Step 3580 is executed after steps 3520, 3540, 3560, or 3570. Step 3580, "Percent Points (0.2)" is actually a separate process that is described below in reference to FIG. 26.

In general, the percent points step 3580 calculates a factor called percent points that is based on the IP type and average percent correct of the students responses. The percent points procedure shown in FIG. 26 accepts as an input the maximum points available for the percent points factor. In the case of IP Type 1 (Choose From List), the maximum points is set to 0.2 as indicated by step 3580.

Step 3590, "Speed Points (0.2)" follows step 3580 and is actually a separate process that is further described in relation to FIG. 22 below. Like the percent points procedure, the speed points procedure accepts as an input the maximum points available for the IP Type. For IP Type 1, the maximum points available in the speed points factor is 0.2.

Step 3600, "Show Interval Points (0.1)" follows step 3590 and is actually a separate process that is further described in relation to FIG. 27 below. Like the above factors, a maximum points available for the IP type is an input to the Show Interval Points process. For IP Type 1, the maximum points available in the Show Interval Points factor is 0.1.

Step 3610, "Words In Set Points (0.1)" follows step 3600 and is actually a separate process that calculates points based on the number of words in the set from which the correct response was chosen. Step 3610 is further described in relation to FIG. 28 below. Like the above factors, a maximum points available for the IP type is an input to the Words In Set Points process shown in FIG. 28. For IP Type 1, the maximum points available for the Words In Set Points factor is 0.1.

Step 3620, "Length Points (0.1)" follows step 3610 and is actually a separate process that is further described in relation to FIG. 25 below. Like the above factors, a maximum points available for the IP type is an input to the Length Points process. For IP Type 1, the maximum points available in the Length Points factor is 0.1.

Step 3630, "Word ID Points (0.1)" follows step 3620 and is actually a separate process that is further described in relation to FIG. 24 below. Like the above factors, a maximum points available for the IP type is an input to the Word ID Points process. For IP Type 1, the maximum points available in the Word ID Points factor is 0.1.

Step 3640 follows step 3630. Step 3640 takes all of the factors described above (Speed Points factor, Show Interval Points factor, Length Points factor, Words In Set factor, Word ID points factor, Percent Points factor and Try Factor) and calculates an overall measurement of student performance called points. The preferred calculation performed by step 3640 is:

Points (0.15+Speed Points+Show Interval Points+Length Points+Words In Set Points+Word ID points+Percent Points)×IP Try Factor×0.75

Then End step 3650 is executed which ends the Calculate Points Process 2780 for IP Type 1 (Choose From List).

Calculate Points Procedure 990: IP Type 2 (Fill In Letter Blanks)

During the execution of IP Type 2 (Fill In Letter Blanks), student performance should be measured. As shown in FIG. 6(*a*), this measurement is generally described as step 990 which is labelled Calculate Points: IP Type 2.

The Calculates Points step 990 is actually another procedure that measures student performance in the Fill In Letter Blanks IP type. The Calculates Points step 990 may be implemented as shown in FIG. 20 which is labelled Calculate Points procedure 990: IP Type 2 (Fill In Letter Blanks).

The Calculate Points procedure 990 for IP Type 2 begins with start step 3670.

Step 3680 is a decision step that poses the question "IP Try=1?" to determine whether the student entered the correct response on the first try. If so, then the student's performance measurement should be the maximum which is handled by progressing to step 3690. If not, then step 3700 is performed.

Step 3690, "IP Try Factor=1" utilizes a variable named "Try Factor" to measure student performance based on how many attempts or tries it takes to answer the choose from list question correctly. In this case, the Try Factor is set to the maximum value (1).

Step 3700 is another decision step that poses the question "IP Try=2?" to determine whether the student entered the correct response on the second try. If so, then the student's performance measurement should be the second highest value by proceeding to step 3710. If not, then step 3720 is performed.

Step 3710 sets the Try Factor variable to the second highest value (0.8).

Step 3720 is another decision step that poses the question "IP Try=3?" to determine whether the student entered the correct response on the second try. If so, then the student's performance measurement should be the third highest value by proceeding to step 3730. If not, then step 3740 is performed.

Step 3730 sets the Try Factor variable to the third highest value (0.6).

Step 3740 sets the Try Factor variable to the lowest value (0.3). Step 3740 also represents a cutoff point in that more than three tries are lumped together into the lowest Try Factor value (0.3).

As described herein, the IP try factors are slightly higher for IP Type 2 as compared with IP Type 1 because the Type 2 IP is more difficult and multiple tries should preferably not result in try factors as low as an equivalent try factor for IP Type 1.

Step 3750 is executed after steps 3690, 3710, 3730, and 3740. Step 3750, "Percent Points (0.15)" is actually a separate process that is described below in reference to FIG. 26.

In general, the percent points step 3750 calculates a factor called percent points that is based on the IP type and average percent correct of the student's responses. The percent points procedure shown in FIG. 26 accepts as an input the maximum points available for the percent points factor. In the case of IP Type 2 (Fill In Letter Blanks), the maximum points is set to 0.15 as indicated by step 3750.

Step 3760, "Show Interval Points (0.15)" follows step 3750 and is actually a separate process that is further described in relation to FIG. 27 below. Like the above factors, a maximum points available for the IP type is an input to the Show Interval Points process. For IP Type 2, the maximum points available in the Show Interval Points factor is 0.15.

Step 3770, "Number of Blanks Points (0.20)" follows step 3760 and is actually a separate process that is further described in relation to FIG. 23 below. Like the above factors, a maximum points available for the IP type is an input to the Number of Blanks Points process. For IP Type 2, the maximum points available in the Number of Blanks Points factor is 0.20.

Step 3780, "Length Points (0.15)" follows step 3760 and is actually a separate process that is further described in relation to FIG. 25 below. Like the above factors, a maximum points available for the IP type is an input to the Length Points process. For IP Type 2, the maximum points available in the Length Points factor is 0.15.

Step 3790, "Word ID Points (0.20)" follows step 3780 and is actually a separate process that is further described in relation to FIG. 24 below. Like the above factors, a maximum points available for the IP type is an input to the Word ID Points process. For IP Type 2, the maximum points available in the Word ID Points factor is 0.20.

Step 3800 follows step 3790. Step 3800 takes all of the factors described above (Speed Points factor, Show Interval Points factor, Length Points factor, Number of Blanks factor, Word ID points factor, Percent Points factor and Try Factor) and calculates an overall measurement of student performance called points. The preferred calculation performed by step 3800 is:

Points=(0.15+Speed Points+Show Interval Points+ Length Points+Number of Blanks Points+Word ID points+Percent Points)×IP Try Factor Then, step 3810 proportionally adjusts the value of points as follows:

Points=Prop(Word Percent, 70, 100, 0, 1)×Points In other words, the value of points is adjusted by a proportioned Word Percent value (percentage of the word completed). More particularly, the Word Percent value will be between 0 and 1 proportional to the current Word Percent between 70 and 100. The proportioned Word Percent is then multiplied by Points to arrive at the final value for Points. In this way, the more letters that are correctly filled in the more points are awarded to the student.

Then End step 3820 is then executed which ends the Calculate Points Process 990 for IP Type 2 (Fill In Letter Blanks).

Calculate Points Procedure 1200: IP Type 3 (Determine Sequence)

During the execution of IP Type 3 (Determine Sequence), student performance should be measured. As shown in FIG. 7(*a*), this measurement is generally described as step 1200 which is labelled Calculate Points: IP Type 3.

The Calculates Points step 1200 is actually another procedure that measures student performance in the Determine Sequence IP type. The Calculates Points step 1200 may be implemented as shown in FIG. 21 which is labelled Calculate Points procedure 1200: IP Type 3 (Determine Sequence).

The Calculate Points procedure 1200 for IP Type 3 begins with start step 3830.

Step 3840 "Percent Points (0.20)" is actually a separate process that is described below in reference to FIG. 26.

In general, the percent points step 3840 calculates a factor called percent points that is based on the IP type and average percent correct of the student's responses. The percent points procedure shown in FIG. 26 accepts as an input the maximum points available for the percent points factor. In the case of IP Type 3 (Determine Sequence), the maximum points is set to 0.20 as indicated by step 3840.

Step 3850, "Show Interval Points (0.075)" follows step 3840 and is actually a separate process that is further described in relation to FIG. 27 below. Like the above factors, a maximum points available for the IP type is an input to the Show Interval Points process. For IP Type 3, the maximum points available in the Show Interval Points factor is 0.075. As can be seen by comparing this with the other maximum points available for IP Types 1 and 2 (0.1 and 0.15, respectively), the Show Interval is much less of a factor in determining student performance for IP type 3.

Step 3860, "Words In Set Points (0.4)" follows step 3850 and is actually a separate process that calculates points based on the number of words in the set or sequence of words displayed. Step 3860 is further described in relation to FIG. 28 below. Like the above factors, a maximum points available for the IP type is an input to the Words In Set Points process shown in FIG. 28. For IP Type 3, the maximum points available is the Words In Set Points factor is 0.4 which indicates, relative to the other factors, that the number of words used in the sequence is the most important factor in determining student performance.

Step 3870, "Length Points (0.075)" follows step 3860 and is actually a separate process that is further described in relation to FIG. 25 below. Like the above factors, a maximum points available for the IP type is an input to the Length Points process. For IP Type 3, the maximum points available in the Length Points factor is 0.075 which, in general, indicates the length of the words is a small factor in determining student performance for IP type 3.

Step 3880, "Word ID Points (0.10)" follows step 3870 and is actually a separate process that is further described in relation to FIG. 24 below. Like the above factors, a maximum points available for the IP type is an input to the Word ID Points process. For IP Type 3, the maximum points available in the Word ID Points factor is 0.10.

Step 3890 follows step 3880. Step 3890 takes all of the factors described above (Show Interval Points factor, Length Points factor, Words in Set Points factor, Word ID points factor, Percent Points factor) and calculates an overall measurement of student performance called points. The preferred calculation performed by step 3890 is:

Points=(0.15+Show Interval Points+Length Points+ Words In Set Points+Word ID points+Percent Points)

Then End step 3900 is executed which ends he Calculate Points Process 1200 for IP Type 3 (Determine Sequence).

Speed Points Procedure 3590

Figure 19:
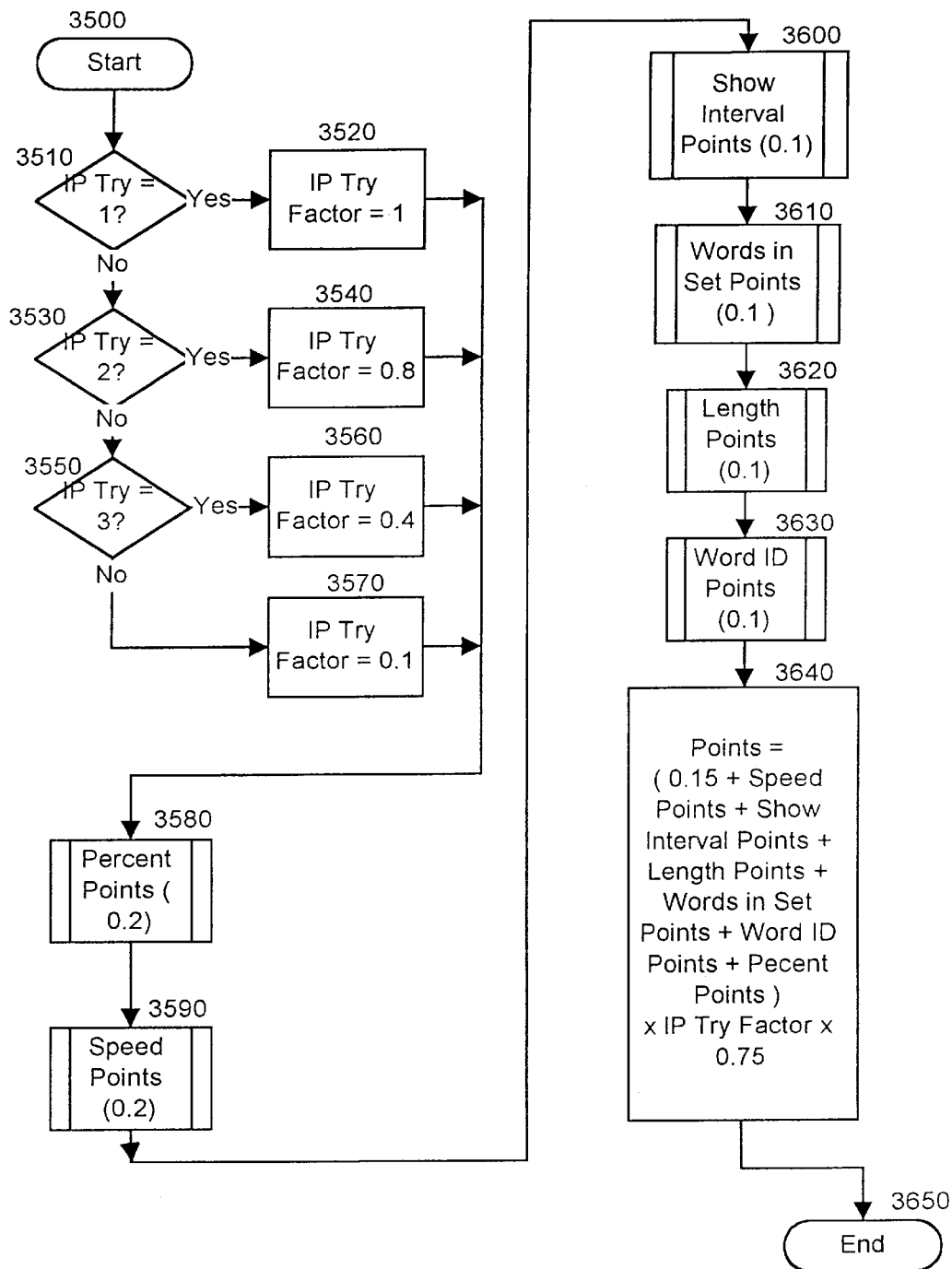
FIG. 19 is a high-level flow chart illustrating a process that calculates points for IP type 1 (Choose From List)
Figure 22:
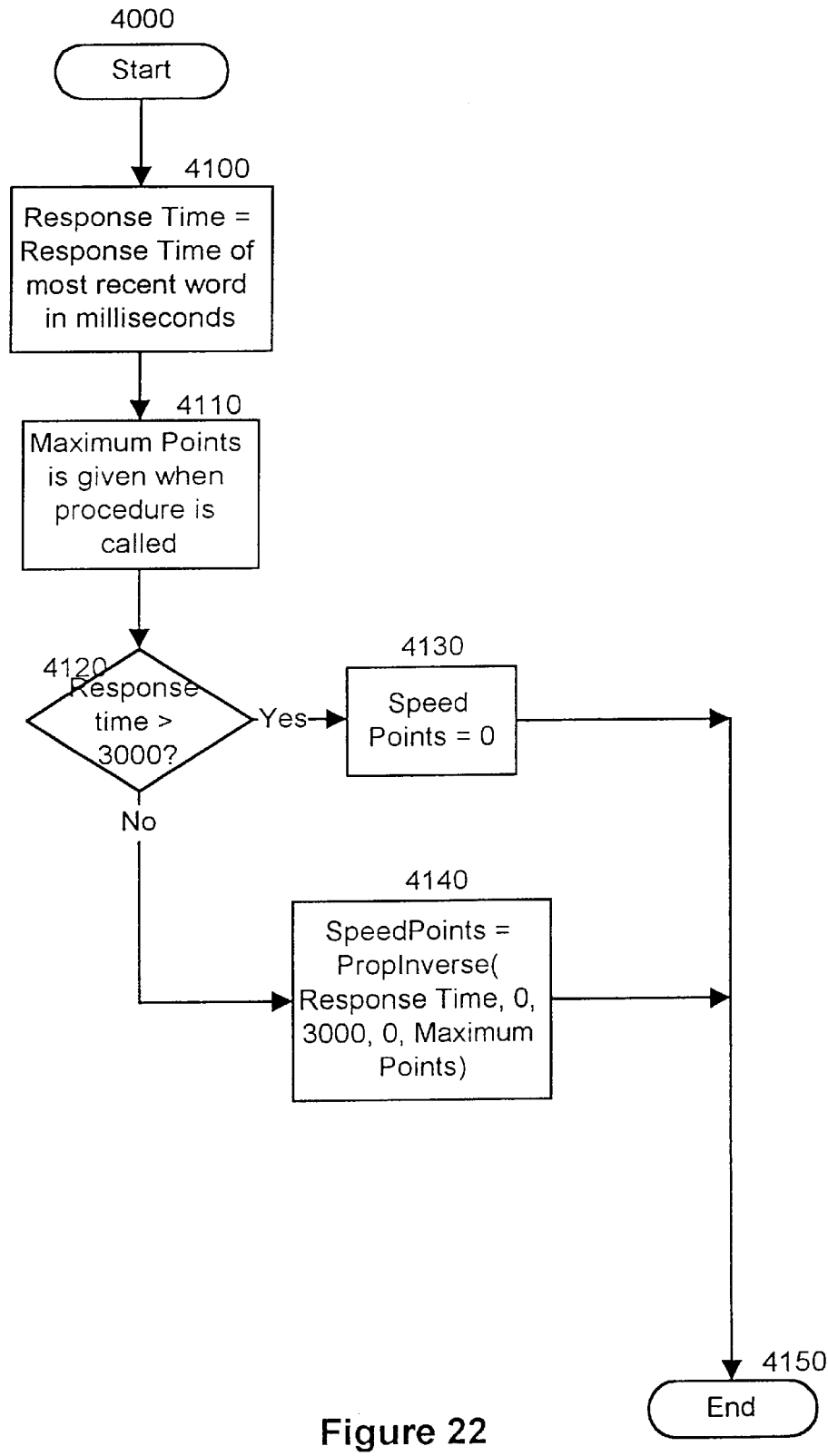
FIG. 22 is a high-level flow chart illustrating a process that calculates speed points (points related to the response time of the student)

FIG. 22 is an implementation of a procedure that calculates speed points and is referenced by speed points (0.2) step 3580 in FIG. 19.

In general, the speed points procedure rewards the student with higher points for a faster response. Preferably, a cut-off or threshold response time is utilized wherein no points are awarded for a response below the threshold response time. Above the threshold response time, the student is preferably awarded points on a proportional basis.

The preferred implementation of the speed points procedure 3590 begins, as shown in FIG. 22, with start step 4000.

Step 4100 is a data input step which accesses the clock C510 to determine the response time of the student and sets the variable Response Time equal to the student's response time to the most recent target word. Preferably, the response time is measured in milliseconds.

Step 4110 follows step 4100 and inputs the maximum point value for this IP type. As illustrated by step 3590 in FIG. 19 "Speed Points (0.2)", the maximum point value is 0.2

Step 4120 is a decision point which tests the Response Time against a threshold value "Response time>3000?" to determine if the students response time exceeds the preferred threshold value of 3000 milliseconds. If so, then step 4130 is executed which gives the student zero speed points. If not, then step 4140 is performed.

Step 4140, "Speed Points=PropInverse(Response Time, 0, 3000, 0, Maximum Points)", calculates Speed Points as a value ranging from 0 to Maximum Points and inversely proportional to the Response Time between 0 and 3000 milliseconds.

Step 4150, "End" follows steps 4130 and 4140 and marks the end of the speed points procedure 3590 of FIG. 22.

Number of Blanks Points Procedure 3770

Figure 20:
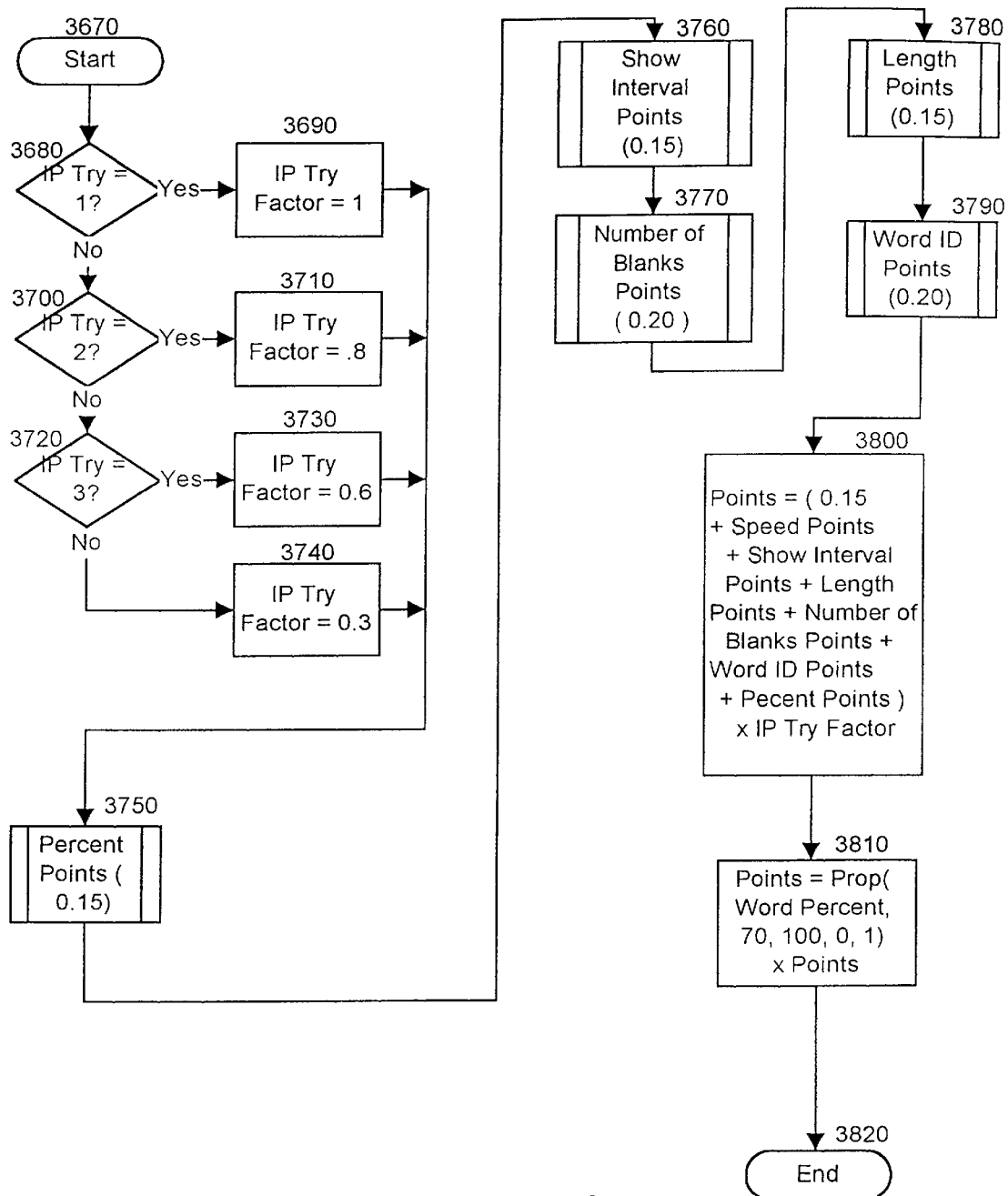
FIG. 20 is a high-level flow chart illustrating a process that calculates points for IP type 2 (Fill In Letter Blanks)
Figure 23:
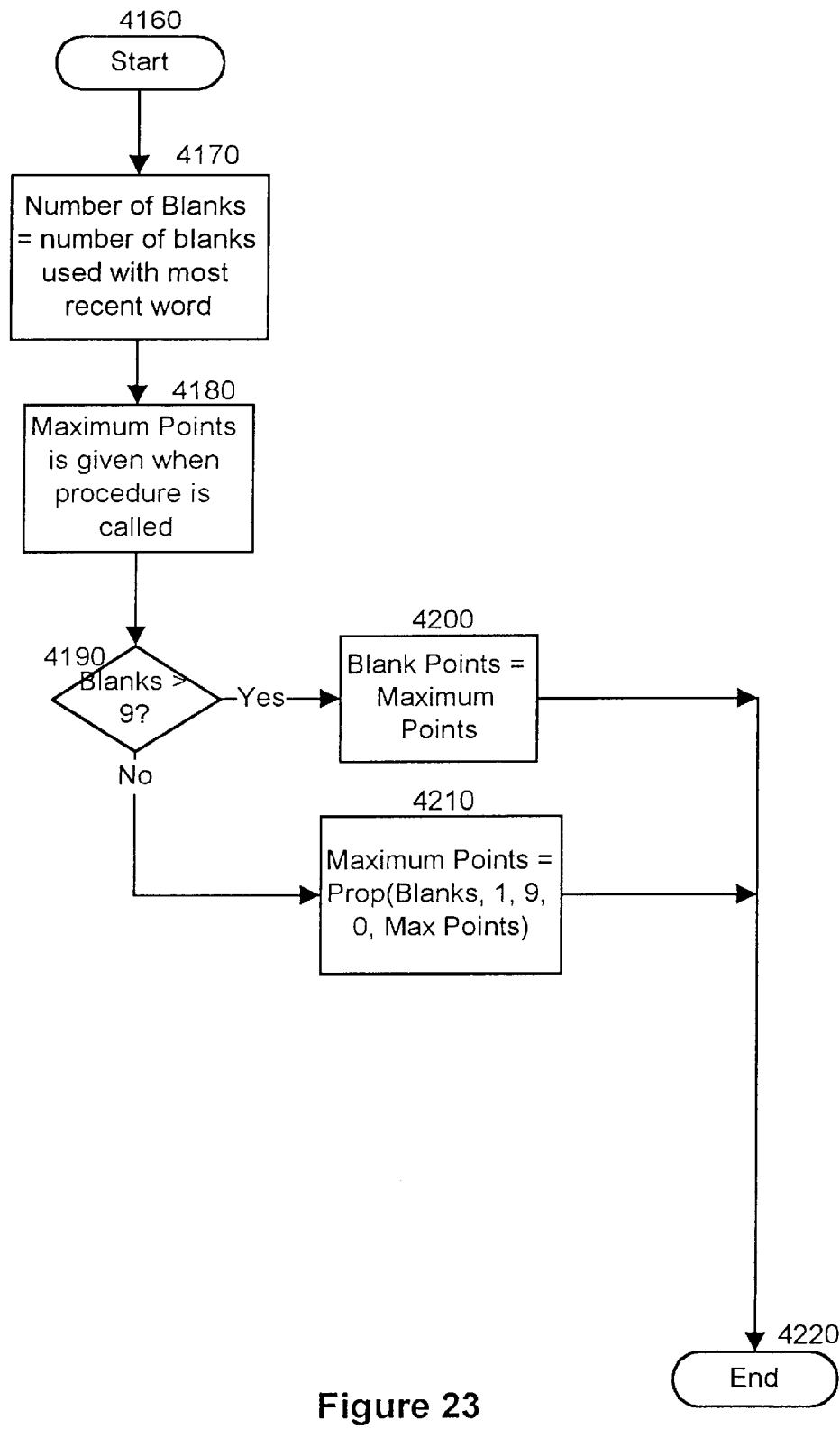
FIG. 23 is a high-level flow chart illustrating a process that calculates blank points (points relating to the degree of difficulty for IP type 2 (Fill In Letter Blanks)

FIG. 23 is an implementation of a procedure that calculates points based on the number of blanks in the target word and is referenced by Number of Blanks Points (0.20) step 3770 in FIG. 20.

In general, the number of blanks points procedure 3770 rewards the student with higher points for a target word having a larger number of blanks. Preferably, a cut-off or threshold response number of blanks is utilized wherein maximum points are awarded for a word having more than the threshold number of blanks. For a target word having fewer than the threshold number of blanks, the student is preferably awarded points on a proportional basis up the maximum points available.

The preferred implementation of the Number of Blanks points procedure 3770 begins, as shown in FIG. 23, with start step 4160.

Step 4170 sets the variable Number of Blanks equal to the number of blanks used with the most recent word tested in IP Type 2.

Step 4180 follows step 4170 and inputs the maximum point value for this IP type. As illustrated by step 3770 in FIG. 20 "Number of Blanks Points (0.20)", the maximum point value is 0.20.

Step 4190 is a decision point which tests the variable Number of Blanks against a threshold value "Blanks>9?" to determine if the Number of Blanks exceeds the preferred threshold value of 9 blanks. If yes, then step 4200 is executed which gives the student the maximum points available. If not, then step 4210 is performed.

Step 4210, "Number of Blanks Points=Prop(Number of Blanks, 1, 9, 0, Max Points)", calculates the Number of Blanks Points as a value ranging from 0 to Maximum Points and proportional to the Number of Blanks between 1 and 9.

Step 4220, "End" follows steps 4200 and 4210 and marks the end of the Number of Blanks Points procedure 3770 of FIG. 23.

Word ID Points Procedure 3630, 3790, 3880

Figure 24:
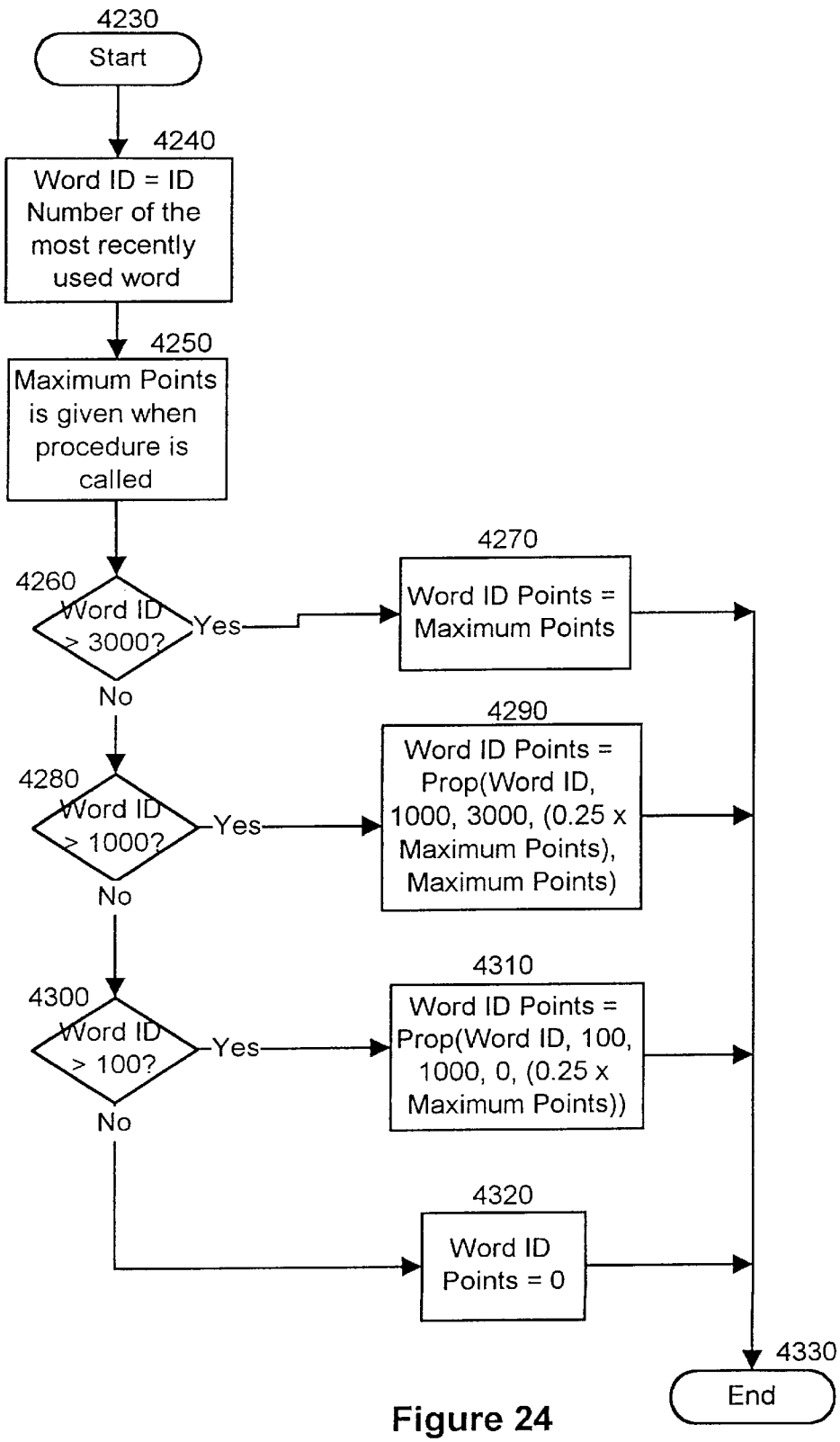
FIG. 24 is a high-level flow chart illustrating a process that calculates word ID points (points relating the degree of difficulty of a word based on the identity of the word)

FIG. 24 is an implementation of a procedure that calculates points based on the difficulty (Word ID) of the target word and is referenced by Word ID Points (0.10) step 3630 in FIG. 19, Word ID Points (0.20) step 3790 in FIG. 20, and Word ID Points (0.10) step 3880 in FIG. 21.

In general, the Word ID Points Procedure rewards the student with higher points for a target word having a higher difficulty. As discussed above, each word is assigned a Word ID with a larger value Word ID indicating a higher degree of difficulty.

Preferably, a cut-off or threshold Word ID is utilized wherein no points are awarded for a word having less than the threshold Word ID.

For a target word having a Word ID exceeding the threshold Word ID, the student is preferably awarded points on a proportional basis up the maximum points available.

The preferred implementation of the Word ID Points procedure 3770 begins, as shown in FIG. 24, with start step 4230.

Step 4240 sets the variable Word ID equal to the ID number of the most recently used word.

Step 4250 follows step 4240 and inputs the maximum point value for the IP type. As illustrated by steps 3630, 3790 and 3880 the maximum point value for IP types 1, 2 and 3 is 0.10, 0.20 and 0.10, respectively.

Step 4260 is a decision point which tests the variable Word ID against a first threshold value. The preferred first threshold is 3000. If the Word ID exceeds the first threshold, then step 4270 is performed which awards the student with the maximum points available for the current IP type. If not, then step 4280 is performed.

Step 4280 is a decision point which tests the variable Word ID against a second threshold value. The preferred second threshold is 1000. If the Word ID exceeds the second threshold, then step 4290 is performed. If not, then step 4300 is performed.

Step 4290 "Word ID Points=Prop(Word ID, 1000, 3000, (0.25×Maximum Points), Maximum Points)", calculates Word ID Points as a value ranging from one-quarter of the maximum points to maximum points and proportional to the Word ID between 1000 and 3000.

Step 4300 is a decision point which tests the variable Word ID against a third threshold value. The preferred third threshold is 100. If the Word ID exceeds the third threshold, then step 4310 is performed. If not, then step 4320 is performed.

Step 4310 "Word ID Points=Prop(Word ID, 100, 1000, 0, (0.25×Maximum Points)", calculates Word ID Points as a value ranging from zero to one-quarter of the maximum points and proportional to the Word ID between 100 and 1000.

Step 4320 sets the Word ID points to zero because a Word ID of 100 or less is an easy word for which the student should receive no points.

Step 4330, "End" follows steps 4270, 4290, 4310 and 4320 and marks the end of the Word ID Points procedure of FIG. 24.

Length Points Procedure 3620, 3780, 3870

Figure 25:
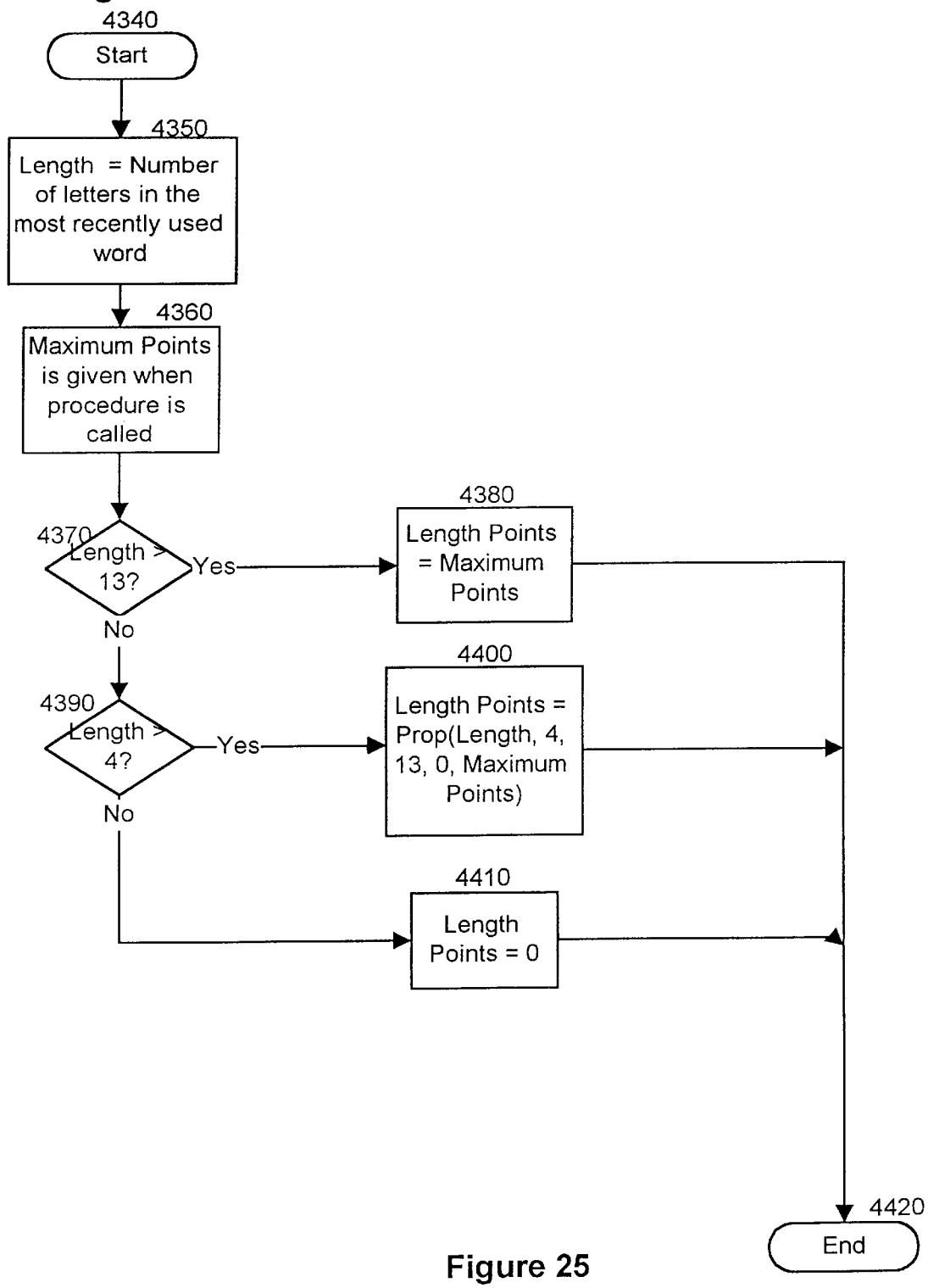
FIG. 25 is a high-level flow chart illustrating a process that calculates length points (points relating the degree of difficulty of a word based on the length of the word)

FIG. 25 is an implementation of a procedure that calculates points based on the length of the target word and is referenced by Length Points (0.10) step 3620 in FIG. 19, Length Points (0.15) step 3780 in FIG. 20, and Length Points (0.075) step 3870 in FIG. 21.

In general, the Length Points Procedure rewards the student with higher points for a target word having a longer length (greater number of letters).

Preferably, cut-off or threshold lengths are utilized wherein no points are awarded for a word having less than a threshold number of letters and maximum points are awarded for a word having greater than another threshold number of letters.

For a target word having a word length between the two threshold word lengths, the student is preferably awarded points on a proportional basis up the maximum points available.

The preferred implementation of the Length Points procedure begins, as shown in FIG. 25, with start step 4340.

Step 4350 sets the variable Length equal to the number of letters in the most recently used word.

Step 4360 follows step 4350 and inputs the maximum point value for the IP type. As illustrated by steps 3620, 3780 and 3870 the maximum point value for IP types 1, 2 and 3 is 0.10, 0.15 and 0.075, respectively.

Step 4370 is a decision point which tests the variable Length against a first threshold value. The preferred first threshold is 13 letters. If the Length exceeds the first threshold, then step 4380 is performed which awards the student with the maximum points available for the current IP type. If not, then step 4390 is performed.

Step 4390 is a decision point which tests the variable Length against a second threshold value. The preferred second threshold is 4 letters. If the Length exceeds the second threshold, then step 4400 is performed. If not, then step 4410 is performed.

Step 4400 "Length Points=Prop(Length, 4, 13, 0, Maximum Points)", calculates Length Points as a value ranging from zero to maximum points and proportional to the Length between 4 and 13 letters.

Step 4410 sets the Length points to zero because a word length of less than 4 letters is an easy word for which the student should receive no points.

Step 4420, "End" follows steps 4380, 4400, and 4410 and marks the end of the Length Points procedure of FIG. 25.

Percent Points Procedure 3580, 3750, 3840

Figure 26:
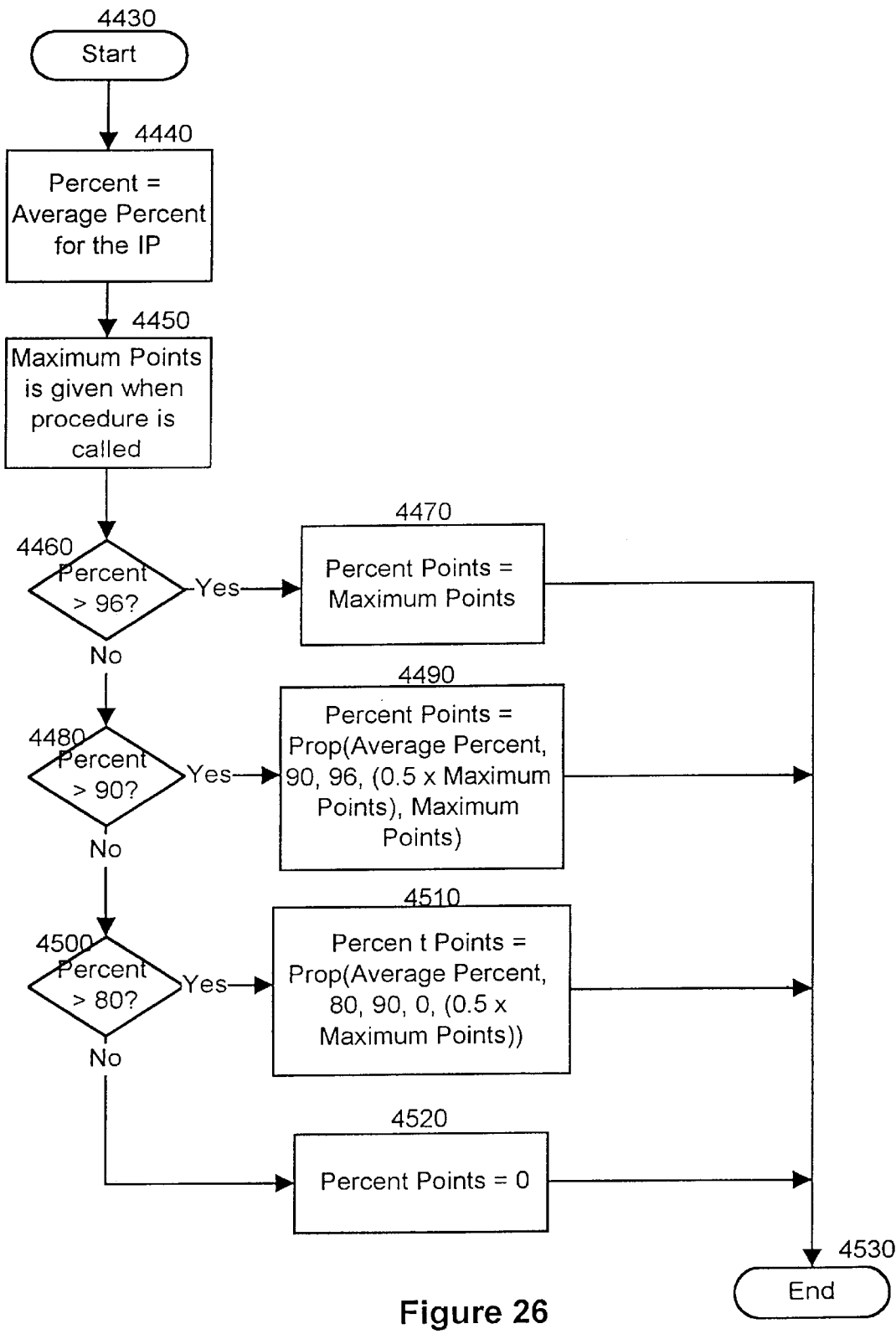
FIG. 26 is a high-level flow chart illustrating a process that calculates percent points (points relating to the number of correct responses)

FIG. 26 is an implementation of a procedure that calculates points based on the percentage of correct responses entered by the student and is referenced by Percent Points (0.20) step 3580 in FIG. 19, Percent Points (0.15) step 3750 in FIG. 20, and Percent Points (0.20) step 3840 in FIG. 21.

In general, the Percent Points Procedure rewards the student with higher points for a greater number of correct responses.

Preferably, cut-off or threshold values are utilized wherein no points are awarded for a poorly performing student and wherein maximum points are awarded for a student with excellent performance.

For a student having an average percent correct between the two thresholds, the student is preferably awarded points on a proportional basis up the maximum points available. Even more preferably, a nonlinear relationship is established which award the student on a proportional basis within several discrete ranges.

The preferred implementation of the Percent Points procedure begins, as shown in FIG. 26, with start step 4430.

Step 4440 sets the variable Percent equal to the average percent correct for the current IP.

Step 4450 follows step 4340 and inputs the maximum point value for the IP type. As illustrated by steps 3580, 3750 and 3840 the maximum point value for IP types 1, 2 and 3 is 0.20, 0.15 and 0.20, respectively.

Step 4460 is a decision point which tests the variable Percent against a first threshold value. The preferred first threshold is 96 percent. If Percent exceeds the first threshold, then step 4470 is performed which awards the student with the maximum points available for the current IP type. If not, then step 4480 is performed.

Step 4480 is a decision point which tests the variable Percent against a second threshold value. The preferred second threshold is 90 percent. If Percent exceeds the second threshold, then step 4490 is performed. If not, then step 4500 is performed.

Step 4490 "Percent Points=Prop(Average Percent, 90, 96, (0.5×Maximum Points), Maximum Points)", calculates Percent Points as a value ranging from half of the maximum points to the maximum points and proportional to the average percent correct for the current IP between 90 and 96 percent correct.

Step 4500 is a decision point which tests the variable Percent against a third threshold value. The preferred third threshold is 80 percent. If Percent exceeds the third threshold, then step 4510 is performed. If not, then step 4520 is performed.

Step 4510 "Percent Points=Prop(Average Percent, 80, 90, 0, (0.5×Maximum Points)", calculates Percent Points as a value ranging from zero to half of the maximum points and proportional to the average percent correct for the current IP between 80 and 90 percent correct.

Step 4520 sets the Percent points to zero because a student having less than (or equal to) an average of 80 percent should receive no Percent points.

Step 4530, "End" follows steps 4470, 4490, 4510, and 4520 and marks the end of the Percent Points procedure of FIG. 26.

Show Interval Points Procedure 3600, 3760, 3850

Figure 27:
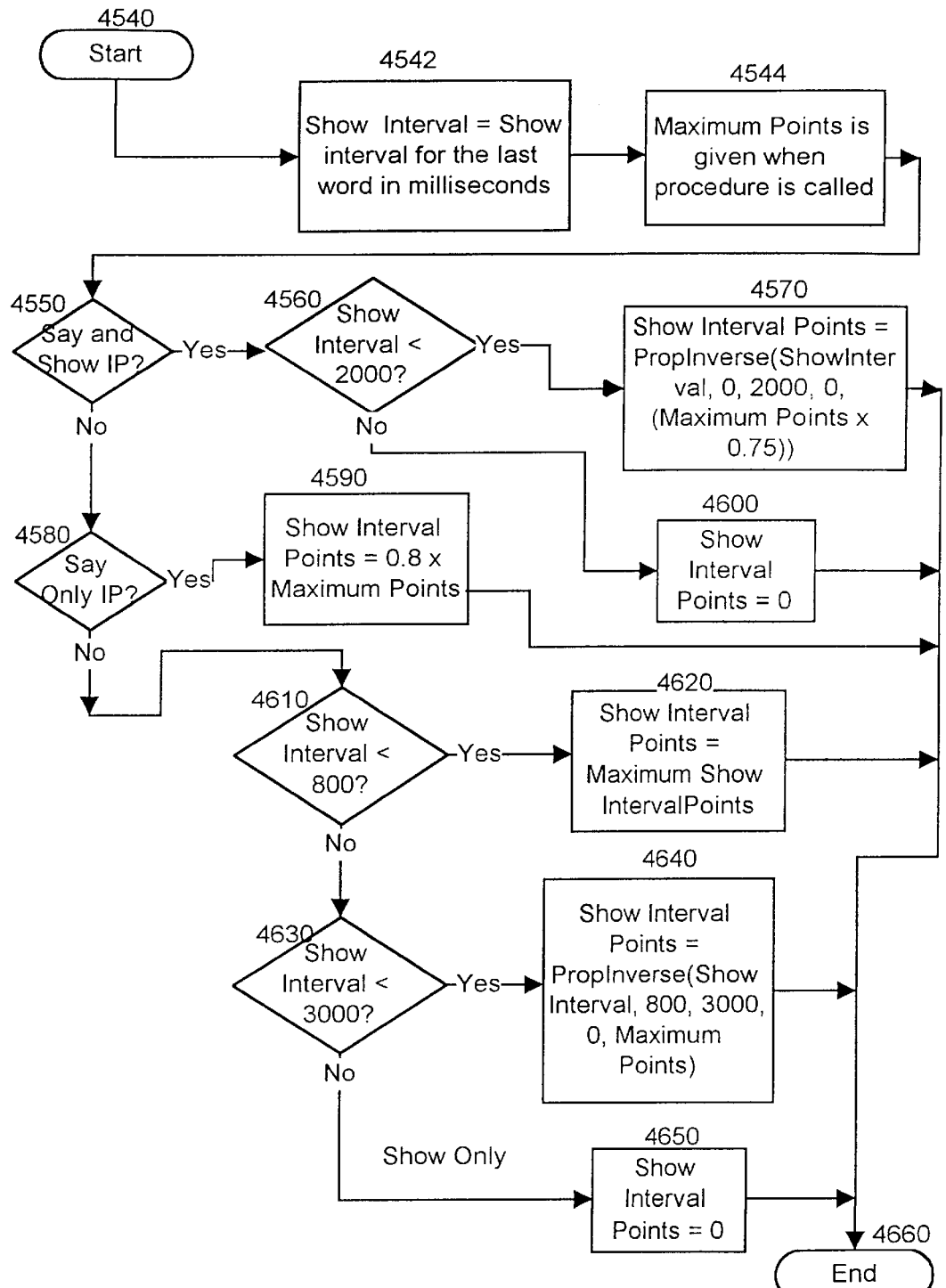
FIG. 27 is a high-level flow chart illustrating a process that calculates show interval points (points relating to the degree of difficulty of the show interval)

FIG. 27 is an implementation of a procedure that calculates points based on the duration of the show interval and is referenced by Show Interval Points (0.10) step 3600 in FIG. 19, Show Interval Points (0.15) step 3760 in FIG. 20, and Show Interval Points (0.075) step 3850 in FIG. 21.

In general, the Show Interval Points Procedure rewards the student with higher points for a show interval having a shorter duration.

Preferably, cut-off or threshold values are utilized wherein no points are awarded for very long duration show interval and wherein maximum points are awarded for a very short duration show interval.

For a show interval between the two thresholds, the student is preferably awarded points on an inversely proportional basis up the maximum points available with respect to the show interval duration. Even more preferably, a nonlinear relationship is established which award the student on an inversely proportional basis within several discrete ranges.

The preferred implementation of the Show Interval Points procedure begins, as shown in FIG. 27, with start step 4540.

Step 4542 sets the variable Show Interval equal to the show interval for the last word (preferably measured in milliseconds by clock C510.

Step 4544 follows step 4542 and inputs the maximum point value for the IP type. As illustrated by steps 3600, 3760 and 3850 the maximum point value for IP types 1, 2 and 3 is 0.10, 0.15 and 0.075, respectively. Then step 4550 is executed.

Step 4550 is a decision point which determines whether the current IP is a Say and Show IP by posing the question "Say and Show IP?" If yes, then step 4560 is performed. If no, then step 4580 is performed.

Step 4560 is a decision point which tests the variable Show Interval Percent against a show and say threshold value. The preferred say and show threshold is 2000 milliseconds. If Show Interval exceeds the threshold, then step 4570 is performed which awards the student with points an in inverse proportional basis. If not, then step 4600 is performed which gives the student no points for a show interval of 2000 milliseconds or greater.

Step 4570 "Show Interval Points=PropInverse(Show Interval, 0, 2000, 0, (Maximum Points×0.75))", calculates Show Interval Points as a value ranging from zero to three-quarters of the maximum points and inversely proportional to the show interval between 2000 and 0 milliseconds. Because the relatively easier say and show IP is being utilized, maximum points are not available to the student.

Step 4580 is a decision point which determines whether the current IP is a Say Only IP by posing the question "Say Only IP?" If yes, then step 4590 is performed which awards the student with a 80% of the maximum available points. If no, then step 4610 is performed.

Step 4610 is a decision point which tests the variable Show Interval against a show only first threshold value. The preferred first threshold is 800 milliseconds. If Show Interval is less than the first threshold, then step 4620 is performed which awards the student with the maximum points available. Otherwise, step 4630 is performed.

Step 4630 is a decision point which tests the variable Show Interval against a show only second threshold value. The preferred second threshold is 3000 milliseconds. If Show Interval is less than the second threshold, then step 4640 is performed which awards the student with the points on an inversely proportional basis. Otherwise, step 4650 is performed which gives the student no Show Interval points because the Show Interval is simply too easy for such a point award.

Step 4640 "Show Interval Points=PropInverse(Show Interval, 800, 3000, 0, Maximum Points)", calculates Show Interval Points as a value ranging from zero to the maximum points and inversely proportional to Show Interval from 800 to 3000 milliseconds.

Step 4660, "End" follows steps 4570, 4600, 4620, 4640 and 4650 and marks the end of the Show Interval Points procedure of FIG. 27.

Words In Set (WIS) Points Procedure 3610, 3860

Figure 28:
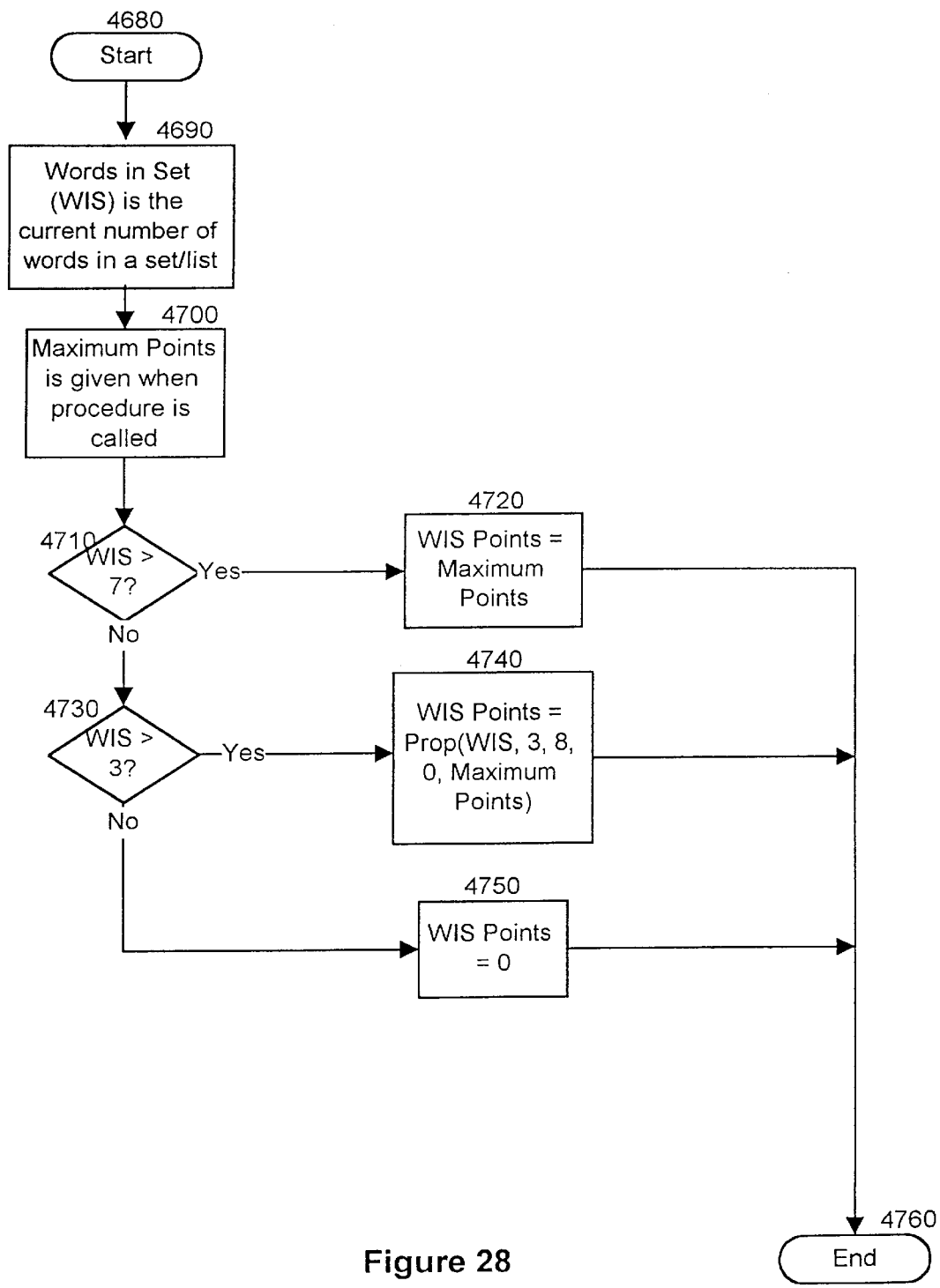
FIG. 28 is a high-level flow chart illustrating a process that calculates Words In Set Points (points relating to the degree of difficulty based on the number of words in the current set of words from which the correct response was chosen.

FIG. 28 is an implementation of a procedure that calculates points based on the number of words in the set from which the correct response was made and is referenced by Words In Set Points (0.10) step 3610 in FIG. 19 and Word In Set Points (0.40) step 3860 in FIG. 21.

In general, the Words in Set Points are awarded points based on the number of words in the set from which the correct response was made. The more words in the set, the more difficult the task, and thus the more points awarded for a correct response.

The number of words in a set at the time the correct response was made (and points are calculated), is determined after the previous trial (or by defaults, if this is the first trial) by the Adjust Words in Set Procedure 170 shown in FIGS. 8(*a*)–(*b*).

Preferably, if the number of words in set (WIS) is more than a threshold value (eg. seven), the student is awarded the maximum number of points allotted to WIS Points. If the WIS is less than another threshold (eg. three or lower), no points are given because the test is deemed to easy for awarding points. If the number of words in set is between the two thresholds, then the number of words in set points is between zero and the maximum possible points, proportional to the number of words in set between the two threshold values.

The preferred implementation of the Words In Set Points procedure begins, as shown in FIG. 28, with start step 4680.

Step 4690, "Words in Set (WIS) is the current number of words in set/list" follows step 4680 and essentially defines the WIS, which is used in subsequent steps 4710 and 4730. The variable WIS is known by the process, determined in the Adjust Words in Set Procedure, FIGS. 8(*a*)–(*b*). The process continues with step 4700.

Step 4700, "Maximum Points is given when procedure is called", follows step 4690, and essentially defines maximum points as a value given whenever WIS Points are calculated. As illustrated by steps 3610 and 3860 the maximum point value for IP types 1 and 3 is 0.10 and 0.40, respectively. Then step 4710 is executed.

Step 4710 is a decision point which tests the variable WIS against a first threshold value. The preferred first threshold is 7 words in the set. If WIS is greater than the first threshold, then step 4720 is performed which awards the student with the maximum points available. Otherwise, step 4730 is performed.

Step 4730 is a decision point which tests the variable WIS against a second threshold value. The preferred first threshold is 3 words in the set. If WIS is greater than the second threshold, then step 4740 is performed which awards the student with the points on a proportional basis available. Otherwise, step 4750 is performed.

Step 4740, "WIS Points=Prop (WIS, 3, 7, 0, Maximum Points)", follows a yes in step 4730 and calculates WIS Points as a value ranging from zero to the maximum points and proportional to WIS from 3 to 7 words in the set.

Step 4760, "END" follows steps 4720, 4740, and 4750 and marks the end of the Words In Set Points process illustrated by FIG. 28.

Formulas to Calculate Program Behavior from Student Responses

There are numerous student response measurements which affect data driven program behavior as described in detail above. The use of intermediate calculations and formulas to determine values for other formulas is done extensively.

To accurately adjust program behavior according to student responses, markedly nonlinear relationships are created by a series of if-then statements (decision steps) at points of non-linearity, which define smaller ranges within which linear relationships are deemed reasonable.

The proportion (Prop) and proportion inverse (PropInverse) functions are also used to determine intermediary values and values within other formulas. These two formulas/functions are used repeatedly in the process of converting student responses to program behavior. These formulas determine the proportion (or inverse proportion) that a given number (students response) is between two other numbers (range of student responses) and then calculates a number which is the same proportion between a second set of numbers (program behaviors).

It is to be understood that using a larger or smaller number of decision steps to define linear ranges would be an obvious modification of the invention to one of ordinary skill in the art and is considered within the range of equivalents disclosed and claimed herein.

The calculations referred to above are done during and after a student trial. Some data/calculations effect the present trial. All data/calculations are used to set up the next student trial.

Data is captured with every response. Data driven process behaviors are determined at the end of each trial and during each trial. The formulas which relate student response variables and other student variables with process behavior are complex, and some can only be shown precisely with long sections of code.

Functionally similar formulas would be sufficient to reproduce this invention. What is important is that there are precise relationships, and the direction of the relationships. In other words, the task should get harder (in small increments) with higher percentages, faster response times, greater mumber of trials completed. The precise rate of change and the relative weights of variables can change without effecting the essential nature of this invention. Even though some improvements can probably be made with such refinements, the exact formulas are considered secondary to the overall nature of the relationship between data captured and process behavior.

Article of Manufacture

The invention disclosed herein may take the form of an article of manufacture. More specifically, the article of manufacture is a computer-usable medium, including a computer-readable program code embodied therein wherein the computer-readable code causes computer C410 to execute the inventive method.

A computer diskette such as disc C480 in FIG. 2 is an example of such a computer-usable medium. When the disc C480 is loaded into the mass storage device C480, the computer-readable program code stored therein is transferred into the computer C410. In this way, the computer C410 may be instructed to perform the inventive methods disclosed herein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer implemented, data driven method of teaching a student to read, comprising the steps of:
   presenting the student with a whole word recognition test, a partial word recognition test, and/or a word sequence recognition test;
   inputting a response from the student;
   determining if the response is correct or incorrect;
   measuring a response time from said presentation step to said inputting step;
   providing feedback to the student based on whether the response is correct or incorrect as determined by said determining step;
   calculating student performance based on the response time and whether the response is correct or incorrect;
   adjusting the difficulty level of the test presented in said presenting step based on the student performance; and
   a first iterating step iterating said presenting step, said inputting step, said determining step, said measuring step, said providing step, said calculating step and said adjusting step.

2. The computer implemented, data driven method of teaching a student to read according to claim 1,
   said providing step providing feedback to the student based on whether the response is correct or incorrect as determined by said determining step and on the response time measured in said measuring step.

3. The computer implemented, data driven method of teaching a student to read according to claim 2,
   wherein the whole word recognition test; the partial word recognition test; and the word sequence recognition test represent three interactive process types respectively corresponding to
      choosing a target word from a list of displayed words by first communicating the target then choosing the target word from a list of subsequently displayed words;
      filling in letter blanks by first communicating a target word and then filling in letter blanks of a displayed, partial target word having blanked letters; and
   determining a correct sequence of words by individually communicating a plurality of words that includes the target word in a first sequence one word at a time, then simultaneously displaying the plurality of words including the target word in a second sequence, and then selecting words from the displayed plurality of words in the first sequence,
   said presenting step presenting the student with at least one of nine interactive processes wherein each interactive process type includes three interactive processes, the three interactive processes including
      a show only process which communicates the target word by displaying the target word for a show interval,
      a say only process which communicates the target word by audibly announcing the target word, and
      a show and say process that communicates the target word by displaying the target word for a show interval and by audibly announcing the target word.

4. The computer implemented, data driven method of teaching a student to read according to claim 3, further comprising the step of:
   a second iterating step iterating said presenting step, said inputting step, said measuring step, said determining step, and said providing step until the response input in said inputting step is the correct response as determined by said determining step;
   said calculating step calculating student performance based on a number of iterations performed by said second iterating step until the correct response was inputted in said inputting step, a difficulty level of the test presented in said presenting step, and the response time measured in said measuring step.

5. The computer implemented, data driven method of teaching a student to read according to claim 4, further comprising the steps of:
   providing the student with a show button, wherein activating the show button causes said presenting step to display the target word for the show interval,
   providing the student with a say button, wherein activating the say button causes said presenting step to aurally announce the target word,
   said calculating step calculating student performance based on whether the show button or the say button has been activated, a number of iterations performed by said second iterating step until the correct response was inputted in said inputting step, the difficulty level of the test presented in said presenting step, and the response time measured in said measuring step.

6. The computer implemented, data driven method of teaching a student to read according to claim 3, further comprising the step of:
   progressively activating interactive processes according to a number of times said first iteration step is performed, said presenting step presenting the student with interactive processes activated by said activating step.

7. The computer implemented, data driven method of teaching a student to read according to claim 3, further comprising the step of:

recording the student's response to the interactive process;

said calculating step calculating student performance based on an average percent correct of all past student responses recorded by said recording step, the difficulty level of the interactive process presented in said presenting step, and the response time measured in said measuring step; and said adjusting step adjusting the difficulty level of the test presented in said presenting step based on the student performance calculated in said calculating step.

8. The computer implemented, data driven method of teaching a student to read according to claim 7, further comprising the step of:

inputting the student's age wherein the student's age may be a chronological age or a reading level, said calculating step calculating student performance based on a average percent correct of all past student responses recorded by said recording step, the difficulty level of the inter active process presented in said presenting step, and the response time measured in said measuring step; and said adjusting step adjusting the difficulty level of the test presented in said presenting step based on the student performance calculated in said calculating step and the student's age inputted in said inputting step.

9. The computer implemented, data driven method of teaching a student to read according to claim 8, further comprising the steps of:

said adjusting step adjusting the difficulty level of the test presented in said presenting step by adjusting the duration of the show interval if the interactive process is the show only process or the show and say process;

said calculating step calculating student performance based on the duration of the show interval, an average percent correct of all past student responses recorded by said recording step, the difficulty level of the interactive process presented in said presenting step, and the response time measured in said measuring step.

10. The computer implemented, data driven method of teaching a student to read according to claim 9, said adjusting the duration of the show interval step decreasing the show interval after each target word is shown at a rate of decrease that is directly related to the duration of the show interval.

11. The computer implemented, data driven method of teaching a student to read according to claim 9, said adjusting the duration of th e show interval step adjusting the duration of the show interval based on the student performance and/or student age.

12. The computer implemented, data driven method of teaching a student to read according to claim 9, further comprising the steps of:

determining if the student performance has substantially decreased from one iteration to another iteration of said first iterating step, temporarily increasing the show interval if said determining step determines that the student performance has substantially decreased.

13. The computer implemented, data driven method of teaching a student to read according to claim 9, said adjusting the duration of the show interval step adjusting the duration of the show interval by utilizing a random variability factor.

14. The computer implemented, data driven method of teaching a student to read according to claim 13, further comprising the step of:

adjusting the random variability factor based on student performance.

15. The computer implemented, data driven method of teaching a student to read according to claim 3, said adjusting step adjusting the difficulty level of the choosing a target word from a list interactive process presented in said presenting step by adjusting the number of words in the list based on student age and student performance;

said adjusting step adjusting the difficulty level of the determining a correct sequence of words interactive process presented in said presenting step by adjusting the number of the words in the sequence according to student age and student performance;

said calculating step calculating student performance based on the number of words in the list or sequence.

16. The computer implemented, data driven method of teaching a student to read according to claim 3, wherein each word utilized in the interactive processes includes an associated word ID that identifies a relative difficulty of the associated word, said adjusting step adjusting the difficulty level of the interactive process presented in said presenting step by progressively adding more difficult words to the words utilized in the interactive process according to the number of iterations performed by said first iterating step; and said calculating step calculating student performance based on the word ID of the most recently added word.

17. The computer implemented, data driven method of teaching a student to read according to claim 3, wherein each word utilized in the interactive processes includes an associated length that corresponds to a relative difficulty of the associated word, said adjusting step adjusting the difficulty level of the interactive process presented in said presenting step by progressively adding different words to the words utilized in the interactive process according to the number of iterations performed by said first iterating step; and said calculating step calculating student performance based on the length of the most recently added word.

18. The computer implemented, data driven method of teaching a student to read according to claim 3, said adjusting step adjusting the difficulty level of the filling in letter blanks interactive process presented in said presenting step by gradually and proportionally adjusting how many blanks are to be filled in by the student based on student age, student performance and number of iterations performed by said first iterating step;

said calculating step calculating student performance based on the number of blanks to be filled in by the student.

19. The computer implemented, data driven method of teaching a student to read according to claim 18, further comprising the step of:

randomly determining which letters will be shown as blank when the filling in letter blanks interactive process is presented in said presenting step.

20. The computer implemented, data driven method of teaching a student to read according to claim 3, further comprising the step of:

moving the target word from one of the interactive processes to another interactive process based on student performance.

21. A data driven apparatus for teaching a student to read, comprising:

a presenter presenting the student with a whole word recognition test, a partial word recognition test, and/or a word sequence recognition test;

an input device inputting a response from the student;

a determining unit determining if the response is correct or incorrect;

a clock for measuring a response time of the student to the test presented by said presenter;

a feedback unit providing feedback to the student based on whether the response is correct or incorrect as determined by said determining unit;

a calculator calculating student performance based on the response time measured by said clock and whether the response is correct or incorrect;

an adjuster adjusting the difficulty level of the test presented by said presenter according to the student performance; and a first iterator iterating the functions performed by said presenter, said input device, said determining unit, said feedback unit, said clock, said calculator and said adjuster.

22. The data driven apparatus for teaching a student to read according to claim 21, said feedback unit providing feedback to the student based on whether the response is correct or incorrect as determined by said determining unit and on the response time measured by said clock.

23. The data driven apparatus for teaching a student to read according to claim 22, wherein the whole word recognition test; the partial word recognition test; and the word sequence recognition test represent three interactive process types respectively corresponding to choosing a target word from a list of displayed words by first communicating the target then choosing the target word from a list of subsequently displayed words;

filling in letter blanks by first communicating a target word and then filling in letter blanks of a displayed, partial target word having blanked letters; and determining a correct sequence of words by individually communicating a plurality of words that includes the target word in a first sequence one word at a time, then simultaneously displaying the plurality of words including the target word in a second sequence, and then selecting words from the displayed plurality of words in the first sequence, said presenter presenting the student with at least one of nine interactive processes wherein each interactive process type includes three interactive processes, the three interactive processes including a show only process which communicates the target word by displaying the target word for a show interval, a say only process which communicates the target word by audibly announcing the target word with a speaker or headphone, and a show and say process that communicates the target word by displaying the target word for a show interval and by audibly announcing the target word with a speaker or headphone.

24. The data driven apparatus for teaching a student to read according to claim 23, further comprising:

a second iterator iterating said presenter, said input device, said clock, said determining unit, and said feedback unit until the response input by said input device is the correct response as determined by said determining unit;

said calculator calculating student performance based on a number of iterations performed by said second iterator until the correct response was inputted by said input device, a difficulty level of the test presented by said presenter, and the response time measured by said clock.

25. The data driven apparatus for teaching a student to read according to claim 24, further comprising:

a show button, wherein activating the show button causes said presenter to display the target word for the show interval, a say button, wherein activating the say button causes said presenter to aurally announce the target word with a speaker or headphone, said calculator calculating student performance based on whether the show button or the say button has been activated, a number of iterations performed by said second iterator until the correct response was inputted by said input device, the difficulty level of the test presented by said presenter, and the response time measured by said clock.

26. The data driven apparatus for teaching a student to read according to claim 23, further comprising:

a progressive activator progressively activating interactive processes according to a number of times said first iterator iterates, said presenter presenting the student with interactive processes activated by said progressive activator.

27. The data driven apparatus for teaching a student to read according to claim 23, further comprising:

a memory recording the student's response to the interactive process;

said calculator calculating student performance based on an average percent correct of all past student responses recorded by said memory, the difficulty level of the interactive process presented by said presenter, and the response time measured by said clock; and said adjuster adjusting the difficulty level of the test presented by said presenter based on the student performance calculated in said calculator.

28. The data driven apparatus for teaching a student to read according to claim 27, further comprising:

said input device inputting the student's age wherein the student's age may be a chronological age or a reading level, said calculator calculating student performance based on an average percent correct of all past student responses recorded by said memory, the difficulty level of the interactive process presented by said presenter, and the response time measured by said clock; and said adjuster adjusting the difficulty level of the test presented by said presenter based on the student performance calculated in said calculator and the student's age inputted by said input device.

29. The data driven apparatus for teaching a student to read according to claim 28, further comprising:
   said adjuster adjusting the difficulty level of the test presented by said presenter by adjusting the duration of the show interval if the interactive process is the show only process or the show and say process;
   said calculator calculating student performance based on the duration of the show interval, an average percent correct of all past student responses recorded by said memory, the difficulty level of the interactive process presented by said presenter, and the response time measured by said clock.

30. The data driven apparatus for teaching a student to read according to claim 29,
   said adjust or adjusting the duration of the show interval by decreasing the show interval after each target word is shown at a rate of decrease that is directly related to the duration of the show interval.

31. The data driven apparatus for teaching a student to read according to claim 29,
   said adjuster adjusting the duration of the show interval by adjusting the duration of the show interval based on the student performance and/or student age.

32. The data driven apparatus for teaching a student to read according to claim 29, further comprising:
   a performance decrease determining unit determining if the student performance has substantially decreased from one iteration to another iteration of said first iterator,
   temporarily increasing the show interval if said determining unit determines that the student performance has substantially decreased.

33. The data driven apparatus for teaching a student to read according to claim 29, further comprising:
   a random number generator generating a random number;
   said adjuster adjusting the duration of the show interval by utilizing a random variability factor that is based on the random number generated by said random number generator.

34. The data driven apparatus for teaching a student to read according to claim 33, further comprising:
   said adjuster adjusting the random variability factor based on student performance.

35. The data driven apparatus for teaching a student to read according to claim 23,
   said adjuster adjusting the difficulty level of the choosing a target word from a list interactive process presented by said presenter by adjusting the number of words in the list based on student age and student performance;
   said adjuster adjusting the difficulty level of the determining a correct sequence of words interactive process presented by said presenter by adjusting the number of the words in the sequence according to student age and student performance;
   said calculator calculating student performance based on the number of words in the list or sequence.

36. The data driven apparatus for teaching a student to read according to claim 23,
   wherein each word utilized in the interactive processes includes an associated word ID that identifies a relative difficulty of the associated word,
   said adjuster adjusting the difficulty level of the interactive process presented by said presenter by progressively adding more difficult words to the words utilized in the interactive process according to the number of iterations performed by said first iterator; and
   said calculator calculating student performance based on the word ID of the most recently added word.

37. The data driven apparatus for teaching a student to read according to claim 23,
   wherein each word utilized in the interactive processes includes an associated length that corresponds to a relative difficulty of the associated word,
   said adjuster adjusting the difficulty level of the interactive process presented by said presenter by progressively adding different words to the words utilized in the interactive process according to the number of iterations performed by said first iterator; and
   said calculator calculating student performance based on the length of the most recently added word.

38. The data driven apparatus for teaching a student to read according to claim 23,
   said adjuster adjusting the difficulty level of the filling in letter blanks interactive process presented by said presenter by gradually and proportionally adjusting how many blanks are to be filled in by the student based on student age, student performance and number of iterations performed by said first iterator;
   said calculator calculating student performance based on the number of blanks to be filled in by the student.

39. The data driven apparatus for teaching a student to read according to claim 38, further comprising:
   a randomness unit randomly determining which letters will be shown as blank when the filling in letter blanks interactive process is presented by said presenter.

40. The data driven apparatus for teaching a student to read according to claim 23, further comprising:
   moving the target word from one of the interactive processes to another interactive process based on student performance.

41. An article of manufacture, comprising:
   a computer-usable medium including computer-readable program code means, embodied therein, for causing a computer to perform a data driven method of teaching a student to read, the computer-readable program code means comprising:
      computer-readable program code means for presenting the student with a whole word recognition test, a partial word recognition test, and/or a word sequence recognition test;
      computer-readable program code means for inputting a response from the student;
      computer-readable program code means for determining if the response is correct or incorrect;
      computer-readable program code means for measuring a response time of the student;
      computer-readable program code means for providing feedback to the student based on whether the response is correct or incorrect as determined by said computer-readable program code means for determining;
      computer-readable program code means for calculating student performance based on the response time and whether the response is correct or incorrect;
      computer-readable program code means for adjusting the difficulty level of the test presented by said computer-readable program code means for presenting based on the student performance; and
      first computer-readable program code means for iterating the functions performed by said computer-readable program code means for presenting, said computer-readable program code means for inputting, said computer-readable program code means for determining, said computer-readable program code means for providing, said computer-readable program code means for calculating and said computer-readable program code means for adjusting.

42. The article of manufacture according to claim 41, said computer-readable program code means for providing feedback to the student based on whether the response is correct or incorrect as determined by said computer-readable program code means for determining and on the response time measured by said computer-readable program code means for measuring a response time.

43. The article of manufacture according to claim 42, wherein the whole word recognition test; the partial word recognition test; and the word sequence recognition test represent three interactive process types respectively corresponding to choosing a target word from a list of displayed words by first communicating the target then choosing the target word from a list of subsequently displayed words;

filling in letter blanks by first communicating a target word and then filling in letter blanks of a displayed, partial target word having blanked letters; and determining a correct sequence of words by individually communicating a plurality of words that includes the target word in a first sequence one word at a time, then simultaneously displaying the plurality of words including the target word in a second sequence, and then selecting words from the displayed plurality of words in the first sequence, said computer-readable program code means for presenting the student with at least one of nine interactive processes wherein each interactive process type includes three interactive processes, the three interactive processes including a show only process which communicates the target word by displaying the target word for a show interval, a say only process which communicates the target word by audibly announcing the target word, and a show and say process that communicates the target word by displaying the target word for a show interval and by audibly announcing the target word.

44. The article of manufacture according to claim 43, further comprising:

second computer-readable program code means for iterating for iterating the functions performed by said computer-readable program code means for presenting, said computer-readable program code means for inputting, said computer-readable program code means for measuring, said computer-readable program code means for determining, and said computer-readable program code means for providing until the response input by said computer-readable program code means for inputting is the correct response as determined by said computer-readable program code means for determining;

said computer-readable program code means for calculating student performance based on a number of iterations performed by said second computer-readable program code means for iterating until the correct response was inputted in said computer-readable program code means for inputting, a difficulty level of the test presented by said computer-readable program code means for presenting, and the response time measured by said computer-readable program code means for measuring.

45. The article of manufacture according to claim 44, further comprising:

computer-readable program code means for providing the student with a show button, wherein activating the show button causes said computer-readable program code means for presenting to display the target word for the show interval, computer-readable program code means for providing the student with a say button, wherein activating the say button causes said computer-readable program code means for presenting to aurally announce the target word, said computer-readable program code means for calculating student performance based on whether the show button or the say button has been activated, a number of iterations performed by said second computer-readable program code means for iterating until the correct response was inputted by said computer-readable program code means for inputting, the difficulty level of the test presented by said computer-readable program code means for presenting, and the response time measured by said computer-readable program code means for measuring the response time.

46. The article of manufacture according to claim 43, further comprising:

computer-readable program code means for progressively activating interactive processes according to a number of times said first computer-readable program code means for iteration iterates, said computer-readable program code means for presenting the student with interactive processes activated by said computer-readable program code means for activating.

47. The article of manufacture according to claim 43, further comprising:

computer-readable program code means for recording the student's response to the interactive process;

said computer-readable program code means for calculating student performance based on an average percent correct of all past student responses recorded by said computer-readable program code means for recording, the difficulty level of the interactive process presented by said computer-readable program code means for presenting, and the response time measured by said computer-readable program code means for measuring the response time; and said computer-readable program code means for adjusting the difficulty level of the test presented by said computer-readable program code means for presenting based on the student performance calculated in said computer-readable program code means for calculating.

48. The article of manufacture according to claim 47, further comprising:

computer-readable program code means for inputting the student's age wherein the student's age may be a chronological age or a reading level, said computer-readable program code means for calculating student performance based on an average percent correct of all past student responses recorded by said computer-readable program code means for recording, the difficulty level of the interactive process presented by said computer-readable program code means for presenting, and the response time measured by said computer-readable program code means for measuring the response time; and said computer-readable program code means for adjusting the difficulty level of the test presented by said computer-readable program code means for presenting based on the student performance calculated by said computer-readable program code means for calculating and the student's age inputted in said computer-readable program code means for inputting.

49. The article of manufacture according to claim 48, further comprising:

said computer-readable program code means for adjusting the difficulty level of the test presented by said computer-readable program code means for presenting by adjusting the duration of the show interval if the interactive process is the show only process or the show and say process;

said computer-readable program code means for calculating student performance based on the duration of the show interval, an average percent correct of all past student responses recorded by said computer-readable program code means for recording, the difficulty level of the interactive process presented by said computer-readable program code means for presenting, and the response time measured by said computer-readable program code means for measuring.

50. The article of manufacture according to claim 49, said computer-readable program code means for adjusting the duration of the show interval decreasing the show interval after each target word is shown at a rate of decrease that is directly related to the duration of the show interval.

51. The article of manufacture according to claim 49, said computer-readable program code means for adjusting the duration of the show interval adjusting the duration of the show interval based on the student performance and/or student age.

52. The article of manufacture according to claim 49, further comprising:

computer-readable program code means for determining if the student performance has substantially decreased from one iteration to another iteration of said first computer-readable program code means for iterating, temporarily increasing the show interval if said computer-readable program code means for determining determines that the student performance has substantially decreased.

53. The article of manufacture according to claim 49, said computer-readable program code means for adjusting the duration of the show interval adjusting the duration of the show interval by utilizing a random variability factor.

54. The article of manufacture according to claim 53, further comprising:

computer-readable program code means for adjusting the random variability factor based on student performance.

55. The article of manufacture according to claim 43, said computer-readable program code means for adjusting the difficulty level of the choosing a target word from a list interactive process presented by said computer-readable program code means for presenting by adjusting the number of words in the list based on student age and student performance;

said computer-readable program code means for adjusting the difficulty level of the determining a correct sequence of words interactive process presented by said computer-readable program code means for presenting by adjusting the number of the words in the sequence according to student age and student performance;

said computer-readable program code means for calculating student performance based on the number of words in the list or sequence.

56. The article of manufacture according to claim 43, wherein each word utilized in the interactive processes includes an associated word ID that identifies a relative difficulty of the associated word, said computer-readable program code means for adjusting the difficulty level of the interactive process presented by said computer-readable program code means for presenting by progressively adding more difficult words to the words utilized in the interactive process according to the number of iterations performed by said first computer-readable program code means for iterating; and said computer-readable program code means for calculating student performance based on the word ID of the most recently added word.

57. The article of manufacture according to claim 43, wherein each word utilized in the interactive processes includes an associated length that corresponds to a relative difficulty of the associated word, said computer-readable program code means for adjusting the difficulty level of the interactive process presented by said computer-readable program code means for presenting by progressively adding different words to the words utilized in the interactive process according to the number of iterations performed by said first computer-readable program code means for iterating; and said computer-readable program code means for calculating student performance based on the length of the most recently added word.

58. The article of manufacture according to claim 43, said computer-readable program code means for adjusting the difficulty level of the filling in letter blanks interactive process presented by said computer-readable program code means for presenting by gradually and proportionally adjusting how many blanks are to be filled in by the student based on student age, student performance and number of iterations performed by said first computer-readable program code means for iterating;

said computer-readable program code means for calculating student performance based on the number of blanks to be filled in by the student.

59. The article of manufacture according to claim 58, further comprising:

computer-readable program code means for randomly determining which letters will be shown as blank when the filling in letter blanks interactive process is presented by said computer-readable program code means for presenting.

60. The article of manufacture according to claim 43, further comprising:

computer-readable program code means for moving the target word from one of the interactive processes to another interactive process based on student performance.

61. A method of teaching a student to read, comprising:

constructing sight reading development tests that include one or more interactive processes each with one or more interactive process types;

presenting the sight reading development tests to the student;

inputting a response from the student;

determining student performance according to a response time measured between said presenting and said inputting steps;

adjusting the difficulty level according to the student performance; and iterating said constructing, presenting, inputting, determining and adjusting wherein said constructing step constructs a next sight reading development test according to the adjusted difficulty level.

62. The method according to claim 61, said determining step further including determining student performance according to a difficulty level of the sight reading drill.

63. The method according to claim 61, said determining step further including determining student performance according to a correctness of the response.

64. The method according to claim 61, said adjusting step including adjusting the difficulty level by adjusting a show interval in which a target word is displayed to the student during said presenting step.

65. The method according to claim 61, wherein each interactive process and each interactive process type has an associated difficulty level, said adjusting step including adjusting the difficulty level by adjusting which of the interactive processes or interactive process steps are utilized by said constructing step.

66. The method according to claim 61, said adjusting step including adjusting the difficulty level by adjusting a difficulty level of the interactive process used by the sight development tests.

67. The method according to claim 61, said adjusting step including adjusting the difficulty level by adjusting a word set utilized by the sight reading development tests.

68. The method according to claim 61, said step adjusting including adjusting the difficulty level by adjusting a number of words utilized by the sight development tests.

69. The method according to claim 61, wherein a target word is utilized in a plurality of interactive processes, the method further comprising:

moving the target word from a first interactive process to a second interactive process based on the student performance.

70. The method according to claim 61, said adjusting step including adjusting the difficulty level according to an age of the student.

71. The computer implemented, data driven method of teaching a student to read according to claim 1, said calculating step including a difficulty level of the test presented in said presenting step when calculating student performance.

72. The data driven apparatus for teaching a student to read according to claim 21, said calculator including a difficulty level of the test presented by said presenter when calculating student performance.

73. The article of manufacture according to claim 61, said computer readable program code means for calculating including a difficulty level of the test presented by said computer readable program code means for presenting step when calculating student performance.

* * * * *